(12) United States Patent
Jones et al.

(10) Patent No.: US 8,639,416 B2
(45) Date of Patent: Jan. 28, 2014

(54) GNSS GUIDANCE AND MACHINE CONTROL

(75) Inventors: Keith R. Jones, Gilbert, AZ (US); John A. McClure, Scottsdale, AZ (US); Andrè C. Roberge, Calgary (CA); Walter J. Feller, Airdrie (CA); Michael L. Whitehead, Scottsdale, AZ (US)

(73) Assignee: AgJunction LLC, Hiawatha, KS (US)

( * ) Notice: Subject to any disclaimer, the term of this patent is extended or adjusted under 35 U.S.C. 154(b) by 0 days.

(21) Appl. No.: 13/426,395

(22) Filed: Mar. 21, 2012

(65) Prior Publication Data

US 2012/0174445 A1 Jul. 12, 2012

Related U.S. Application Data

(63) Continuation-in-part of application No. 12/857,298, filed on Aug. 16, 2010, which is a continuation-in-part of application No. 12/355,776, filed on Jan. 17, 209, now Pat. No. 8,140,223, which is a continuation-in-part of application No. 12/171,399, filed on Jul. 11, 2008, now Pat. No. 8,265,826, which is a continuation-in-part of application No. 10/804,758, filed on Mar. 19, 2004, now Pat. No. 7,400,956, which is a continuation-in-part of application No. 10/828,745, filed on Apr. 21, 2004, now abandoned.

(60) Provisional application No. 60/456,146, filed on Mar. 20, 2003, provisional application No. 60/464,756, filed on Apr. 23, 2003.

(51) Int. Cl.
*A01B 69/00* (2006.01)
*G06F 19/00* (2011.01)
*G01S 19/39* (2010.01)

(52) U.S. Cl.
USPC .......................... 701/41; 701/50; 342/357.22

(58) Field of Classification Search
USPC ......... 701/213, 200, 50, 41, 23, 25, 301, 120; 342/357.26, 357.37, 357.52, 357.36, 342/357.34, 357.53, 357.76, 357.31; 700/284, 253; 172/179

See application file for complete search history.

(56) References Cited

U.S. PATENT DOCUMENTS

| 3,692,119 A | 9/1972 | Tucker |
| 4,701,760 A | 10/1987 | Raoux |

(Continued)

FOREIGN PATENT DOCUMENTS

| WO | WO-0004341 | 1/2000 |
| WO | WO-2010005945 | 1/2010 |
| WO | WO-2011014431 | 2/2011 |

OTHER PUBLICATIONS

"International Search Report", PCT/US2011/038378, (Nov. 29, 2011).

(Continued)

*Primary Examiner* — James Trammell
*Assistant Examiner* — Muhammad Shafi
(74) *Attorney, Agent, or Firm* — Law Office of Mark Brown, LLC; Mark E. Brown

(57) ABSTRACT

A global navigation satellite sensor system (GNSS) and gyroscope control system for vehicle steering control comprising a GNSS receiver and antennas at a fixed spacing to determine a vehicle position, velocity and at least one of a heading angle, a pitch angle and a roll angle based on carrier phase position differences. The roll angle facilitates correction of the lateral motion induced position errors resultant from motion of the antennae as the vehicle moves based on an offset to ground and the roll angle. Alternative aspects include multiple-antenna GNSS guidance methods for high-dynamic roll compensation, real-time kinematic (RTK) using single-frequency (L1) receivers, fixed and moving baselines between antennas, multi-position GNSS tail guidance ("breadcrumb following") for crosstrack error correction, guiding multiple vehicles and pieces of equipment relative to each other, and snow grooming equipment and method applications.

3 Claims, 39 Drawing Sheets

(56) References Cited

U.S. PATENT DOCUMENTS

| | | | |
|---|---|---|---|
| 5,031,704 A | 7/1991 | Fleischer et al. | |
| 5,100,229 A | 3/1992 | Lundberg et al. | |
| 5,152,347 A | 10/1992 | Miller | |
| 5,255,756 A | 10/1993 | Follmer et al. | |
| 5,344,105 A | 9/1994 | Youhanaie | |
| 5,404,661 A | 4/1995 | Sahm et al. | |
| 5,416,712 A | 5/1995 | Geier et al. | |
| 5,539,398 A | 7/1996 | Hall et al. | |
| 5,646,630 A | 7/1997 | Sheynblat et al. | |
| 5,761,095 A | 6/1998 | Warren | |
| 5,848,485 A | 12/1998 | Anderson et al. | |
| 5,930,743 A | 7/1999 | Warren | |
| 5,941,317 A | 8/1999 | Mansur | |
| 6,073,070 A | 6/2000 | Diekhans | |
| 6,131,062 A | 10/2000 | Nielsen | |
| 6,191,732 B1 | 2/2001 | Carlson et al. | |
| 6,191,733 B1 | 2/2001 | Dizchavez | |
| 6,199,000 B1 | 3/2001 | Keller et al. | |
| 6,271,788 B1 | 8/2001 | Longaker et al. | |
| 6,324,473 B1 | 11/2001 | Eschenbach | |
| 6,336,066 B1 | 1/2002 | Pellenc et al. | |
| 6,434,462 B1 | 8/2002 | Bevly et al. | |
| 6,449,558 B1 | 9/2002 | Small | |
| 6,466,870 B2 | 10/2002 | Satonaka | |
| 6,516,271 B2 | 2/2003 | Upadhyaya et al. | |
| 6,516,543 B1 * | 2/2003 | Bishop et al. | 37/219 |
| 6,553,299 B1 | 4/2003 | Keller et al. | |
| 6,553,300 B2 | 4/2003 | Ma et al. | |
| 6,606,542 B2 | 8/2003 | Hauwiller et al. | |
| 6,643,577 B1 | 11/2003 | Padgett et al. | |
| 6,671,587 B2 | 12/2003 | Hrovat et al. | |
| 6,681,551 B1 | 1/2004 | Sheidler et al. | |
| 7,110,881 B2 | 9/2006 | Gray et al. | |
| 7,162,348 B2 | 1/2007 | McClure et al. | |
| 7,254,485 B2 | 8/2007 | Rooney et al. | |
| 7,460,942 B2 | 12/2008 | Mailer | |
| 7,689,354 B2 | 3/2010 | Heiniger et al. | |
| RE41,358 E | 5/2010 | Heiniger et al. | |
| 8,112,201 B2 | 2/2012 | Aral | |
| 8,140,223 B2 | 3/2012 | Whitehead et al. | |
| 2002/0165645 A1 | 11/2002 | Kageyama | |
| 2003/0187560 A1 | 10/2003 | Keller et al. | |
| 2003/0195008 A1 | 10/2003 | Mohi et al. | |
| 2003/0208319 A1 | 11/2003 | Ell et al. | |
| 2005/0060069 A1 | 3/2005 | Breed et al. | |
| 2008/0262728 A1 * | 10/2008 | Lokshin et al. | 701/216 |
| 2008/0269988 A1 * | 10/2008 | Feller et al. | 701/41 |
| 2009/0216594 A1 | 8/2009 | Verhey et al. | |
| 2009/0276127 A1 | 11/2009 | Dix | |
| 2010/0036696 A1 | 2/2010 | Lang et al. | |
| 2012/0127032 A1 | 5/2012 | McClure | |
| 2012/0169495 A1 | 7/2012 | Kowalchuk | |
| 2012/0173093 A1 | 7/2012 | Kowalchuk | |

OTHER PUBLICATIONS

"International Search Report", PCT/US2011/038381, (Aug. 25, 2011).

"SNOWsat System for PistenBully", http://www.pistenbully.com/en/products/attachments/snowsat.html; Mar. 21, 2012.

* cited by examiner

Approximation Based on Scaling (ABOS)

GNSS GUIDANCE AND MACHINE CONTROL

CROSS-REFERENCE TO RELATED APPLICATIONS

This application is a continuation-in-part of and claims the benefit of U.S. patent application Ser. No. 12/857,298, filed Aug. 16, 2010, which is a continuation-in-part of U.S. patent application Ser. No. 12/355,776, filed Jan. 17, 2009, now U.S. Pat. No. 8,140,223, which is a continuation-in-part of U.S. patent application Ser. No. 12/171,399, filed Jul. 11, 2008 now U.S. Pat. No. 8,265,826, which is a continuation-in-part of U.S. patent application Ser. No. 10/804,758, filed Mar. 19, 2004, now U.S. Pat. No. 7,400,956, which is a continuation-in-part of U.S. patent application Ser. No. 10/828,745, filed Apr. 21, 2004, now abandoned, and U.S. Provisional Patent Applications No. 60/456,146, filed Mar. 20, 2003 and No. 60/464,756, filed Apr. 23, 2003. The contents of all of the aforementioned applications are incorporated by reference herein in their entireties.

BACKGROUND OF THE INVENTION

This invention relates generally to machine control using global navigation satellite systems (GNSSs) and more particularly to an equipment control system and method.

Movable machinery, such as excavators, graders, agricultural equipment, open-pit mining machines, aircraft crop dusters and other mobile operating equipment can benefit from accurate positioning using global navigation satellite systems (GNSSs). For example, U.S. Pat. No. 7,689,354, which is assigned to a common assignee herewith, discloses agricultural equipment equipped with an adaptive guidance system including a multi-antenna GNSS system for guidance, automatic steering, independent implement positioning and spraying control.

In the earth-moving field, a wide variety of equipment has been used for specific applications, such as excavators, backhoes, bulldozers, loaders and motor graders. Earth-moving projects encompass a wide variety of excavating, grading, trenching, boring, scraping, spreading and other tasks, which are performed in connection with road-building, infrastructure improvements, construction, mining and other activities. Such tasks are typically performed by specialized equipment. Such equipment can be relatively sophisticated and can handle relatively high capacities of materials.

Mobile earth-moving equipment is steered and otherwise guided within jobsites. Moreover, the working components of such equipment, such as blades, drills, buckets and ground-engaging tools, are controlled through their various ranges of motion. Machine guidance and control were conventionally accomplished by human operators, who often needed relatively high levels of skill, training and experience for achieving maximum production with the equipment. For example, jobsite grading was typically accomplished by surveying the site, placing stakes at predetermined locations to indicate the locations of "cutting" (i.e. earth removal) and "filling" (i.e. earth placement) operations required to achieve a final grading plan. Cut and fill quantities are preferably balanced as much as possible to avoid added expenses for additional fill material or removing excess material.

In addition to balancing material requirements, design parameters such as water runoff, slope, compaction (relating to load-bearing capacity) and thicknesses of various material layers are important grading and site design criteria. Previous earth-moving machinery tended to be highly reliant on operator skill for achieving desired final results.

The present invention uses satellite positioning systems (SATPSs), such as the Global Positioning System (GPS) and other global navigation satellite systems (GNSSs) for guidance and machine control. Project bidding can thus be based on more precise labor, material quantity, fuel, equipment maintenance, material disposal, time and other cost factors. Project expenses can thus be reduced by controlling input costs of material, material hauling, fuel, labor, equipment utilization, etc. Still further, earth-moving operations that were previously conducted in separate "rough" and "fine" phases can be combined into single-phase procedures due to the greater efficiencies and accuracies achievable with the GNSS machine guidance and control of the present invention. Still further, operators tend to be less fatigued with a relatively high level of automated machine guidance and control, as opposed to manually-intensive control procedures requiring high degrees of concentration and operator interaction.

Various navigation and machine control systems for ground-based vehicles have been employed but each has disadvantages. Systems using Doppler radar encounter errors with the radar and latency. Similarly, gyroscopes, which may provide heading (slew), roll, or pitch measurements, may be deployed as part of an inertial navigation package, but tend to encounter drift errors and biases and still require some external attitude measurements for gyroscope initialization and drift compensation. Gyroscopes have good short-term characteristics but undesirable long-term drift characteristics, especially gyroscopes of lower cost such as those based on a vibrating resonator. Similarly, inertial systems employing gyroscopes and accelerometers have good short-term characteristics but also suffer from drift.

Providing multiple antennas on a vehicle can provide additional benefits by determining an attitude of the vehicle from the GNSS ranging signals received by its antennas, which are constrained on the vehicle at a predetermined spacing. For example, high dynamic roll compensation signals can be output directly to the vehicle steering using GNSS-derived attitude information. Components such as gyroscopes and accelerometers can be eliminated using such techniques. Real-time kinematic (RTK) can be accomplished using relatively economical single frequency L1-only receivers with inputs from at least two antennas mounted in fixed relation on a rover vehicle. Still further, moving baselines can be provided for positioning solutions involving machine components and multi-vehicle/machine GNSS control.

GNSS-based equipment and methods can also be used for machine control, such as earth-moving equipment. GNSS guidance can provide a relatively high level of accuracy. For instance, prior to GNSS guidance and machine control, earth-moving operations tended to rely more on operator skill for manually spot-checking grade elevations in order to smoothly cut and fill a plot of land to a particular height. With the GNSS guidance and machine control of the present invention providing three-dimensional (3D) positional tracking, earth-moving equipment can perform cut, fill, and other earth-moving functions using GNSS positioning data for greater repeatable accuracy and operating efficiencies. Although GNSS-based control techniques have been used in earth-moving machinery, previous GNSS machine control systems used in such equipment do not provide the advantages and features of the present invention.

By using GNSS-equipped earth-moving machines, the need for manual grade checks can be reduced or eliminated on many grading projects. Slope and grade measurements can be obtained with greater accuracy and quality control. Moreover, earth-moving jobs that were previously deemed challenging and complex can be simplified, thus increasing the available pool of qualified earth-moving contractors and equipment operators. GNSS-based guidance and control using the present invention can provide more information and control to the equipment operators, thus enabling them to undertake more difficult tasks than they might have with manually-controlled equipment and techniques. Consistency among operator performance can be improved via GNSS-based automation, resulting in better overall job quality. For example, relatively inexperienced operators can deliver results comparable to those achieved by more experienced operators using the information and automation features of the present invention. Another operator benefit relates to less fatigue, as compared to manually guiding and controlling the equipment and its functions.

Profitability of earth-moving jobs using GNSS-equipped machines tends to improve because bidding and execution risks are more highly controlled, input (e.g., material, material hauling, fuel and labor) costs can be reduced, the necessity of reworking projects in order to meet specifications can be reduced, safety can be improved and equipment can complete more projects between service cycles due to greater operating efficiencies.

Yet another application for GNSS-equipped machines involves snow management, including snow grooming procedures for ski resorts. Maximizing use of available snow, both natural and man-made, is an important aspect of managing winter sports areas, such as ski resorts. Effective snow grooming commonly involves relocating volumes of snow in order to provide sufficient snow base depth, to cover obstacles and for configuring ski runs. Skiers often divert snow while making runs. Resort operators often groom and reconfigure their ski runs after normal operating hours to avoid interfering with daytime recreational activities. At many resorts grooming activities continue through the night.

Snow grooming equipment operators are often exposed to hazardous conditions on the mountain, particularly when operating at night or in bad weather conditions. For example, blizzard conditions are often associated with "white out" conditions restricting visibility. Operating heavy equipment on steep, snow-covered terrain in limited visibility can be hazardous to operators. Also, their procedures commonly require relatively precise navigation and positioning to avoid. Still further, snow base and snow depth control can be difficult without significant experience and terrain knowledge.

Heretofore there has not been available a GNSS-based guidance and control system for earth-moving and other equipment with the advantages and features of the present invention.

SUMMARY OF THE INVENTION

Disclosed herein in an exemplary embodiment is a sensor system for vehicle steering control comprising: a plurality of global navigation satellite systems (GNSSs) including receivers and antennas at a fixed spacing to determine a vehicle position, velocity and at least one of a heading (slew) angle, a pitch angle and a roll angle based on carrier phase corrected real time kinematic (RTK) position differences. The roll angle facilitates correction of the lateral motion induced position errors resultant from motion of the antennae as the vehicle moves based on an offset to ground and the roll angle. The system also includes a control system configured to receive the vehicle position, heading, and at least one of roll, pitch and yaw, and configured to generate a steering command to a vehicle steering system.

Also disclosed herein in another exemplary embodiment is a method for computing a position of a vehicle comprising: initializing GNSS; computing a first position of a first GNSS antenna on the vehicle; computing a second position of a second GNSS antenna; and calculating a heading as a vector perpendicular to a vector joining the first position and the second position, in a horizontal plane aligned with the vehicle. The method also includes computing a roll angle of the vehicle as an arc-tangent of a ratio of differences in heights of the first GNSS antenna and the second GNSS antenna divided by a spacing between their respective phase centers and calculating an actual position at the center of the vehicle projected to the ground using the computed roll angle and a known height from the ground of at least one of the first GNSS antenna and the second GNSS antenna.

Further disclosed herein in yet another exemplary embodiment is a method of controlling a vehicle comprising: computing a position and a heading for the vehicle; computing a steering control command based on a proportionality factor multiplied by a difference in a desired position versus an actual position, plus a second proportionality factor multiplied by a difference in a desired heading versus an actual heading, the second proportionality factor ensuring that when the vehicle attains the desired position the vehicle is also directed to the desired heading, and thereby avoiding crossing a desired track. The method also includes a recursive adaptive algorithm employed to characterize the vehicle response and selected dynamic characteristics.

The method further includes applying selected control values to a vehicle steering control mechanism and measuring responses of the vehicle thereto; calculating response times and characteristics for the vehicle based on the responses; and calibrating the control commands by applying a modified control command based on the responses to achieve a desired response.

Additional alternative aspects include selective sprayer nozzle control, high dynamic roll compensation using GNSS attitude solutions from multiple antennas, moving baseline implement positioning and multiple vehicle control.

An additional embodiment of the present invention includes employing the above-mentioned multiple GNSS antenna guidance system on earth-moving equipment, such as an excavator, grader, bulldozer, loader or the like. GNSS guidance obtains three-dimensional positional and attitude (heading) data, including coordinates defined in relation to a geodesic coordinate system and rotation about X, Y, and Z axes. The excavator is also modified with multiple sensors on the excavation arm (e.g., "stick-and-boom") or other such working implement. The GNSS guidance system computes the three-dimensional position of the bucket on the implement arm by comparing the GNSS position of the excavation vehicle itself with the various angle sensors placed on the implement arm holding the bucket. Using this combination, an excavator can precisely cut or fill a piece of land to a relatively precise desired elevation either based on a pre-planned terrain map or by setting an initial elevation with the GNSS guidance system and computing the cut/fill quantities and locations from that base reference point or benchmark.

Still further alternative embodiments of the present invention are adapted for snow grooming operations and include equipment control subsystems mounted on snowcats, snowmobiles and other snow equipment pieces.

DETAILED DESCRIPTION OF THE PREFERRED ASPECTS

I. GNSS Introduction

Figure 1:
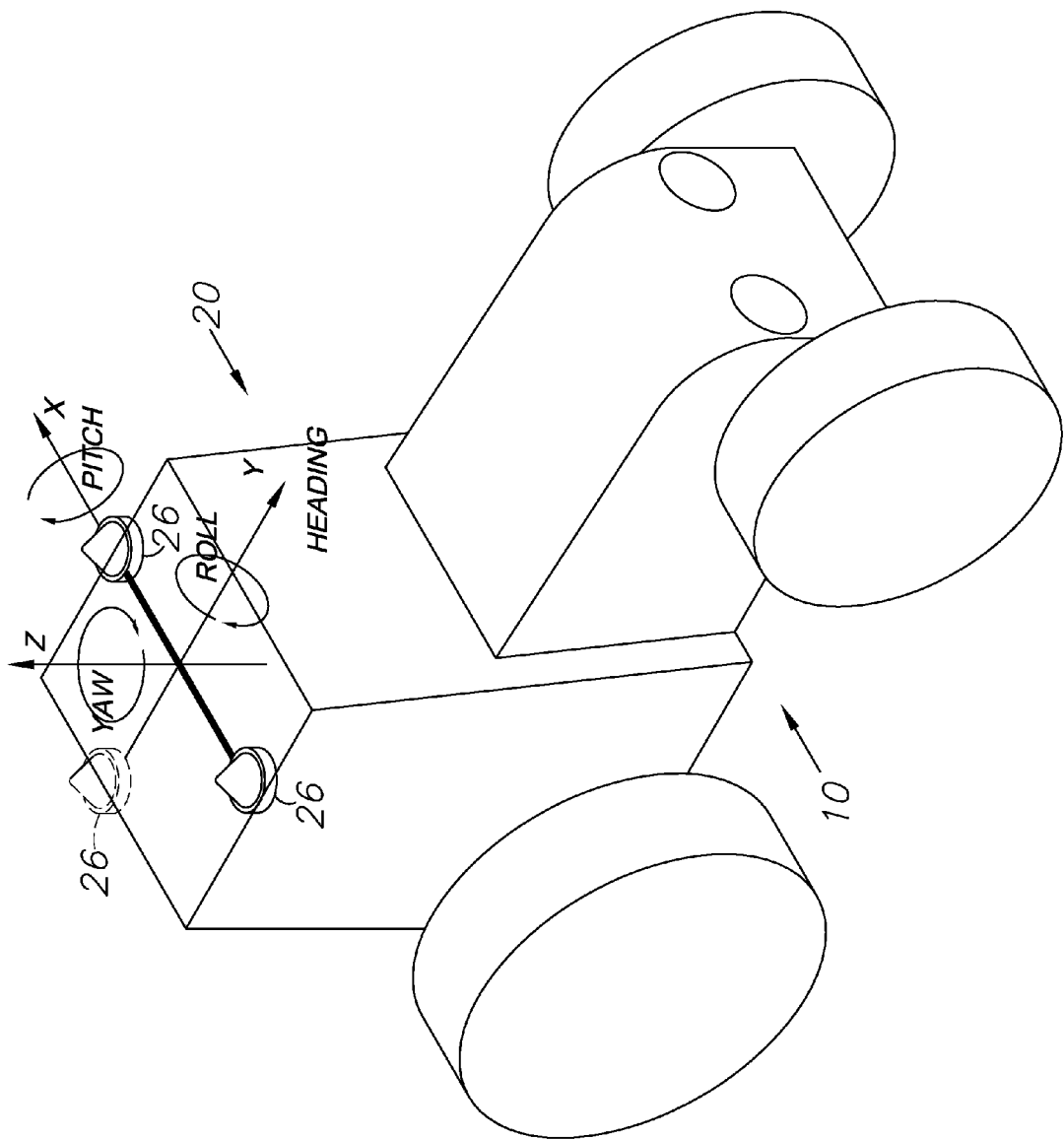
FIG. 1 depicts an illustrative diagram of a vehicle including an exemplary embodiment.

Global navigation satellite systems (GNSSs) are broadly defined to include GPS (U.S.), Galileo (proposed), GLONASS (Russia), Beidou/Compass (China, proposed), IRNSS (India, proposed), QZSS (Japan, proposed) and other current and future positioning technology using signals from satellites, with or without augmentation from terrestrial sources. Inertial navigation systems (INS) include gyroscopic (gyro) sensors, accelerometers and similar technologies for providing output corresponding to the inertia of moving components in all axes, i.e. through six degrees of freedom (positive and negative directions along X, Y and Z axes). Yaw, pitch and roll refer to moving component rotation about these axes. Said terminology will include the words specifically mentioned, derivatives thereof and words of similar meaning.

Disclosed herein in an exemplary embodiment is a sensor system for vehicle guidance. The sensor system utilizes a plurality of GNSS carrier phase differenced antennas to derive attitude information, herein referred to as a GNSS attitude system. Moreover, the GNSS attitude system may optionally be combined with one or more rate gyro(s) used to measure turn, roll or pitch rates and to further calibrate bias and scale factor errors within these gyros. In an exemplary embodiment, the rate gyros and GNSS receiver/antenna are integrated together within the same unit, to provide multiple mechanisms to characterize a vehicle's motion and position to make a robust vehicle steering control mechanism.

It is known in the art that by using a GNSS satellite's carrier phase, and possibly carrier phases from other satellites, such as WAAS satellites, a position may readily be determined to within millimeters. When accomplished with two antennas at a fixed spacing, an angular rotation may be computed using the position differences. In an exemplary embodiment, two antennas placed in the horizontal plane may be employed to compute a heading (rotation about a vertical Z axis) from a position displacement. It will be appreciated that an exemplary embodiment may be utilized to compute not only heading, but either roll (rotation about a longitudinal Y axis) or pitch (rotation about a lateral X axis) depending on the orientation of the antennas relative to the vehicle. Heading information, combined with position, either differentially corrected (DGPS or DGNSS) or carrier phase corrected real time kinematic (RTK) provides the feedback information desired for a proper control of the vehicle direction. Addition of one or more rate gyros further provides independent measurements of the vehicle's dynamics and facilitates vehicle steering control. The combination of GNSS attitude obtained from multiple antennas with gyroscopes facilitates calibration of gyroscope scale factor and bias errors which are present in low cost gyroscopes. When these errors are removed, gyro rates are more accurate and provide better inputs for guidance and control. Furthermore, gyroscopes can now effectively be integrated to obtain roll, pitch and heading angles with occasional adjustment from the GNSS-derived attitude.

Existing systems for vehicle guidance may employ separate gyros, and separate GNSS positioning or attitude systems. However, such systems do not provide an integrated heading sensor based on GNSS as disclosed herein. Moreover, separate systems exhibit the limitations of their respective technologies as mentioned earlier. The exemplary embodiments as described herein eliminate the requirements of existing systems for other means to correct for vehicle roll. Moreover, an implementation of an exemplary embodiment also provides a relatively precise, in both the short-term and the long-term, means of calculating heading and heading rate of change (turn rate).

Another benefit achieved by incorporating a GNSS-based heading sensor is the elimination or reduction of drift and biases resultant from a gyro-only or other inertial sensor approach. Yet another advantage is that heading may be computed while the vehicle is stopped or moving slowly, which is not possible in a single-antenna GNSS based approach that requires a vehicle velocity vector to derive heading. This can be very important in applications where a vehicle has to turn slowly to align with another path. During these slow turns the gyro can drift away but by adding the use of a dual antenna GNSS solution the orientation of the gyro can be continuously corrected. This also permits immediate operation of a slow moving vehicle after being at rest, rather than requiring an initialization from motion. Yet another advantage of an exemplary embodiment is that a combination of the aforementioned sensors provides sufficient information for a feedback control system to be developed, which is standalone and independent of a vehicle's sensors or additional external sensors. Thus, such a system is readily maintained as vehicle-independent and may be moved from one vehicle to another with minimal effort. Yet another exemplary embodiment of the sensor employs global navigation satellite system (GNSS) sensors and measurements to provide accurate, reliable positioning information. GNSS sensors include, but are not limited to GNSS, Global Navigation System (GLONAS), Wide Area Augmentation System (WAAS) and the like, as well as combinations including at least one of the foregoing.

GNSS includes the Global Positioning System (GPS), which was established by the United States government and employs a constellation of 24 or more satellites in well-defined orbits at an altitude of approximately 26,500 km. These satellites continually transmit microwave L-band radio signals in three frequency bands, centered at 1575.42 MHz, 1227.60 MHz and 1176.45 MHz, denoted as L1, L2 and L5 respectively. All GNSS signals include timing patterns relative to the satellite's onboard precision clock (which is kept synchronized by a ground station) as well as a navigation message giving the precise orbital positions of the satellites. GPS receivers process the radio signals, computing ranges to the GPS satellites, and by triangulating these ranges, the GPS receiver determines its position and its internal clock error. Different levels of accuracies can be achieved depending on the techniques employed.

GNSS also includes Galileo (Europe), the GLObal NAvigation Satellite System (GLONASS, Russia), Beidou (China), Compass (proposed), the Indian Regional Navigational Satellite System (IRNSS) and QZSS (Japan, proposed). Galileo will transmit signals centered at 1575.42 MHz, denoted L1 or E1, 1176.45 denoted E5a, 1207.14 MHz, denoted E5b, 1191.795 MHz, denoted E5 and 1278.75 MHz, denoted E6. GLONASS transmits groups of FDM signals centered approximately at 1602 MHz and 1246 MHz, denoted GL1 and GL2 respectively. QZSS will transmit signals centered at L1, L2, L5 and E6.

In standalone GNSS systems that determine a receiver's antenna position coordinates without reference to a nearby reference receiver, the process of position determination is subject to errors from a number of sources. These include errors in the GNSS satellite's clock reference, the location of the orbiting satellite, ionosphere induced propagation delay errors, and troposphere refraction errors.

To overcome the errors of standalone GNSS systems, many positioning applications have made use of data from multiple GNSS receivers. Typically, in such applications, a reference receiver, located at a reference site having known coordinates, receives the GNSS satellite signals simultaneously with the receipt of signals by a remote receiver. Depending on the separation distance between the two GNSS receivers, many of the errors mentioned above will affect the satellite signals equally for the two receivers. By taking the difference between signals received both at the reference site and the remote location, the errors are effectively eliminated. This facilitates an accurate determination of the remote receiver's coordinates relative to the reference receiver's coordinates.

The technique of differencing signals from two or more GNSS receivers to improve accuracy is known as differential GNSS (DGNSS or DGPS). Differential GNSS is well known and exhibits many forms. In all forms of DGNSS, the positions obtained by the end user's remote receiver are relative to the position(s) of the reference receiver(s). GNSS applications have been improved and enhanced by employing a broader array of satellites such as GNSS and WAAS. For example, see commonly assigned U.S. Pat. No. 6,469,663 to Whitehead et al. entitled Method and System for GNSS and WAAS Carrier Phase Measurements for Relative Positioning, dated Oct. 22, 2002, the disclosures of which are incorporated by reference herein in their entirety. Additionally, multiple receiver DGNSS has been enhanced by utilizing a single receiver to perform differential corrections. For example, see commonly assigned U.S. Pat. No. 6,397,147 to Whitehead titled Relative GNSS Positioning Using a Single GNSS Receiver with Internally Generated Differential Correction Terms, dated May 28, 2002, the disclosures of which are incorporated by reference herein in their entirety.

II. GNSS and Gyro Control System and Method

Figure 2:
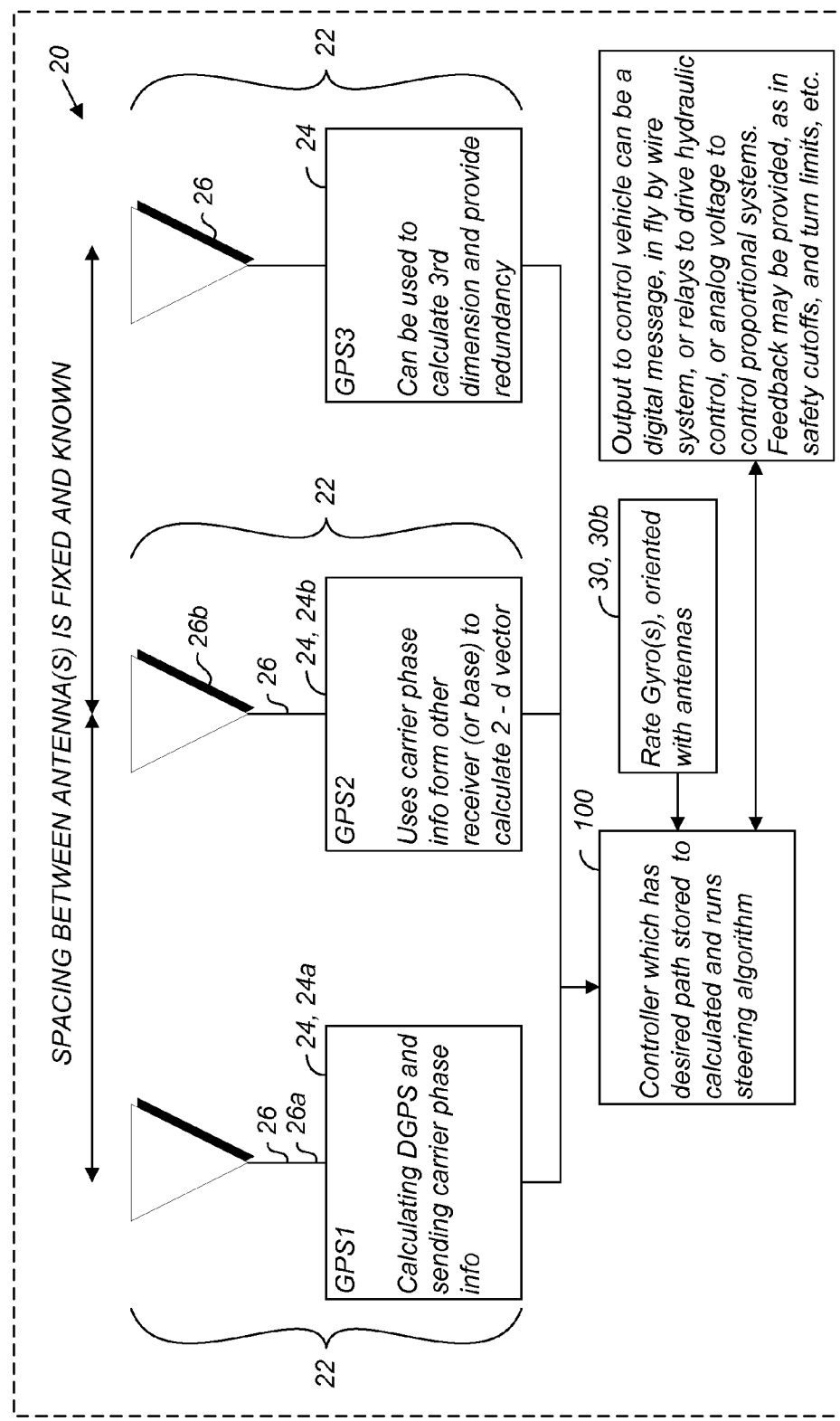
FIG. 2 depicts an illustrative block diagram of the vehicle including an exemplary embodiment of a sensor system.
Figure 3:
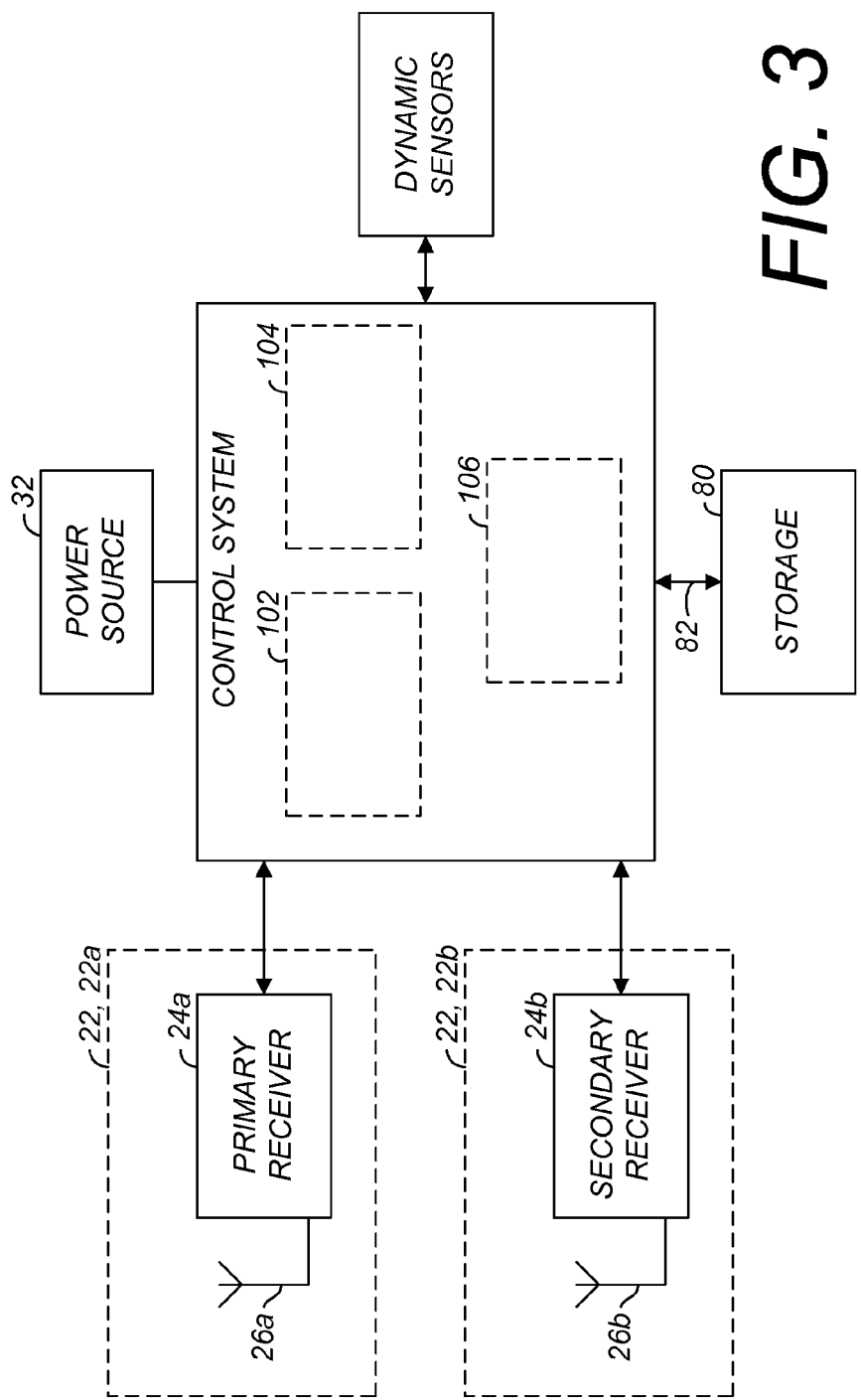
FIG. 3 depicts an illustrative block diagram of a sensor system in accordance with an exemplary embodiment.

Referring now to FIGS. 1 through 4, an illustrative vehicle 10 is depicted including a sensor system 20 in accordance with an exemplary embodiment. Referring also to FIGS. 2 and 3, block diagrams of the sensor system 20 are depicted. The sensor system 20 includes, but is not limited to a GNSS attitude system 22, comprising at least a GNSS receiver 24 and an antenna 26. The GNSS receiver/antenna systems comprising the GNSS attitude system 22 cooperate as a primary receiver system 22a and a secondary receiver system 22b, with their respective antennas 26a and 26b mounted with a known separation. The primary receiver system 22a may also be denoted as a reference or master receiver system, while the secondary receiver system 22b may also be denoted as a remote or slave receiver system. It will also be appreciated that the selection of one receiver as primary versus secondary need not be of significance; it merely provides a means for distinguishing between systems, partitioning of functionality, and defining measurement references to facilitate description. It should be appreciated that the nomenclature could readily be transposed or modified without impacting the scope of the disclosure or the claims.

The sensor system 20 is optionally configured to be mounted within a single enclosure 28 to facilitate transportability. In an exemplary embodiment, the enclosure 28 can be any rigid assembly, fixture, or structure that causes the antennas 26 to be maintained in a substantially fixed relative position with respect to one another. In an exemplary embodiment, the enclosure 28 may be a lightweight bracket or structure to facilitate mounting of other components and transportability. Although the enclosure 28 that constrains the relative location of the two antennas 26a and 26b may have virtually any position and orientation in space, the two respective receivers 24 (reference receiver 24a and remote receiver 24b) are configured to facilitate communication with one another and resolve the attitude information from the phase center of the reference antenna 26a to the phase center of the remote antenna 26b with a high degree of accuracy.

Yet another embodiment employs a GNSS sensor 20 in the embodiments above augmented with supplementary inertial sensors 30 such as accelerometers, gyroscopes, or an attitude heading reference system. More particularly, in an implementation of an exemplary embodiment, one or more rate gyro(s) are integrated with the GNSS sensor 20.

In yet another exemplary embodiment, a gyro that measures roll-rate may also be combined with this system's GNSS-based roll determination. A roll rate gyro denoted 30b would provide improved short-term dynamic rate information to gain additional improvements when computing the sway of the vehicle 10, particularly when traveling over uneven terrain.

It will be appreciated that to supplement the embodiments disclosed herein, the data used by each GNSS receiver 24 may be coupled with data from supplementary sensors 50, including, but not limited to, accelerometers, gyroscopic sensors, compasses, magnetic sensors, inclinometers, and the like, as well as combinations including at least one of the foregoing. Coupling GNSS data with measurement information from supplementary sensors 30, and/or correction data for differential correction improves positioning accuracy, improves initialization durations and enhances the ability to recover for data outages. Moreover, such coupling may further improve, e.g., reduce, the length of time required to solve for accurate attitude data.

It will be appreciated that although not a requirement, the location of the reference antenna 26a can be considered a fixed distance from the remote antenna 26b. This constraint may be applied to the azimuth determination processes in order to reduce the time required to solve for accurate azimuth, even though both antennas 26a and 26b may be moving in space or not at a known location. The technique of resolving the attitude information and position information for the vehicle 10 may employ carrier phase DGNSS techniques with a moving reference station. Additionally, the use of data from auxiliary dynamic sensors aids the development of a heading solution by applying other constraints, including a rough indication of antenna orientation relative to the Earth's gravity field and/or alignment to the Earth's magnetic field.

Producing an accurate attitude from the use of two or more GNSS receiver and antenna systems 22 has been established in the art and therefore will not be expounded upon herein. The processing is utilized herein as part of the process required to implement an exemplary embodiment.

Figure 4:
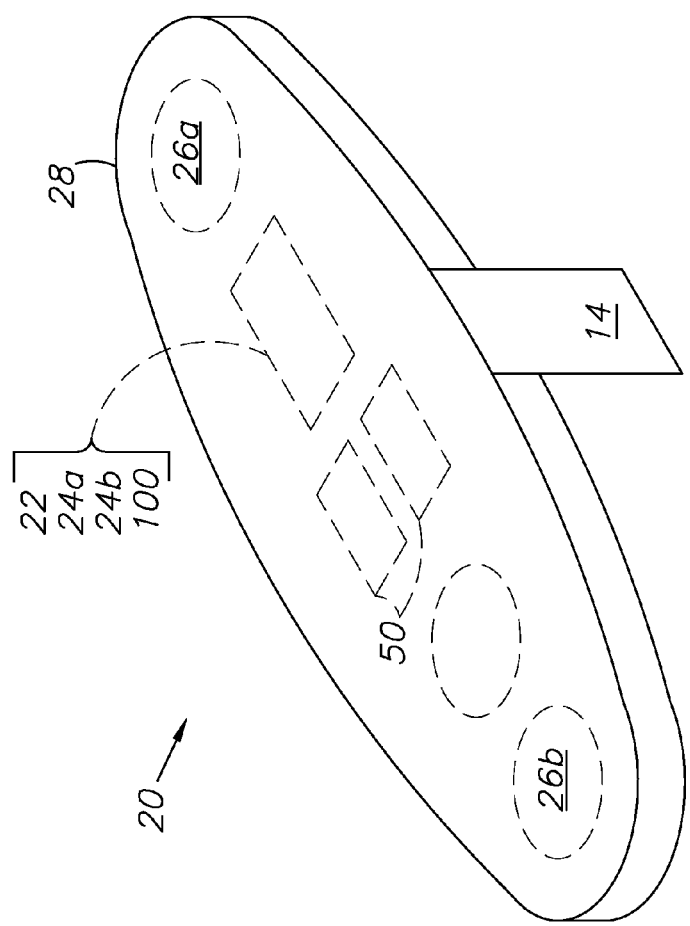
FIG. 4 depicts an illustrative sensor system in accordance with an exemplary embodiment.

Referring also to FIG. 4, a mechanism for ensuring an accurate orientation of the sensor system 20 to the vehicle 10 may be provided for by an optional mounting base 14 accurately attached to the enclosure 28. An accurate installation ensures that substantially no misalignment error is present that may otherwise cause the sensor system 20 to provide erroneous heading information. The mounting base 14 is configured such that it fits securely with a determinable orientation relative to the vehicle 10. In an exemplary embodiment, for example, the mounting base 14 is configured to fit flatly against the top surfaces of the vehicle 10 to facilitate an unimpeded view to the GNSS satellites.

With the sensor system 20 affixed and secured in the vehicle 10 power up and initialization of the sensor system 20 is thereafter executed. Such an initialization may include, but not be limited to, using the control system 100 to perform any initialization or configuration that may be necessary for a particular installation, including the configuration of an internal log file within the memory of the sensor system 20.

The sensor system 20 may further include additional associated electronics and hardware. For example, the sensor system 20 may also include a power source 32, e.g., battery, or other power generation means, e.g., photovoltaic cells, and ultrahigh capacity capacitors and the like. Moreover, the sensor system 20 may further include a control system 100. The control system 100 may include, without limitation, a controller/computer 102, a display 104 and an input device 106, such as a keypad or keyboard for operation of the control system 100. The controller 102 may include, without limitation, a computer or processor, logic, memory, storage, registers, timing, interrupts, input/output signal interfaces, and communication interfaces as required to perform the processing and operations prescribed herein. The controller preferably receives inputs from various systems and sensor elements of the sensor system 20 (GNSS, inertial, etc.), and generates output signals to control the same and direct the vehicle 10. For example, the controller 102 may receive such inputs as the GNSS satellite and receiver data and status, inertial system data, and the like from various sensors. In an exemplary embodiment, the control system 100 computes and outputs a cross-track and/or a direction error relating to the current orientation, attitude, and velocity of the vehicle 10 as well as computing a desired swath on the ground. The control system 100 will also allow the operator to configure the various settings of the sensor system 20 and monitor GNSS signal reception and any other sensors of the sensor system 20. In an exemplary embodiment, the sensor system 20 is self-contained. The control system 100, electronics, receivers 24, antennas 26, and any other sensors, including an optional power source, are contained within the enclosure 12 to facilitate ease of manipulation, transportability, and operation.

Figure 5:
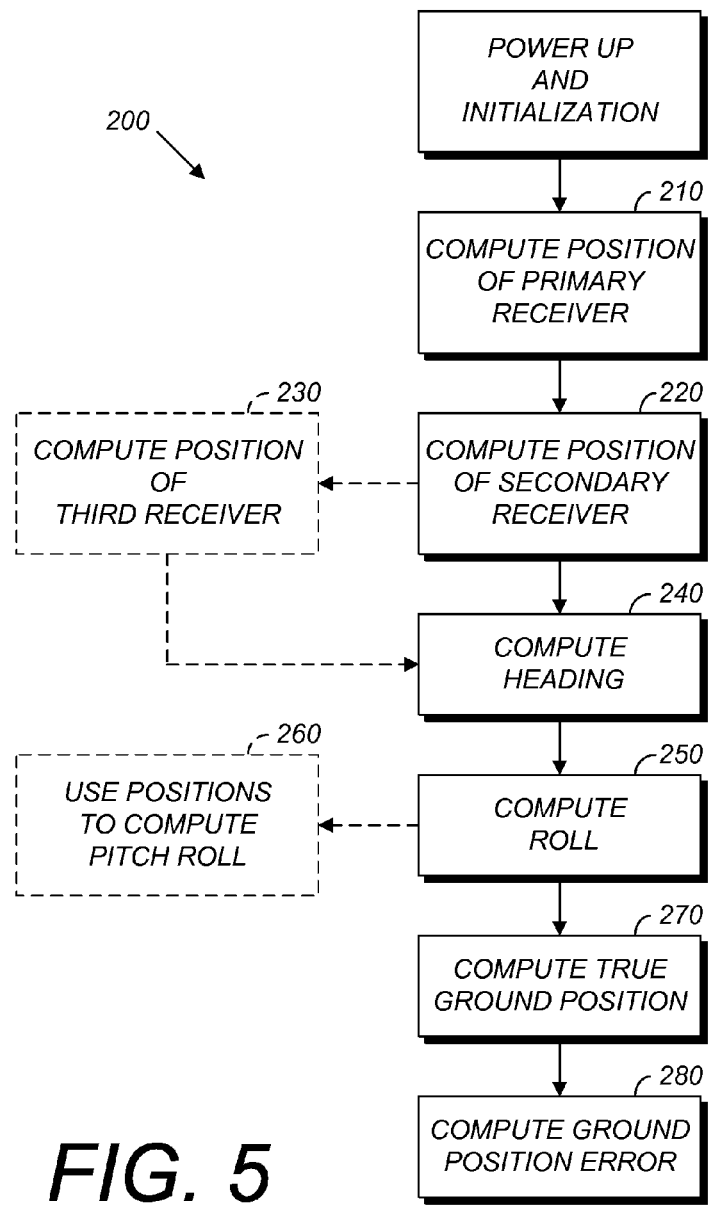
FIG. 5 depicts an illustrative flow chart of an exemplary process for determining a steering command for a vehicle in accordance with an exemplary embodiment.

Referring now to FIG. 5, a flowchart diagrammatically depicting an exemplary methodology for executing a control process 200 is provided. An exemplary control process 200, such as may be executed by an operator in conjunction with a control system 100, acts upon information from the sensor system 20 to output cross-track and/or direction error based upon corrected 3-D position, velocity, heading, tilt, heading rate (degrees per second), radius of curvature and the like.

System 22a computes its position, denoted $p_1(x_1, y_1, z_1)$. Referring now to block 220, the secondary receiver and antenna system 22b computes its position, denoted $p_2(x_2, y_2, z_2)$. Referring now to block 230, optionally additional receiver and antenna system(s) 22 compute their respective positions, denoted $p_3(x_3, y_3, z_3), \ldots p_n(x_n, y_n, z_n)$.

At process block 240, employing a geometric calculation the heading is computed as the vector perpendicular to the vector joining the two positions, in the horizontal plane (assuming they are aligned with the vehicle 10). Furthermore, at block 250 the roll of the vehicle 10 may readily be computed as the arc-tangent of the ratio of the difference in heights of the two antennas 26a and 26b divided by the spacing between their phase centers (a selected distance within the enclosure 12). It will be appreciated that optionally, if additional receiver and antenna systems are utilized and configured for additional measurements, the pitch and roll angles may also be computed using differential positioning similar to the manner for computing heading. Therefore, in FIG. 5, optionally at process block 260, the pitch and roll may be computed.

Continuing with FIG. 5, at process block 270, using the computed roll angle and a known antenna height (based on the installation in a given vehicle 10), the actual position at the center of the vehicle 10 projected to the ground may be calculated. This position represents a true ground position of the vehicle 10. Once the ground position is known, the error value representing the difference between where the vehicle should be based on a computed swath or track, and where it actually is, can be readily calculated as shown at block 280.

Optionally, the vector velocities of the vehicle 10 are also known or readily computed based on an existing course and heading of the vehicle 10. These vector velocities may readily be utilized for control and instrumentation tasks.

Figure 6:
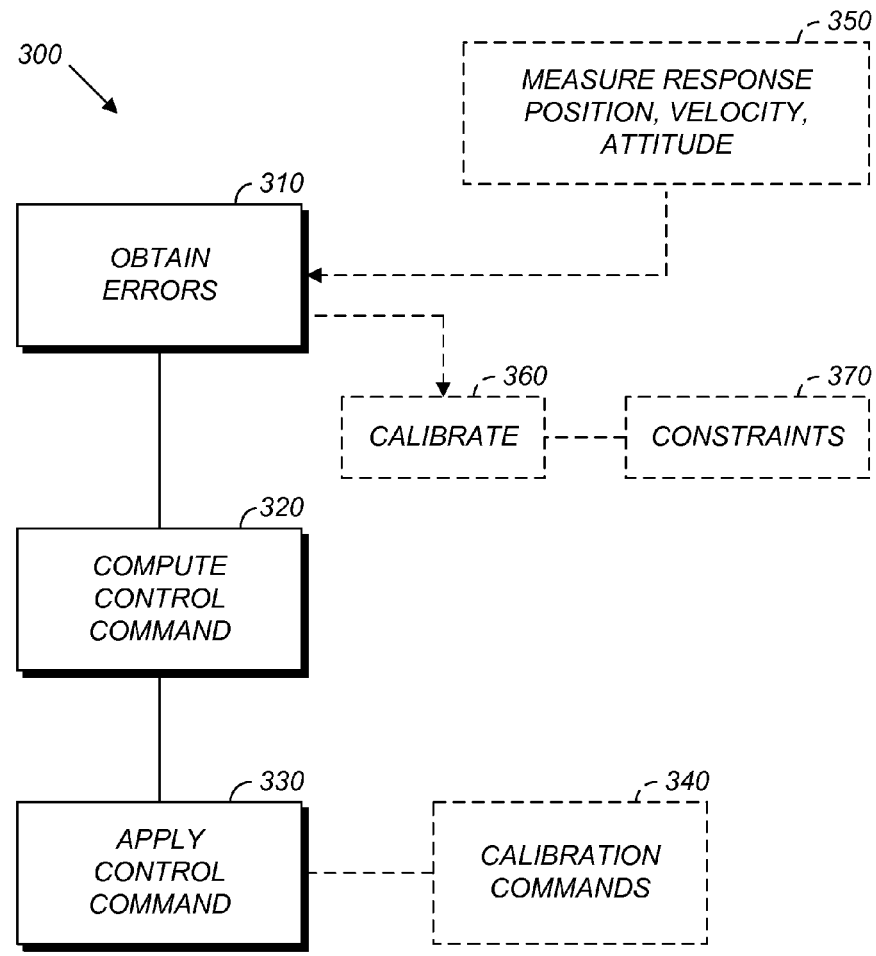
FIG. 6 depicts an illustrative flow chart of an exemplary process for determining a steering command with an exemplary sensor system in accordance with an alternative embodiment.

Turning now to FIG. 6, in another exemplary embodiment a steering control process 300 can utilize the abovementioned information from the sensor system 20 to direct the vehicle motion. At process block 310 the steering control may be initiated by obtaining the computed errors from process 200. Turning to block 320, the steering control process 300 may be facilitated by computing a steering control command based on a proportionality factor times the difference in desired position versus actual position (computed position error), plus a second proportionality factor times the difference in desired heading versus actual heading (heading error). The second proportionality factor ensures that when the vehicle attains the desired position it is actually directed to the correct heading, rather than crossing the track. Such an approach will dramatically improve steering response and stability. At process block 330, a steering command is generated and directed to the vehicle 10.

Moreover, continuing with FIG. 6, optionally a recursive adaptive algorithm may also be employed to characterize the vehicle response and selected dynamic characteristics. In an exemplary embodiment, the sensor system 20 applies selected control values to the vehicle steering control mechanism as depicted at optional block 340 and block 330. The sensor system 20 measures the response of the vehicle 10 as depicted at process block 350 and calculates the response times and characteristics for the vehicle. For example, a selected command is applied and the proportionality of the turn is measured given the selected change in steering. Turning to process block 360, the responses of the vehicle 10 are then utilized to calibrate the control commands applying a modified control command to achieve a desired response. It will be appreciated that such an auto-calibration feature would possibly be limited by constraints of the vehicle to avoid excess stress or damage as depicted at 370.

It will be appreciated that while a particular series of steps or procedures is described as part of the abovementioned alignment process, no order of steps should necessarily be inferred from the order of presentation. For example, the process 200 includes installation and power up or initialization. It should be evident that power-up and initialization could potentially be performed and executed in advance without impacting the methodology disclosed herein or the scope of the claims.

It should further be appreciated that while an exemplary partitioning functionality has been provided, it should be apparent to one skilled in the art that the partitioning could be different. For example, the control of the primary receiver 24a and the secondary receiver 24b, as well as the functions of the controller 102, could be integrated in other units. The processes for determining the alignment may, for ease of implementation, be integrated into a single receiver. Such configuration variances should be considered equivalent and within the scope of the disclosure and claims herein.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium 80 wherein the computer becomes an apparatus for practicing the invention when the computer program code is loaded into and executed by the computer. The present invention can also be embodied in the form of computer program code stored in a storage medium or loaded into and/or executed by a computer, for example. The present invention can also be embodied in the form of a data signal 82 transmitted by a modulated or unmodulated carrier wave, over a transmission medium, such as electrical wiring or cabling, through fiber optics or via electromagnetic radiation. When the computer program code is loaded into and executed by a computer, the computer becomes an apparatus for practicing the invention. When implemented on a general-purpose microprocessor, the computer program code segments configure the microprocessor to create specific logic circuits.

III. Alternative Aspect GNSS Control Systems and Methods

Figure 7:
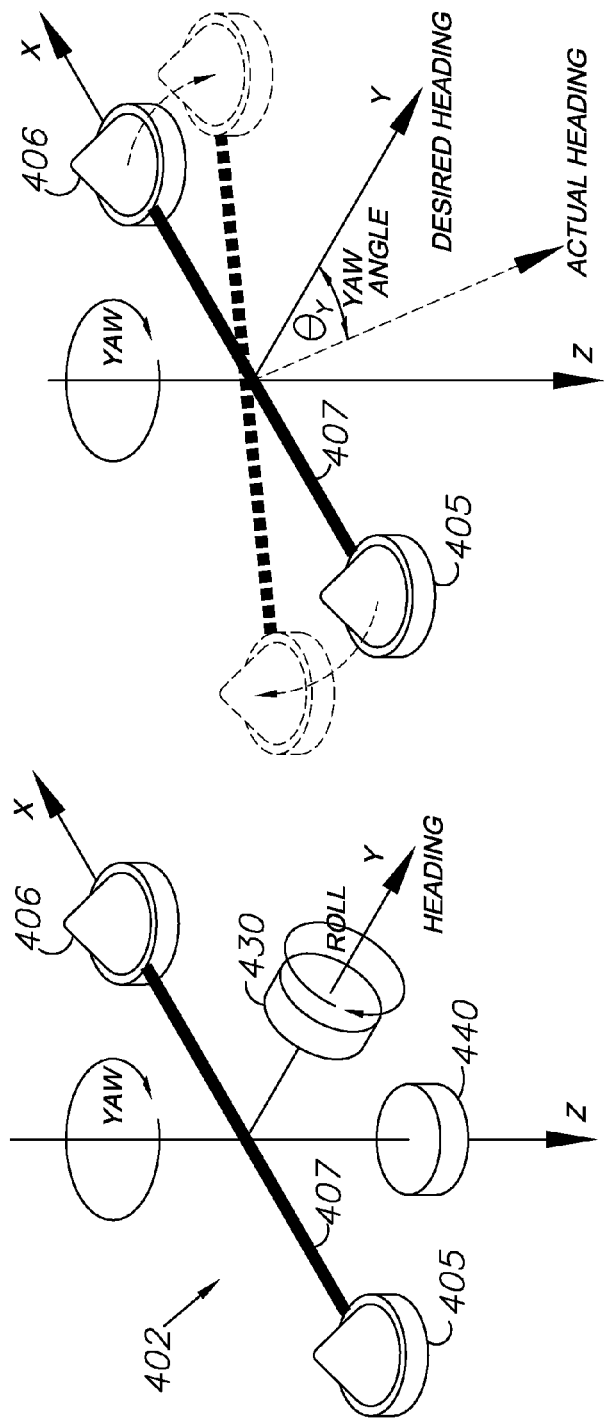
FIG. 7A depicts a multi-axis antenna and gyroscope system embodying an aspect of the present invention and including two antennas connected by a rigid link and yaw and roll gyroscopes.
FIG. 7B depicts the system in a yaw attitude.
FIG. 7C depicts the system in a roll attitude.

FIG. 7A shows another alternative aspect of the invention including a GNSS antenna and gyroscope attitude system 402 with antennas 405, 406 separated by a rigid link 407. In a typical application, the rigid link 407 is attached to the vehicle 10 and extends along the X (transverse) axis or transversely with respect to the vehicle's direction of travel, which generally corresponds to the Y (heading) axis. Alternatively, the vehicle 10 itself can provide the rigid link between the antennas 405, 406, for example, by mounting the antennas 405, 406 at predetermined, fixed locations on the roof of the vehicle cab with a predetermined, fixed distance therebetween. Another alternative is to provide a GNSS attitude device with antennas, receivers and sensors (e.g., gyroscopes (gyros), accelerometers and other sensors) in a self-contained, unitary enclosure, such as the device 20 shown in enclosure 28 in FIG. 4. Regardless of the antenna-mounting structure, the orientation of the antenna pair and the rigid link 407 (or vehicle 10) is determined with respect to an Earth-fixed coordinate system. The XYZ axes shown in FIG. 7A provide an example for defining this relation. Roll and yaw gyros 430, 440 are generally aligned with the Y and Z axes respectively for detecting and measuring vehicle 10 attitude changes with respect to these axes.

With the system 402 installed on a vehicle 10 (FIG. 8), the two antennas 405, 406 can provide angular orientations with respect to two axes. In the example shown, angular orientation with respect to the Y (heading) axis corresponds to vehicle roll and with respect to the Z (vertical) axis corresponds to vehicle yaw. These orientations are commonly of interest in agricultural vehicles whereby this is the preferred mounting and orientation arrangement for such applications. The vehicle's roll most adversely affects GNSS-measured vehicle cross-track error. By measuring the vehicle's roll, such cross-track errors can be compensated for or eliminated. Such roll-induced cross-track errors include variable roll errors due to uneven terrain and constant roll errors due to hill slopes. It will be appreciated that adding a third antenna provides three-axis (XYZ) attitude solutions corresponding to pitch, roll and yaw. Of course, reorienting the two-antenna system 402 can provide other attitude solutions. For example, locating the antennas' baseline (aligned with the rigid link 407) fore-and-aft along the vehicle's Y axis will provide pitch and yaw attitudes.

FIG. 7B shows the system 402 in a yaw attitude or condition whereby the vehicle 10 has deviated from a desired heading along the Y axis to an actual heading by a yaw angle $\theta_Y$. In other words, the vehicle 10 has rotated (yawed) clockwise with respect to the Z axis. FIG. 7C shows the system 402 in a roll attitude or condition whereby the vehicle 10 has deviated from level to a tilt or roll angle of $\theta_R$. In other words, the vehicle 10 has rotated (rolled) counterclockwise with respect to the Y axis.

The system 402 includes roll and yaw gyros 430, 440 mounted and oriented for detecting vehicle rotational movement with respect to the Y and Z axes. The system 402 represents a typical strap-down implementation with the vehicle 10, antennas 405, 406 and gyros 430, 440 rigidly connected and moving together. A body-fixed coordinate system is thus defined with the three perpendicular axes XYZ.

In all but the most extreme farmlands, the vehicle 10 would normally deviate relatively little from level and horizontal, usually less than 30° in most agricultural operations. This simplifies the process of calibrating the gyros 430, 440 using the GNSS attitude system 402 consisting of two or more antennas 405, 406. For simplicity, it is assumed that the body-fixed axes XYZ remain relatively close to level. Thus, the change in the heading (yaw) angle $\theta_Y$ of FIG. 7B is approximately measured by the body-fixed yaw gyro 440, even though there may be some small discrepancy between the axes of rotation. Similar assumptions can be made for the roll angle $\theta_R$ (FIG. 7C), which is approximately measured by the body-fixed roll gyro 430. A similar assumption could be used for measuring pitch attitude or orientation angles with a pitch gyro.

This simplifying assumption allows the gyros to be decoupled from one another during integration and avoids the necessity of using a full strap-down quaternion implementation. For example, heading deviation is assigned only to the yaw gyro 440 (gyro axis perturbations from the assumed level axis alignment are ignored). Similarly, vehicle roll is assumed to be measured completely by a single roll gyro 430. GNSS attitude-measured heading and roll can then be used to calibrate the gyros 430, 440. Such simplifying assumptions tend to be relatively effective, particularly for agricultural operations on relatively flat, level terrain. Alternatively, a full six-degrees-of-freedom strap-down gyro implementation with quaternion integration could be employed, but such a solution would normally be excessive and represent an ineffective use of computing resources, unless an inertial navigation system (INS) was also being used to backup GNSS, for example, in the event of GNSS signal loss.

For the purpose of calibrating the gyroscopes 430, 440, the angles measured by the GNSS attitude system 402 are used as truth in a Kalman filter estimator of gyro bias and scale factor errors. Over a small interval of time, T, the following equation holds:

$$\bar{\theta}_{gyro}T = A\theta_{true} + BT$$

Where
$\bar{\theta}_{gyro}$=average gyro reading over $$T = 1/n \sum_n \hat{\theta}_{gyro}$$

(with n readings taken over time T)
$\theta_{true}$=truth angular change over interval T as measured by the GNSS attitude system.
A=gyro scale factor error
B=gyro rate bias error A two state Kalman filter is defined to have the gyro rate basis and scale factor error as states. The Kalman process model is a first-order Markov:

$$X_{k+1} = \begin{bmatrix} 1 & 0 \\ 0 & 1 \end{bmatrix} X_k + \begin{bmatrix} \sigma_A & 0 \\ 0 & \sigma_B \end{bmatrix} W_k$$

where the state vector X=[A B]
Here $\sigma_A$ and $\sigma_B$ are noise amplitudes and W is white noise. This dictates what is known as a random walk of the state [A B]. The designer of the Kalman filter chooses $\sigma_A$ and $\sigma_B$ according to how rapidly the bias and scale factor errors are expected to vary (usually variations due to temperature dependencies of scale and bias in a low cost gyro). Typical variations, especially of the scale factor, are quite small (A and B are nearly constant), and $\sigma_A$ and $\sigma_B$ are chosen accordingly. Typical values for a low-cost gyroscope, using a time interval T are:

$$\sigma_A = \frac{0.02T}{1200}, \sigma_B = \frac{T}{1200}$$

where T is expressed in seconds and 1200 means 1200 seconds. For example, here the random walk is chosen to cause a drift in scale factor of 0.02 in 1200 seconds. The Kalman measurement equation is:

$$y = Hx + v$$

Where
y=$\bar{\theta}$T, H=[$\theta_{true}$ T] and v is measurement noise. The Kalman covariance propagation and gain calculation is designed according to well-known techniques.

Similar Kalman filters are deployed in both yaw and roll (and/or pitch) channels. The GNSS attitude devices 20 provides a reference yaw and roll that act as the Kalman measurements enabling the calibration of gyro rate basis and scale factor errors. The GNSS device provides heading and roll, even when the vehicle is stationary or traveling in reverse. This provides a significant advantage over single-antenna systems which provide a vehicle direction only when moving (i.e., a velocity vector). The multi-antenna attitude device 20 enables continuous calibration regardless of whether or not and in what direction the vehicle 10 is moving.

The calibrated gyros 430, 440 are highly advantageous in a vehicle steering control system. High precision heading and heading-rate produced by the calibrated yaw gyro is a very accurate and instantaneous feedback to the control of vehicle changes in direction. The angular rate produced by the gyro is at least an order of magnitude more accurate than the angular rate produced by pure GNSS systems, even those with multiple antennas. The system 402 is also very responsive. The feedback control needs such relatively high accuracy and responsiveness in heading and heading-rate to maintain control loop stability. It is well known that rate feedback in a control loop enhances stability. On a farm vehicle, where vehicle dynamics may not be fully known or modeled, this aspect is particularly important. The rate term allows a generic control system to be developed which is fairly insensitive to un-modeled vehicle dynamics. A relatively accurate heading and heading-rate-of-turn can be calculated for use in a vehicle automatic steering system.

Figure 8:
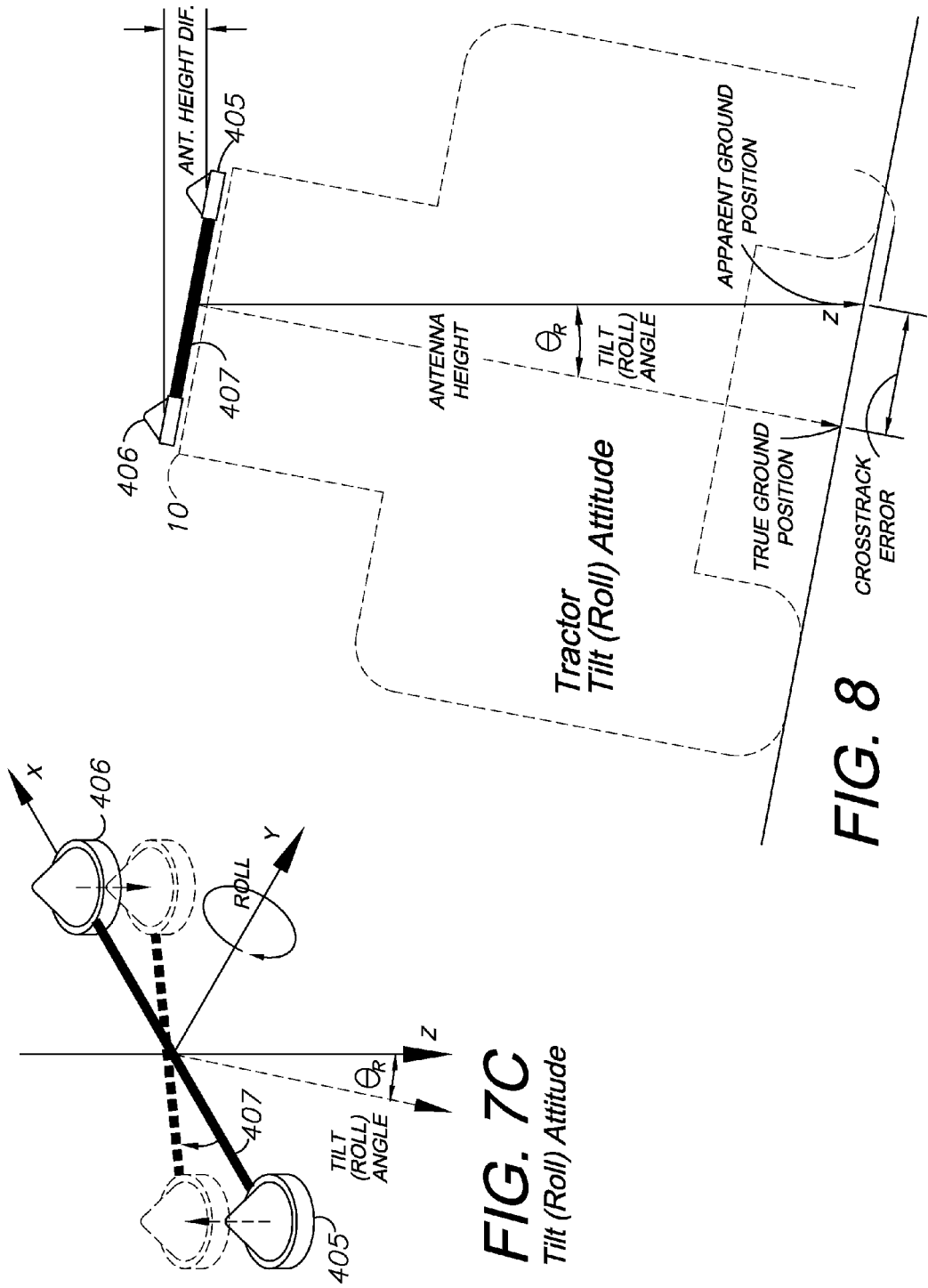
FIG. 8 depicts a tilt (roll) angle measuring application of the invention on an agricultural vehicle.

Another advantage of the system 402 is that a gyro calibrated to measure tilt angle can provide the vehicle's tilt much more accurately than a system relying exclusively on GNSS positioning signals. This advantage is particularly important in high-precision autosteering, e.g., to the centimeter level. Errors in GNSS attitude are effectively increased by the ratio of the antenna spacing to the mounted height of the antennas above the ground, as illustrated in FIG. 8, which shows an attitude system 402 comprising a pair of antennas 405, 406 connected by a link 407, as described above. The system 402 is shown tilted through a tilt (roll) angle $\theta_R$. An imaginary antenna height line perpendicular to the rigid link 407 is projected to the "true" ground position of the vehicle 10 in FIG. 8 and forms the roll angle with respect to the Z axis. The relative antenna height differential can be projected along the vertical Z axis to a ground intercept point and establishes a cross-track error (distance between the vehicle true ground position and the Z axis ground intercept point), whereby errors in the antenna height differential are amplified by the ratio of the rigid link 407 length to the antenna height. The spacing of the antennas 405, 406, which corresponds to the length of the rigid link 407, is typically limited by the width of the vehicle 10, which can be relatively tall, thereby resulting in a relatively large antenna height-to-spacing ratio, e.g., five-to-one. Furthermore, noise-induced errors present in GNSS relative antenna height differentials (e.g., carrier phase noise, etc.) will be multiplied by this ratio, which can cause steering errors, including steering oscillations, etc.

The GNSS attitude system 402 utilizes a roll gyro (e.g., 430) for measuring rate-of-change of the roll angle, rather than the absolute roll angle, which rate of change is integrated to compute absolute roll angle. The constant of integration can be initialized to the current GNSS-derived roll angle and then subsequently steered to the GNSS roll angle by filtering with a Hatch filter or similar filter used for smoothing the code phase against the carrier phase in the GNSS receivers. Relatively smooth vehicle roll estimates can thus be achieved with a gyro.

More specifically, in an exemplary embodiment, the filtering is supplemented by the equation:

$$\theta_{filter}(k) = \Delta_{gyro}(k) + \text{Gain} * [\theta_{GNSS}(k) - \theta_{filter}(k-1) - \Delta_{gyro}(k)]$$

$$\Delta_{gyro}(k) = \theta_{gyro}(k) - \theta_{gyro}(k-1)$$

Where $\theta_{filter}(k)$ is the desired output roll angle (at time k) smoothed by gyro roll angle, but steered to GNSS roll angle.

The GNSS roll (at time k) is GNSS $\theta_{GNSS}(k)$ while the raw gyro angular reading is $\theta_{gyro}(k)$ which is obtained by integrating gyro angular rate. The difference in gyro integrated rate over one time interval (k−1 to k) is denoted $\Delta$ gyro (k). The filter bandwidth and weighting of the GNSS roll angle into the solution is set by the filter's gain (denoted Gain). One method to choose the gain is to assign Gain=T/$\tau$ where T is the time span from epoch to epoch and $\tau$ is a time-constant, typically much larger than T. The smaller the Gain, the less the GNSS roll angle is weighted into the solution. The gain is chosen to give a smooth filtered roll output, dominated by the low gyro noise characteristics, but also maintaining alignment with GNSS roll. Since the gyro is calibrated in terms of its scale and bias errors per the methods described earlier, the gain can be chosen to be very small (much less than 1) and still the filtered roll angle closely follows the GNSS roll angle, but without the noise of the GNSS derived roll angle. Similar schemes can be deployed for pitch and heading angles if needed, all with the benefit of improved steering if such angles are used in the steering control feedback.

Figure 9:
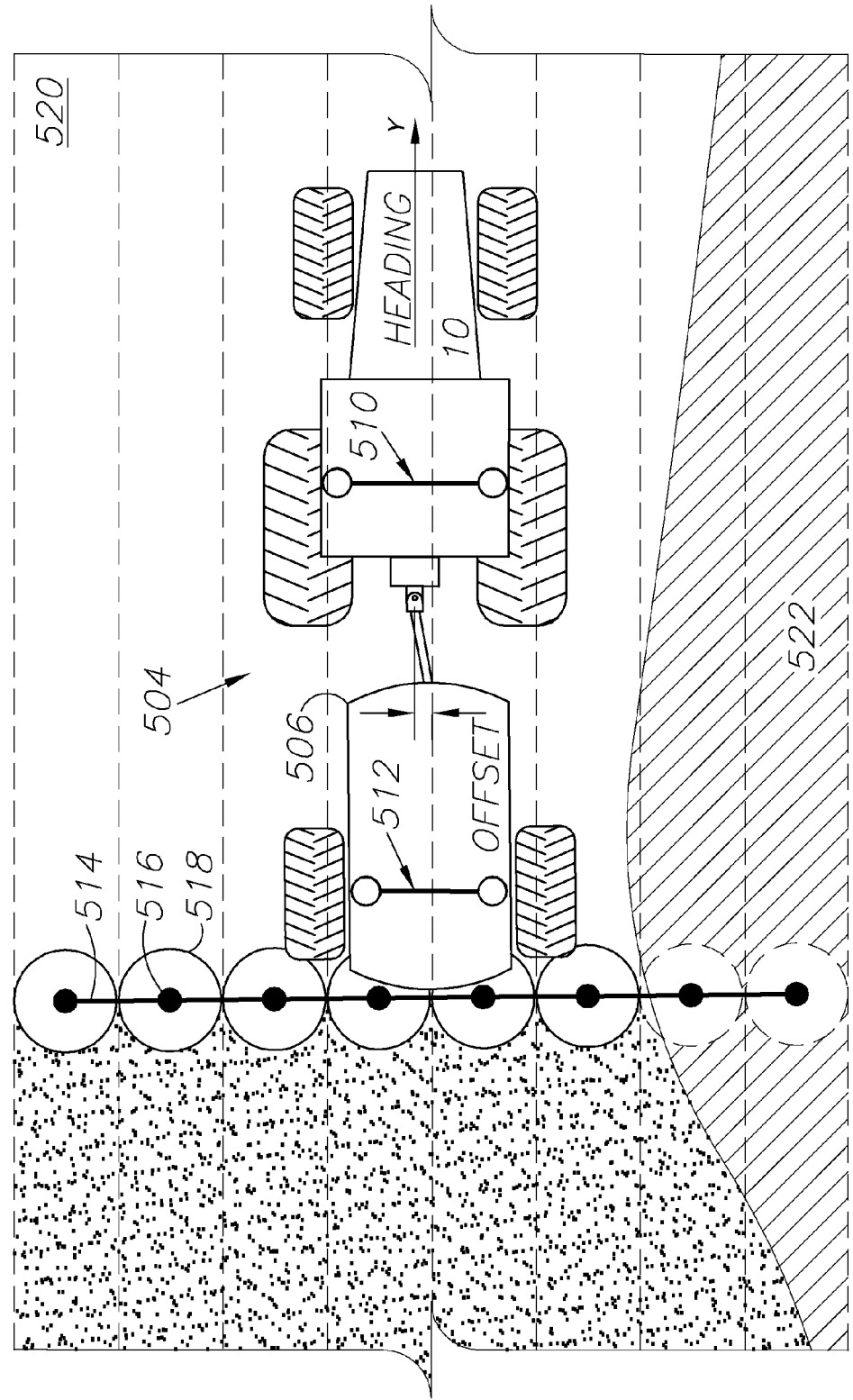
FIG. 9 depicts an alternative aspect of the system with antenna and gyroscope subsystems mounted on both the vehicle and the implement, e.g. a sprayer with selectively controllable spray nozzles.

FIG. 9 shows a GNSS and gyroscopic control system 502 comprising an alternative aspect of the present invention in a tractor and sprayer agricultural equipment application 504. The vehicle (e.g., a motive component or tractor) 10 is connected to a working component (e.g., a sprayer) 506 by an articulated connection 508, which can comprise a conventional tongue-and-hitch connection, or a powered, implement steering system or hitch, such as those shown in U.S. Pat. No. 6,865,465, No. 7,162,348 and No. 7,373,231, which are assigned to a common assignee herewith and are incorporated herein by reference.

The tractor 10 and the sprayer 506 mount tractor and sprayer GNSS antenna and gyroscope attitude subsystems 510, 512 respectively, which are similar to the system 402 described above and provide GNSS-derived position and attitude outputs, supplemented by gyro-derived rate of rotation outputs for integration by the control system 502. The sprayer 506 includes a spray boom 514 with multiple nozzles 516 providing spray patterns 518 as shown, which effectively cover a swath 520. The system 502 can be programmed for selectively controlling the nozzles 516. For example, a no-spray area 522 is shown in FIG. 9 and can comprise, for example, an area previously sprayed or an area requiring spray. Based on the location of the no-spray area 522 in relation to the spray boom 514, one or more of the nozzles 516 can be selectively turned on/off. Alternatively, selective controls can be provided for other equipment, such as agricultural planters wherein the seed boxes can be selectively turned on/off.

Figure 10:
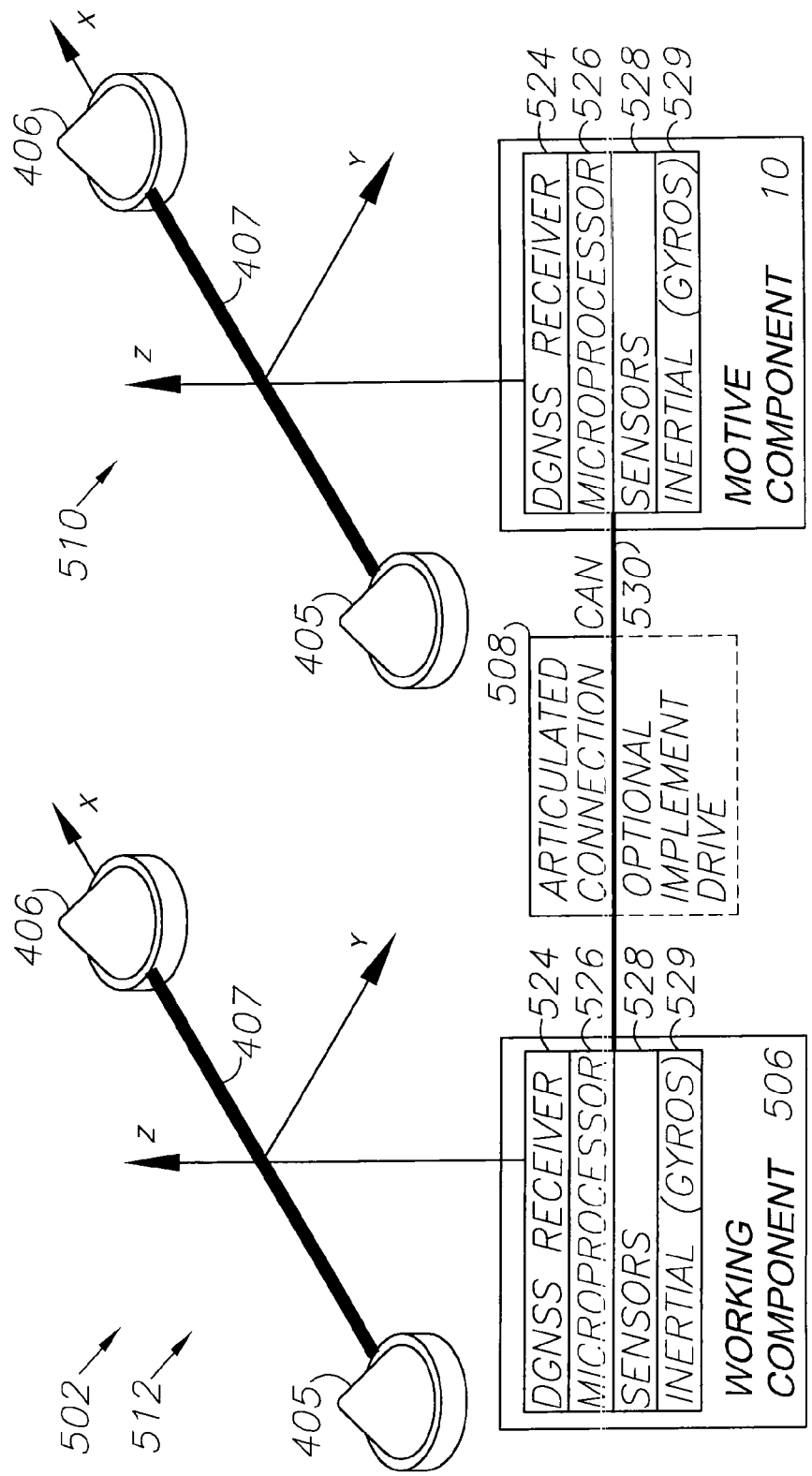
FIG. 10 depicts a block diagram of the system shown in FIG. 9.

FIG. 10 shows some of the major components of the system 502, including the GNSS antenna and gyroscope attitude subsystems 510, 512 with antennas 405, 406 separated by rigid links 407, as described above, and inertial gyros 514. The tractor and implement 10, 506 can be equipped with comparable systems including DGNSS receivers 524, suitable microprocessors 526 and the inertial gyros 529. Additional sensors 528 can include wheel counters, wheel turn sensors, accelerometers, etc. The system components can be interconnected by a CAN connection 530. Alternatively, components can be wirelessly interconnected, e.g., with RF transmitters and receivers.

In operation, the functions described above can be implemented with the system 502, which has the additional advantage of providing GNSS and gyro-derived positioning and attitude signals independently from the tractor 10 and the implement 506. Such signals can be integrated by one or both of the microprocessors 526. The tractor 10 can be automatically steered accordingly whereby the implement 506 is maintained on course, with the additional feature of selective, automatic control of the nozzles 516. For example, FIG. 9 shows the course of the tractor 10 slightly offset to the course of the sprayer 516, which condition could be caused by a downward left-to-right field slope. Such sloping field conditions generate roll attitudes, which could also be compensated for as described above. For example, the system 502 can adjust the output from the spray nozzles 516 to compensate for such variable operating conditions as sloping terrain, turning rates, tire slippage, system responsiveness and field irregularities whereby the material is uniformly applied to the entire surface area of the field. Moreover, the GNSS-derived positioning and heading information can be compared to actual positioning and heading information derived from other sensors, including gyros, for further calibration.

IV. Multi-Antenna High Dynamic Roll Compensation and Rover L1 RTK

Figure 11:
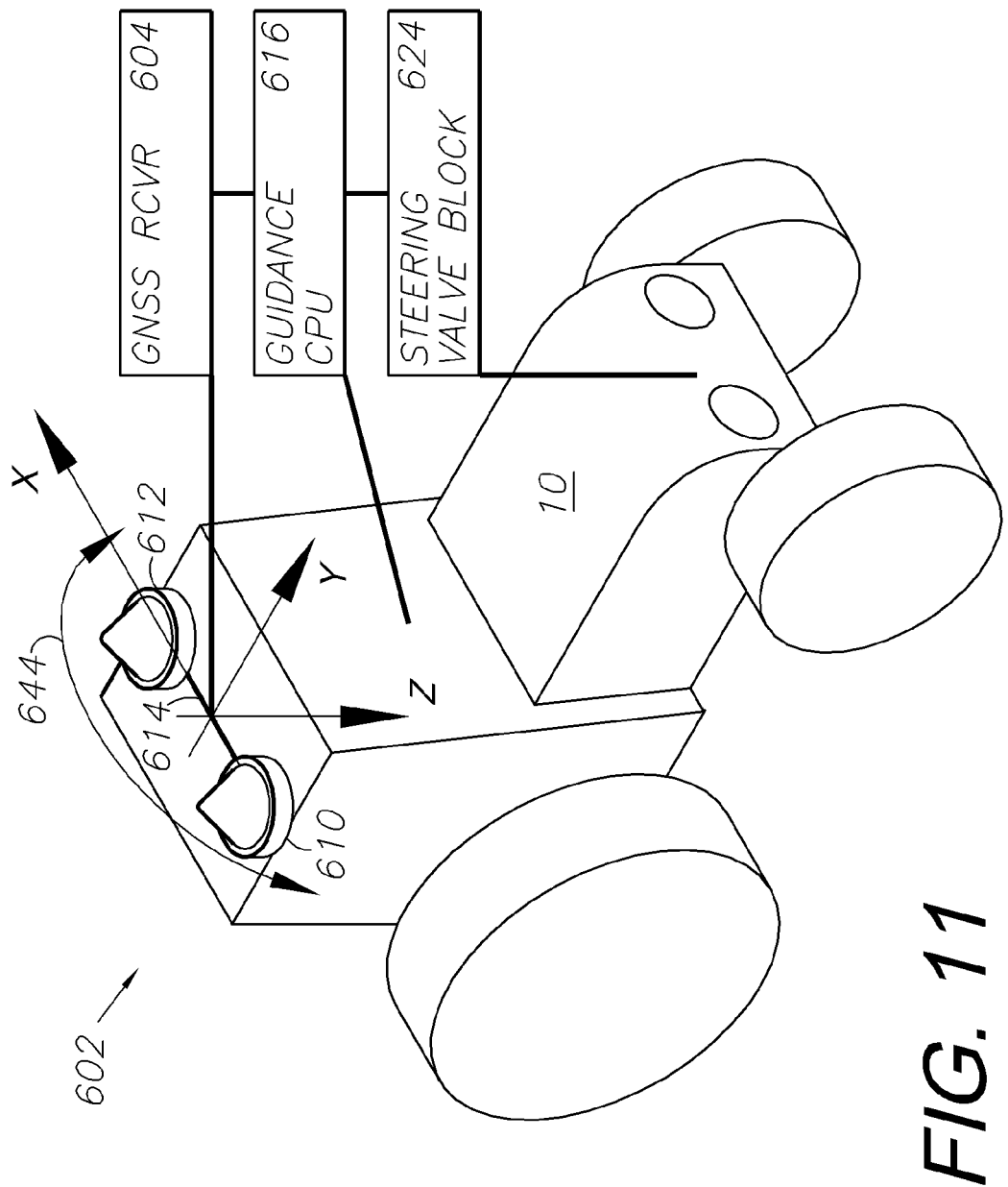
FIG. 11 depicts a high dynamic roll compensation GNSS guidance system comprising an alternative aspect of the present invention.
Figure 12:
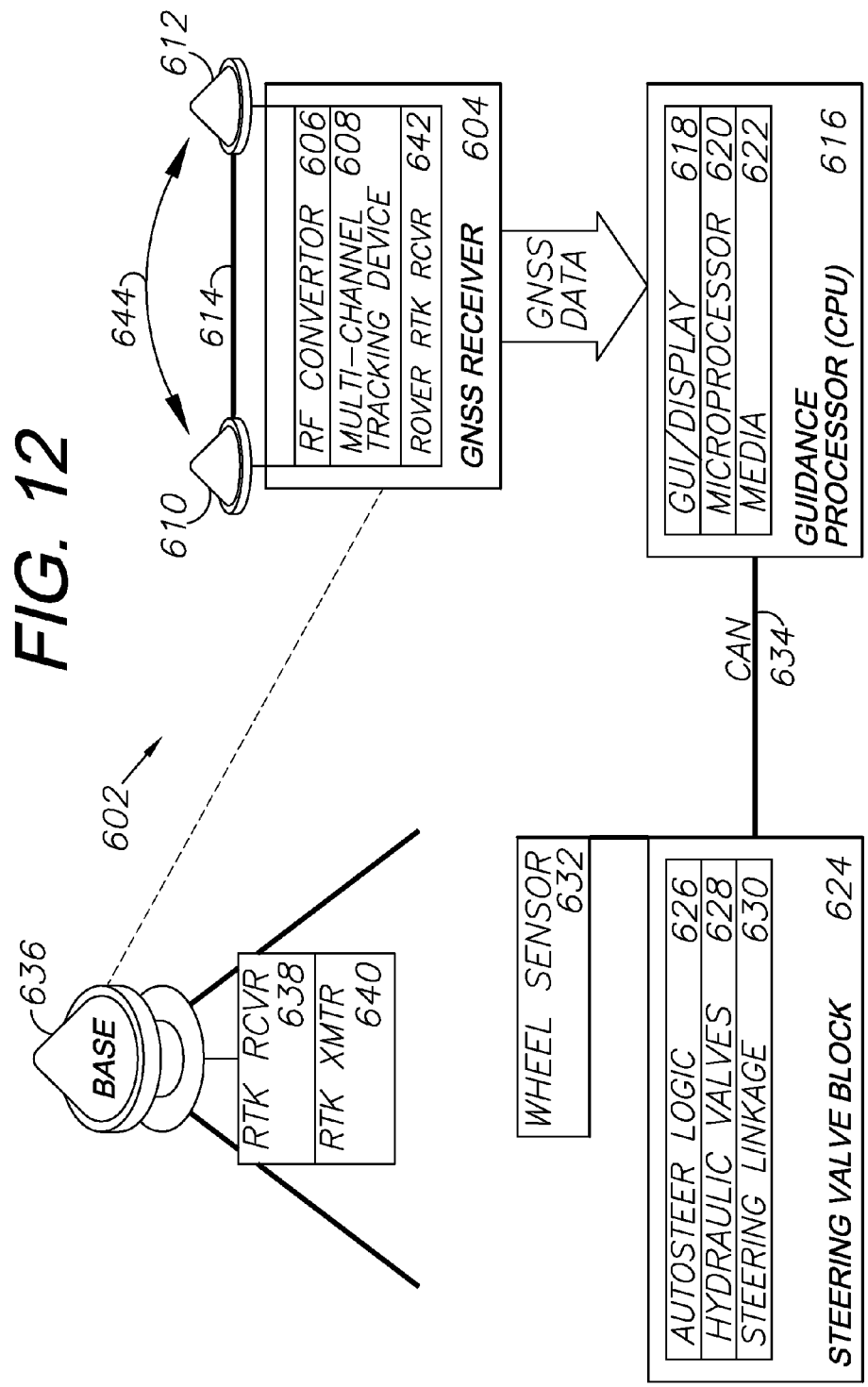
FIG. 12 depicts a block diagram of the system shown in FIG. 11.

Another alternative aspect GNSS guidance system 602 is shown in FIGS. 11 and 12 and provides high dynamic roll compensation, heading and rate-of-turn (ROT) in an RTK system including a GNSS receiver 604 including an RF converter 606 connected to a multi-channel tracking device 608 and first and second antennas 610, 612, which can be mounted on top of a vehicle 10 in fixed relation defining a tranverse (X axis) fixed baseline 614. The receiver 604 provides a GNSS data output to a guidance processor (CPU) 616, which includes a GUI/display 618, a microprocessor 620 and media (e.g., for data storage) 622. A steering valve block 624 includes autosteer logic 626, hydraulic valves 628 and steering linkage 630. A wheel sensor 632 is connected to the steering valve block 624, which in turn is connected to the guidance processor 616 by a suitable CAN bus 634.

GNSS positioning signals are received from a constellation of GNSS satellites and an RTK base transceiver 636, which includes a receiver 638 and a transmitter 640 for transmitting carrier phase signals to a rover RTK receiver 642. By using GNSS positioning signals from the satellites and correctional signals from the RTK base transceiver 636, the guidance system 602 can calculate a relatively accurate position relative to the base transceiver 636, which can be located at a predetermined position, such as a benchmark. The guidance system 602 described thus far is an RTK system utilizing a dual frequency receiver and is capable of achieving sub-centimeter accuracy using the carrier phase signals.

Roll compensation, heading and rate of turn can all be calculated using vector-based heading (yaw and roll) information derived from the rover GNSS receiver 604. High-dynamic vehicle roll is a problem with certain applications, such as agricultural vehicles, which traverse uneven terrain and tend to be relatively tall with antennas mounted three meters or more above ground level. Antenna arrays can swing significant distances from side to side with vehicle roll, as indicated by a roll arrow 644. Such deviations can be detrimental to precision farming, and require compensation. The fixed-baseline vehicle antennas 610, 612 provide the necessary dynamic vector outputs for processing and compensation by the steering valve block 624. For example, the microprocessor 620 can be preprogrammed to instantly respond to such roll errors by providing counteracting output signals via the CAN bus 634 to autosteer logic 626, which controls the hydraulic valves 628 of the steering valve block 624. A slight delay phase shift can be programmed into the microprocessor 620, thus reflecting the inherent lag between vehicle roll and the steering system reaction. The delay phase shift can be adjustable and calibrated for accommodating different equipment configurations. The GNSS receiver 604 output provides relatively accurate guidance at slow speeds, through turns and in reverse without relying on sensing vehicle motion via an inertial navigation system (INS), utilizing gyroscopes and/or accelerometers. Moreover, the guidance system 602 can eliminate the calibration procedures normally needed for INS-corrected systems.

The system 602 can likewise provide high dynamic yaw compensation for oscillation about the vertical Z axis using the two-antenna fixed baseline configuration of the receiver 604. Adding a third antenna would enable high dynamic compensation with respect to all three axes XYZ e.g., in a six-degrees-of-freedom mode of operation.

Providing multiple antennas 610, 612 on a rover vehicle 10 can significantly improve the ability to resolve integer ambiguities by first obtaining an attitude solution by solving for the locations of the rover antennas 610, 612 with respect each other. Then, using the non-relative locations and the known relative ambiguities, solving for the global ambiguities using observations taken at each antenna 610, 612. The number of observations is thus significantly increased over conventional RTK. Solving the global ambiguities enables locating the rover antennas 610, 612 in a global sense relative to a base station 636. Using multiple antennas in this manner enables using L1 single frequency receivers, which tend to be less expensive than dual frequency (L1 and L2) receivers, as in conventional RTK systems. An exemplary method consists of:

1. Transmitting code and carrier phase data from a base station 636 to a multiple antenna rover system (e.g., 602).
2. At the rover 602 side, determining the relative locations and the relative ambiguities of the multiple antennas using an attitude solution taking advantage of known geometry constraints and/or a common clock. Such a method is disclosed in U.S. Pat. No. 7,388,539, which is assigned to a common assignee herewith and is incorporated herein by reference.
3. Optionally store off the attitude solution (locations and ambiguities) for later time-tag matching with the data from the base station 636. Optionally, also store off the current GNSS observations (carrier phase) for the same purpose. Although this step is not necessary, time tag matching of base and rover data improves results by avoiding extrapolation errors.
4. Form single or double difference equations and solve for the global ambiguities using knowledge of the relative antenna locations and/or common clocks and/or the relative ambiguities.

Example using a two-antenna rover system (e.g., 602):

At antenna 1 (e.g., 610) of the rover, we can write the equation $$R1 = [A]x1 - N1,$$

where R1 is a carrier phase observation vector (single or double difference) at antenna 1,
A is a design matrix, X1 is the location vector of antenna 1 (may include clock if single differencing is used), and N1 is an ambiguity vector for antenna 1.
Similarly, at antenna 2 (e.g., 612) we can write $$R2 = [A]x2 - N2$$

Where R2 is a carrier phase observation vector at antenna 1, A is a design matrix, X2 is the location vector of antenna 2, and N2 is an ambiguity vector for antenna 2.

Note, that in this example, the design matrix A is taken to be the same in both antenna equations. But, this is true only if both antennas see the same satellites. A more general example would use separate A1 and A2 for the two equations.

Solving an attitude solution (for example, see U.S. Pat. No. 7,388,539), we find the relative antenna displacement V, and the relative ambiguity M where $$V = x2 - x1$$

and $$M = N2 - N1$$

Thus, combining the above equations, we have $$R1 = [A]x1 - N1$$

$$R2 = [A](x1 + V) - (N1 + M)$$

Rearranging gives $$R1 = [A]x1 - N1$$

$$R2 - [A]V + M = [A]x1 - N1$$

And, combining into a single vector equations gives $$R = [A]x1 - N$$

Where $$R = [R1, R2 - [A]V + M]^T \text{ and } N = [N1, N1]^T$$

Where 'T' denotes transpose

Referring to the above example, twice as many equations are obtained for the same number of unknowns (e.g. X1 and N1). Solving for the global integer ambiguity N1 is facilitated by the multiple available equations.

Multiple antennas can also be utilized at the base and would provide the advantage of canceling multipath signals. However, multiple antennas on the rover are generally preferred because they provide attitude for the rover 10, which is generally not of concern for the base 636.

V. Moving Baseline Vehicle/Implement Guidance Systems

Alternative embodiment multiple-antenna GNSS guidance systems are shown in FIGS. 13-18 and utilize a moving baseline between a vehicle-mounted antenna(s) and an implement-mounted antenna. Independent implement steering can be accomplished with a powered, implement steering system or hitch, such as those shown in U.S. Pat. No. 6,865,465, No. 7,162,348 and No. 7,373,231, which are assigned to a common assignee herewith and are incorporated herein by reference.

Figure 13:
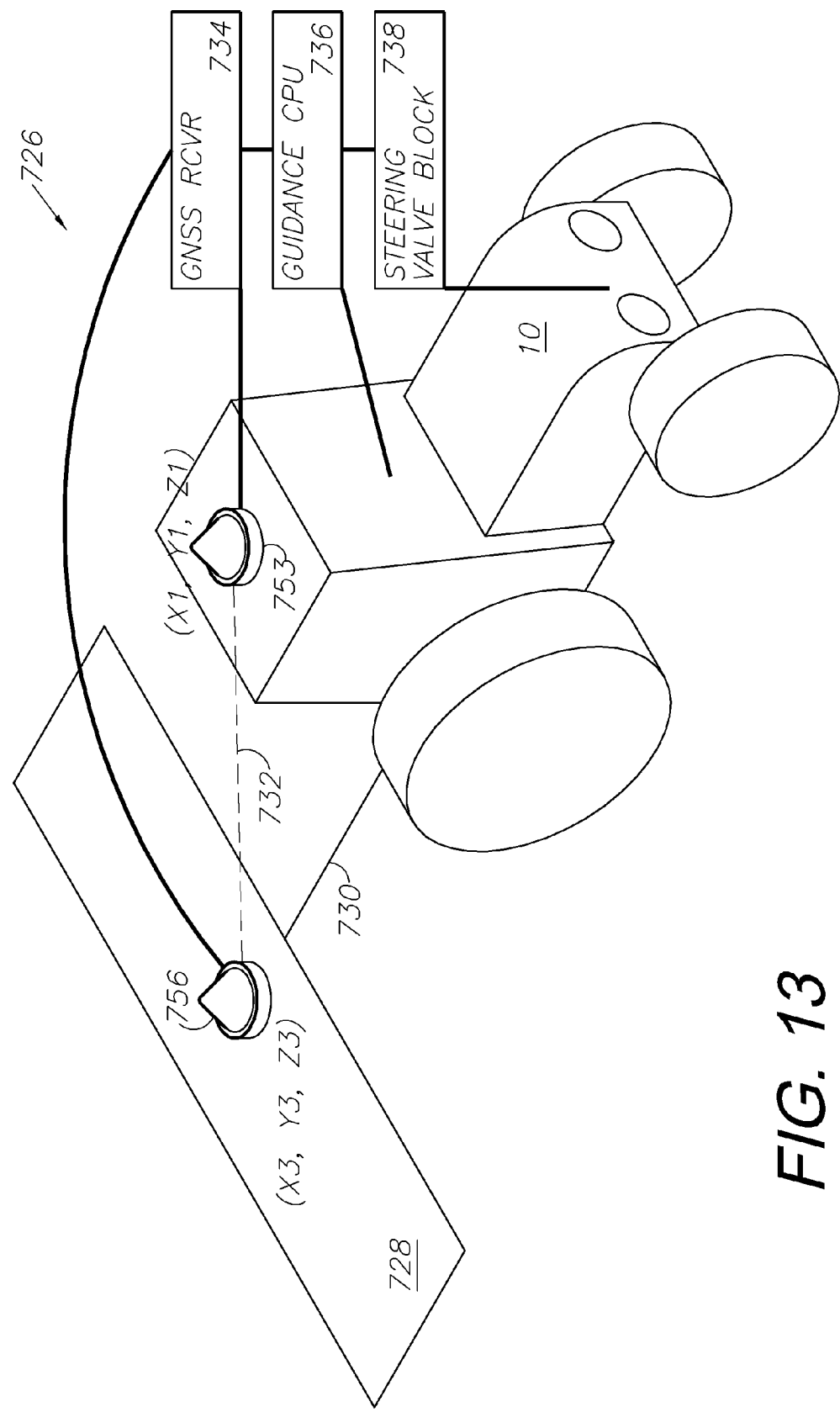
FIG. 13 depicts an alternative aspect of the present invention comprising a moving baseline GNSS system with the tractor and the implement each mounting a respective antenna for a 1+1 antenna configuration.
Figure 14:
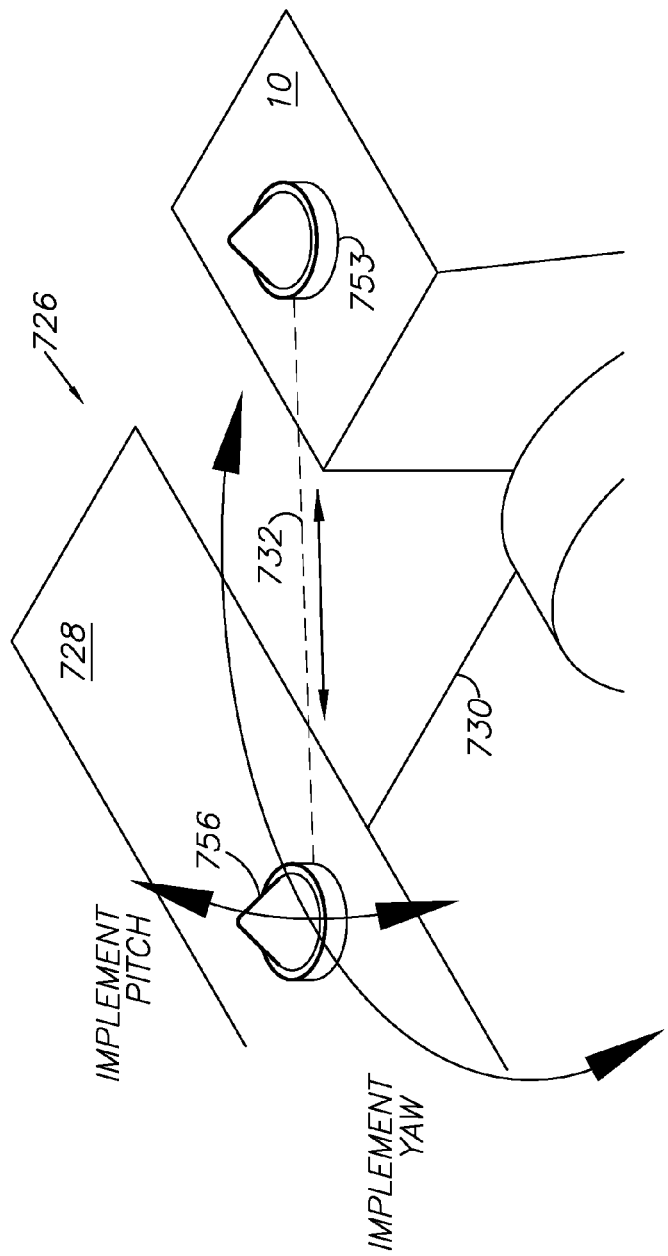
FIG. 14 depicts an enlarged, fragmentary view thereof, particularly showing implement yaw and pitch movements in connection with the moving antenna-to-antenna baseline.

FIGS. 13-14 show a GNSS guidance system 726 comprising another modified embodiment of the present invention and including a vehicle 10 connected to an implement 728 by a hitch 730. The hitch 730 permits the implement 728 to move through three axes of movement relative to the vehicle 10 as the system 726 maneuvers and traverses ground with irregularities causing the vehicle 10 and the implement 728 to yaw, pitch and roll somewhat independently of each other. A moving baseline 732 is defined between points on each, e.g., between a vehicle antenna 753 and an implement antenna 756. The moving baseline 732 is generally a 3D vector with variable length and direction, which can be derived from the differences between the vehicle antenna 753 location (X1, Y1, Z1) and the implement antenna location (X3, Y3, Z3), or other predetermined point locations on the vehicle 10 and the implement 728. The guidance system 726 includes a single GNSS receiver 734 (e.g., a single printed circuit board (PCB) receiver) receiving ranging data streams from the antennas 753, 756, which can include the normal front end RF downconverter components. Using the geodetic-defined position solutions for the antennas 753, 756, the moving baseline 732 is defined and used by a guidance CPU 736 in real-time for computing guidance solutions, which include steering command outputs to the steering valve block 738. The varying separation of the antennas 753, 756 occurs both at the start of attitude acquisition and during operation.

Figure 15:
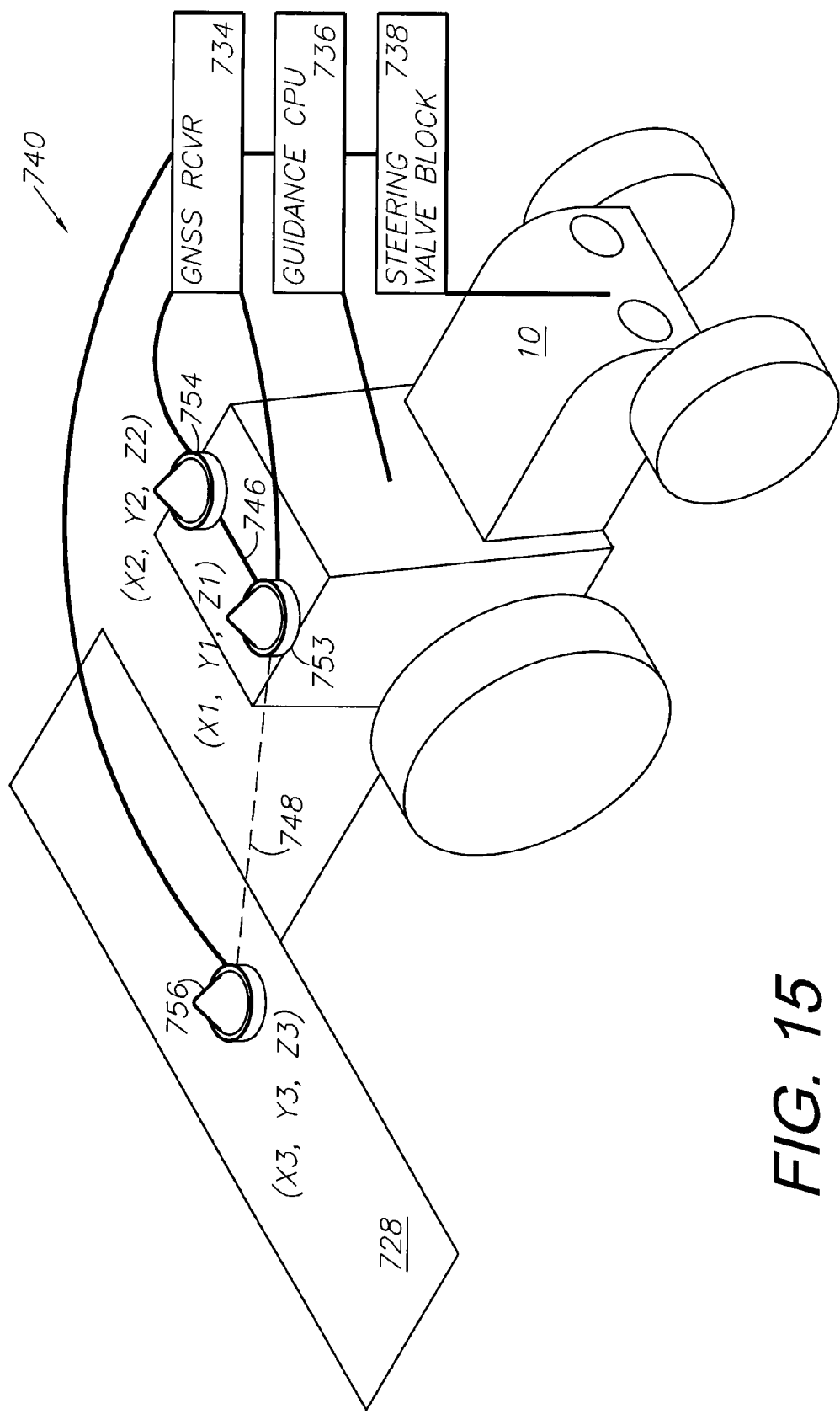
FIG. 15 depicts another moving baseline alternative aspect in a 2+1 antenna configuration.

FIG. 15 shows another alternative aspect vehicle/implement GNSS guidance system 740 with first and second vehicle antennas 753, 754, which can include front end down converter RF components providing ranging signal outputs, along with the implement antenna 756, to the single GNSS receiver 734 as described above. The vehicle antennas 753, 754 define a fixed baseline 754 by their respective positions (X1, Y1, Z1), (X2, Y2, Z2), which function to provide vector heading and rate-of-turn (ROT) output information. Such positioning data is input to the guidance CPU 736 by measuring yaw and roll attitudes whereby such guidance and performance information can be determined solely on GNSS-defined ranging data utilizing the fixed-relationship mounting of the vehicle antennas 753, 754 on the vehicle 10. Such information can be processed in connection with the implement antenna 756 position information in order to provide more complete GNSS positioning and guidance solutions, including travel paths for the vehicle 10 and the implement 728.

Figure 16:
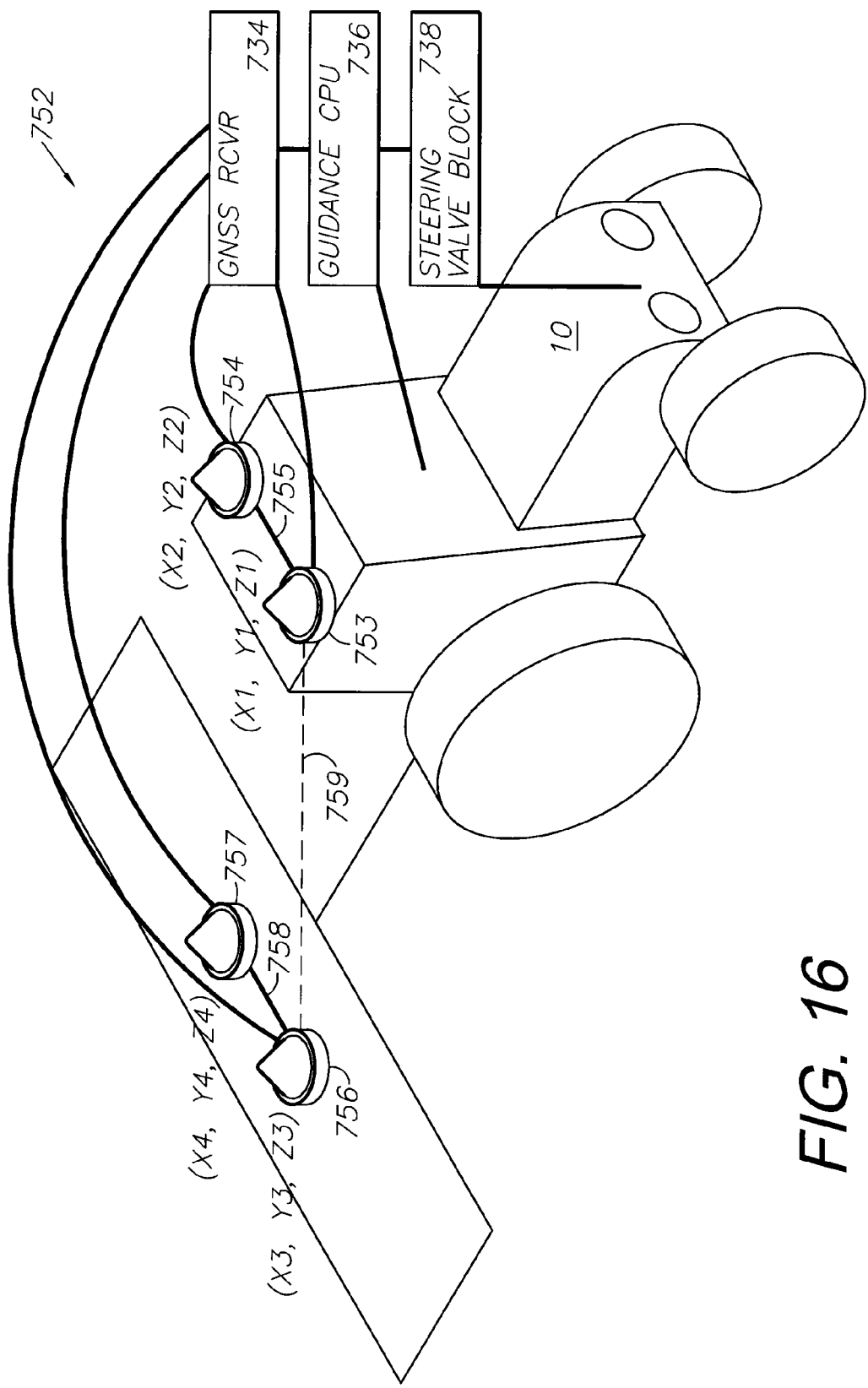
FIG. 16 depicts another moving baseline alternative aspect in a 2+2 antenna configuration.

FIG. 16 shows another modified aspect GNSS positioning system 752, which includes first and second vehicle antennas 753, 754 at GNSS-defined positions (X1, Y1, Z1), (X2, Y2, Z2) respectively, which positions define a vehicle fixed baseline 755. The implement 728 includes first and second implement antennas 756, 757 at GNSS-defined positions (X3, Y3, Z3), (X4, Y4, Z4) respectively, which define an implement fixed baseline 758 and from which the guidance CPU 736 determines heading and ROT for the implement 728 using similar vector techniques to those described above. A movable baseline 759 can be defined between a vehicle antenna 753 and an implement antenna 756 as shown, or between other corresponding antenna pairs, or other predetermined locations on the vehicle 10 and the implement 728. The system 752 utilizes a single GNSS receiver 734 receiving input ranging information from the four antennas 753, 754, 756, 757 and providing a single output stream to the guidance CPU 736. It will be appreciated that various other antenna/receiver combinations can be utilized. For example, a third vehicle and/or implement antenna can be provided for 3-axis attitude computation. INS components, such as gyroscopes and/or accelerometers, can also be utilized for additional guidance correction, although the systems described above can provide highly accurate guidance without such INS components, which have certain disadvantages.

Figure 17:
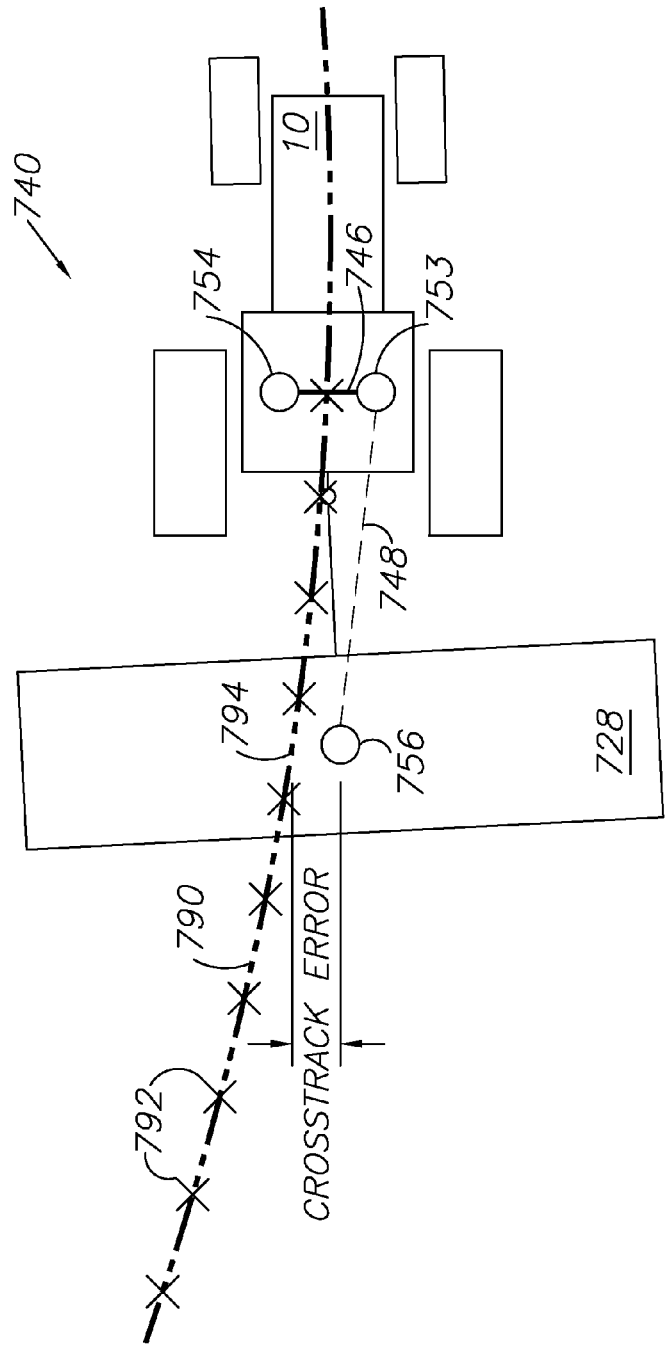
FIG. 17 depicts the 2+1 moving baseline system in a contour mode of operation with a multi-position tail.

FIG. 17 shows the 2+1 antenna system 740 operating in a guidance mode whereby a predetermined number of positions 790 at predetermined intervals are retained by the guidance CPU 736, thereby defining a multi-position "breadcrumb" tail 792 defining the most recent guidepath segment traversed by the vehicle 10 based on the locations of the vehicle antenna(s) 753 (754). Although the 2+1 antenna guidance system 740 is used as an example, the 1+1 antenna guidance system 726 and the 2+2 guidance system 752 can also be used in this mode and function in a similar manner, with more or less ranging signal sources. The guidance CPU 736 utilizes the retained tail "breadcrumb" positions 790 in conjunction with the GNSS-derived antenna locations for computing a crosstrack error representing implement 728 deviation from a desired guidepath 794, and the necessary steering signals for correcting the vehicle 10 course to maintain the implement 728 on track. Still further, in a multi-position tail 792 operating mode the high dynamic roll compensation function described above can be utilized to compensate for vehicle and/or implement roll using the fixed baseline(s) 746, 755, 758 for further guidance solution accuracy based solely on GNSS ranging information.

With the systems 726, 740 and 752, a single receiver can be used for achieving carrier phase relative accuracy, even without differential correction. A single clock associated with the receiver facilitates ambiguity resolution, as compared to dual receiver and dual clock systems. Direct connections among the components further enhance accuracy and facilitate high dynamic roll corrections, as described above. Continuous base and rover ranging data are available for positioning and control. With the 2+1 and the 2+2 configurations, the fixed baseline(s) provide heading and ROT guidance for the vehicle and/or the implement. Steering control for the vehicle is derived from crosstrack error computations utilizing the multiposition tail 792.

Figure 18:
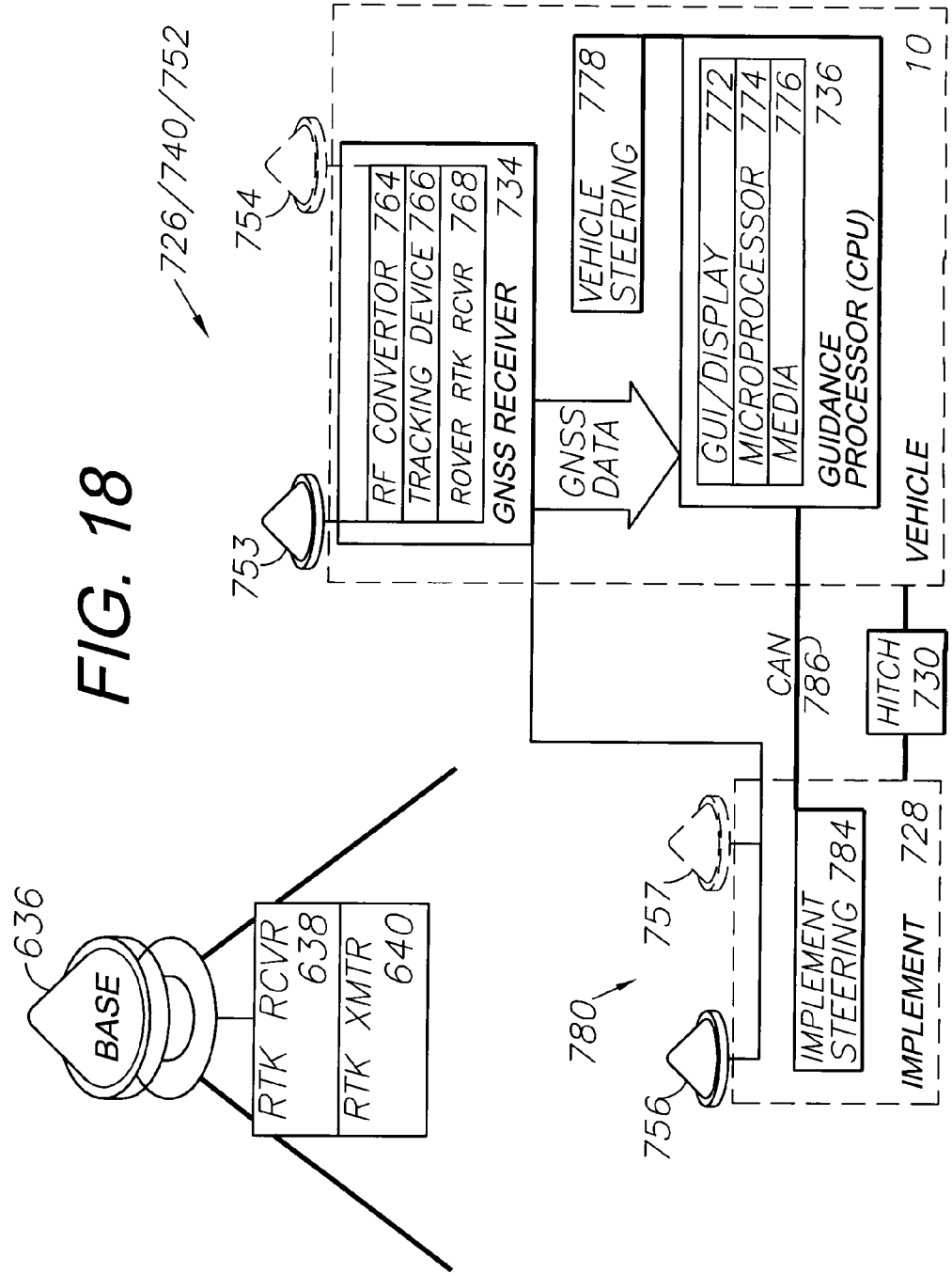
FIG. 18 depicts a block diagram of the moving baseline system(s).

FIG. 18 is a schematic block diagram showing the components of the GNSS guidance systems 726, 740 and 752. The vehicle 10 components include a GNSS receiver 734 including a first vehicle antenna 753, an optional second vehicle antenna 754, an RF down converter 764, a tracking device 766 and an optional rover RTK receiver 768. A guidance processor CPU 736 includes a GUI display 772, a microprocessor 774 and a media storage device 776. Vehicle steering 778 is connected to the guidance processor CPU 736 and receives steering commands therefrom. GNSS-derived data is transferred from the GNSS receiver 734 to the guidance processor CPU 736. The implement 728 mounts an implement positioning system 780 including a first implement antenna 756 and an optional second implement antenna 757, which are connected to the vehicle GNSS receiver 734 and provide GNSS data thereto. An implement steering subsystem 784 receives steering commands from the guidance processor CPU 736 via a CAN bus 786. The implement 728 is mechanically connected to the vehicle 10 by a hitch 788, which can be power-driven for active implement positioning in response to implement steering commands, or a conventional mechanical linkage. The hitch 788 can be provided with sensors for determining relative attitudes and orientations between the vehicle 10 and the implement 728.

VI. Multi-Vehicle GNSS Tracking Method

Figure 19:
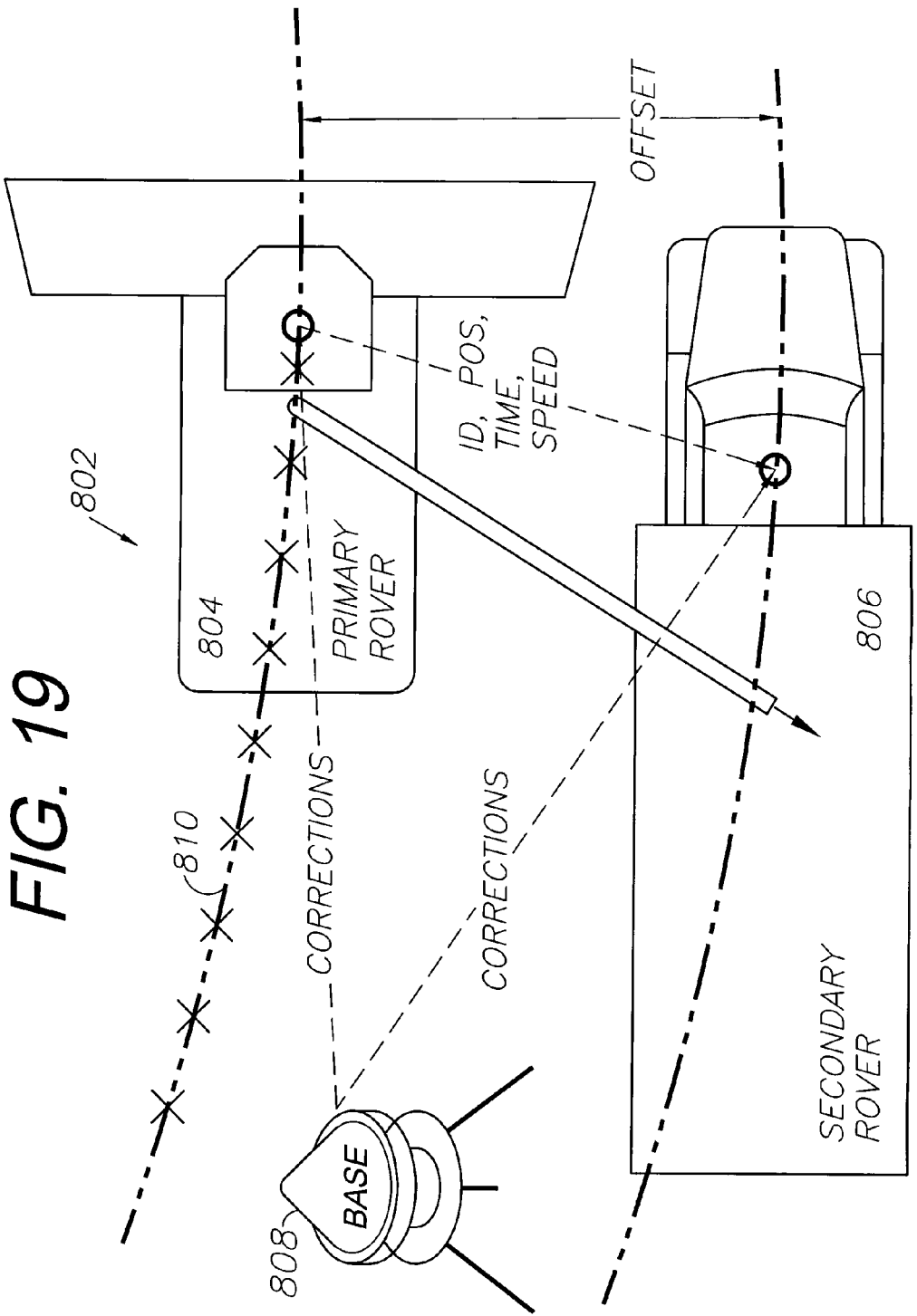
FIG. 19 depicts a multi-vehicle GNSS relative guidance system including primary and secondary rovers.

FIG. 19 shows a multi-vehicle GNSS tracking system 802 adapted for tracking primary and secondary rover vehicles 804, 806, which can comprise, for example, a combine and an offloading truck. Other exemplary multi-vehicle combinations include crop picking and harvesting equipment, snowplows, aircraft engaged in mid-air refueling, etc. Data transfer among the vehicles 804, 806 and a base transceiver 808 can be accomplished with short-range radio links, such as Bluetooth and Wi-Fi wireless technologies. For example, the base transceiver 808 can transmit corrections to the rovers 804, 806 at predetermined intervals of one second (i.e., 1 Hz).

Between the base transmissions the primary rover 804 can transmit its identifying information (ID) and GNSS-derived position and timing information to the secondary rover 806. The secondary rover 806 thus receives both differential corrections and the primary rover data over the same radio link, or through an additional radio link. Such data can comprise a multi-position tail 810 as described above and against which the secondary rover 806 can guide. For example, the secondary rover 806 can directly follow the primary rover 804 at a predetermined distance by aligning its travel path with the multi-position tail 810 at a predetermined following distance, or it can offset its own parallel travel path a predetermined offset distance, as shown in FIG. 19. The secondary rover 806 can position itself relative to the primary rover 804 based on either a predetermined time interval or a predetermined separation distance. As discussed above, the multi-position tail 810 can automatically update whereby only a predetermined number of detected positions are stored, which can correspond to a predetermined time duration or distance behind the primary rover 804.

Figure 20:
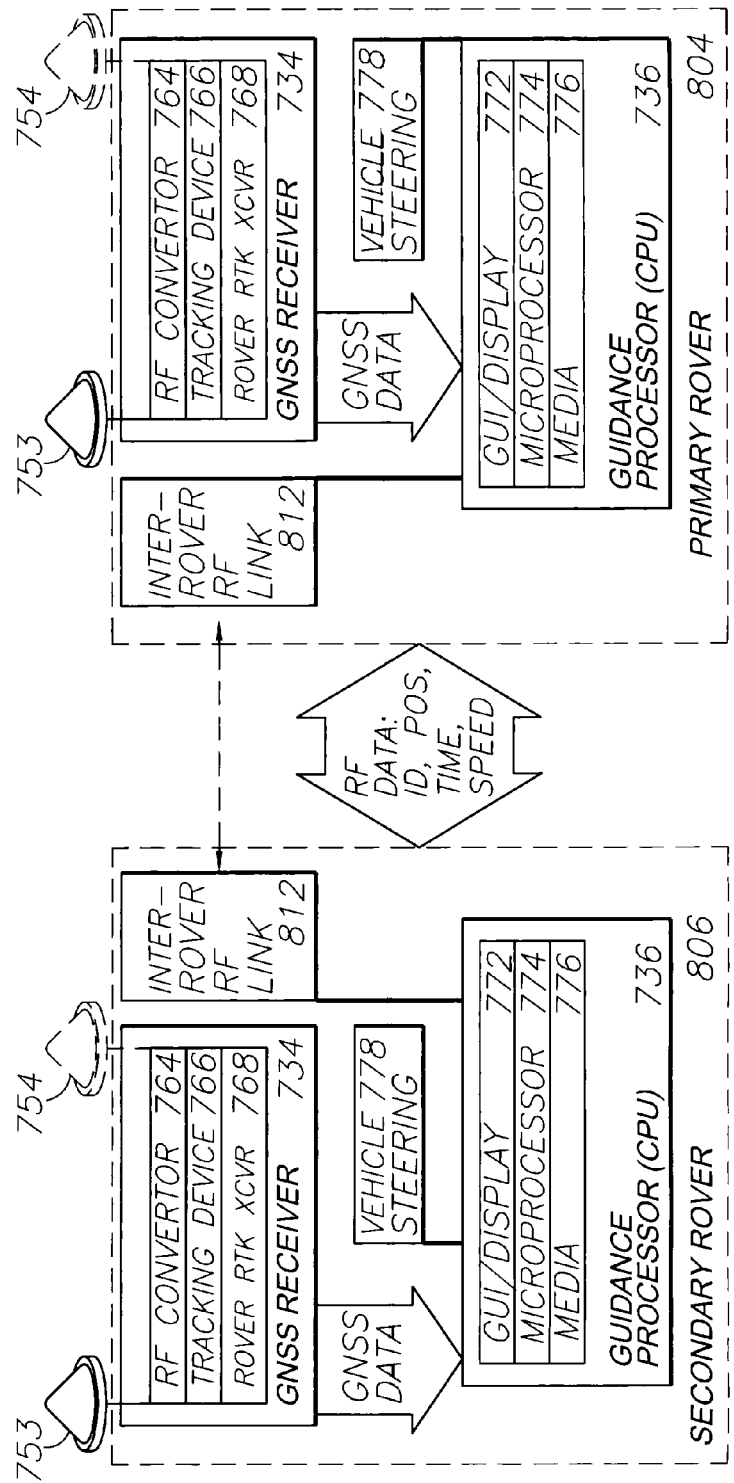
FIG. 20 depicts a block diagram of the system shown in FIG. 19.

FIG. 20 shows a schematic block diagram of components comprising the multi-vehicle tracking system 802. The onboard systems for the primary rover 804 and the secondary rover 806 can be similar to the vehicle-based GNSS guidance systems described above, with the addition of an inter-rover radio link 812.

VII. Earth-Moving Machine Control System 1002

In another alternative embodiment, a multi-antenna GNSS positioning and guidance control system 1003 is combined with various sensors on a piece of excavation equipment 1004 to form a GNSS positioning and guidance excavation system 1002. Without limitation on the generality of useful applications of the system 1003, an excavator 1004 is shown as an example of earth-moving equipment which can benefit from the present invention. Other suitable earth-moving examples include, without limitation, backhoes, loaders, bulldozers, trenching machines and road (motor) graders.

Using GNSS positioning and guidance control can improve accuracy over manual control in typical earth-moving tasks. The positioning and guidance system 1002 can be geo-referenced based on a digital terrain map established prior to working a piece of land. Positioning in relation to a predetermined geodesic reference system is generally based on "absolute" coordinates, which can be determined using GNSS-based ranging measurements. Alternatively, "relative" positioning can be based on a site-specific benchmark position set by positioning the bucket 1010 of an excavator 1004 at a stake 1024 (FIG. 23) and programming a desired elevation level based on the X, Y and Z coordinates of the stake. Further operations are based on absolute GNSS-defined coordinates in the geo-referenced operating mode, or relative coordinates in the machine-referenced mode. Of course, the relative coordinates can be converted to absolute coordinates using, for example, an absolute position of a benchmark or monument reference point.

Figure 21:
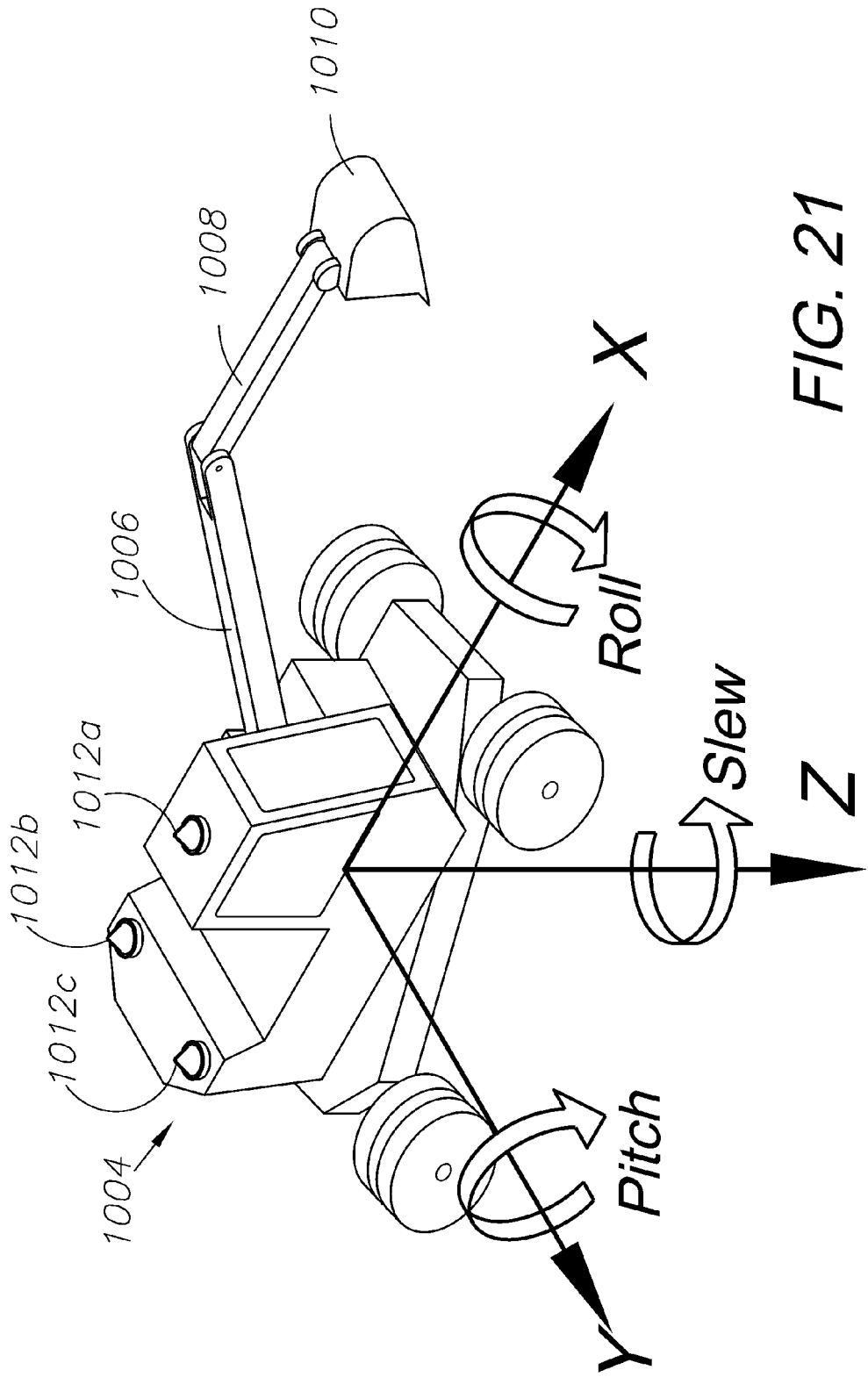
FIG. 21 is an isometric diagram of an excavator with a GNSS machine control system comprising another alternative embodiment of the present invention in an earthmoving equipment application, the excavator including three axes and three rotational movements around the axes.

FIG. 21 shows the excavator 1004 equipped with an articulated arm comprised of a hingedly connected boom 1006, a stick 1008 and a bucket 1010. FIG. 21 demonstrates the six possible directions of movement the GNSS system can detect, including roll, pitch and slew (comparable to yaw) rotation about the X, Y, and Z axes respectively. The system 1002 can be programmed for XYZ axial orientations in various combinations and directions with respect to the equipment 1004, of which the XYZ rotational axes orientation shown in FIG. 21 is one example. Three antennas 1012$a,b,c$ are located on the body of the excavator 1004 for 3D attitude determinations by comparing the GNSS-defined locations of the antennas 1012$a,b,c$ relative to each other. Three or more antennas 1012 enable measuring movements in the six possible directions mentioned above using GNSS ranging measurements. Inertial gyro and accelerometer sensors can supplement the GNSS signals, or provide position and attitude solutions with one or two antennas.

Figure 22:
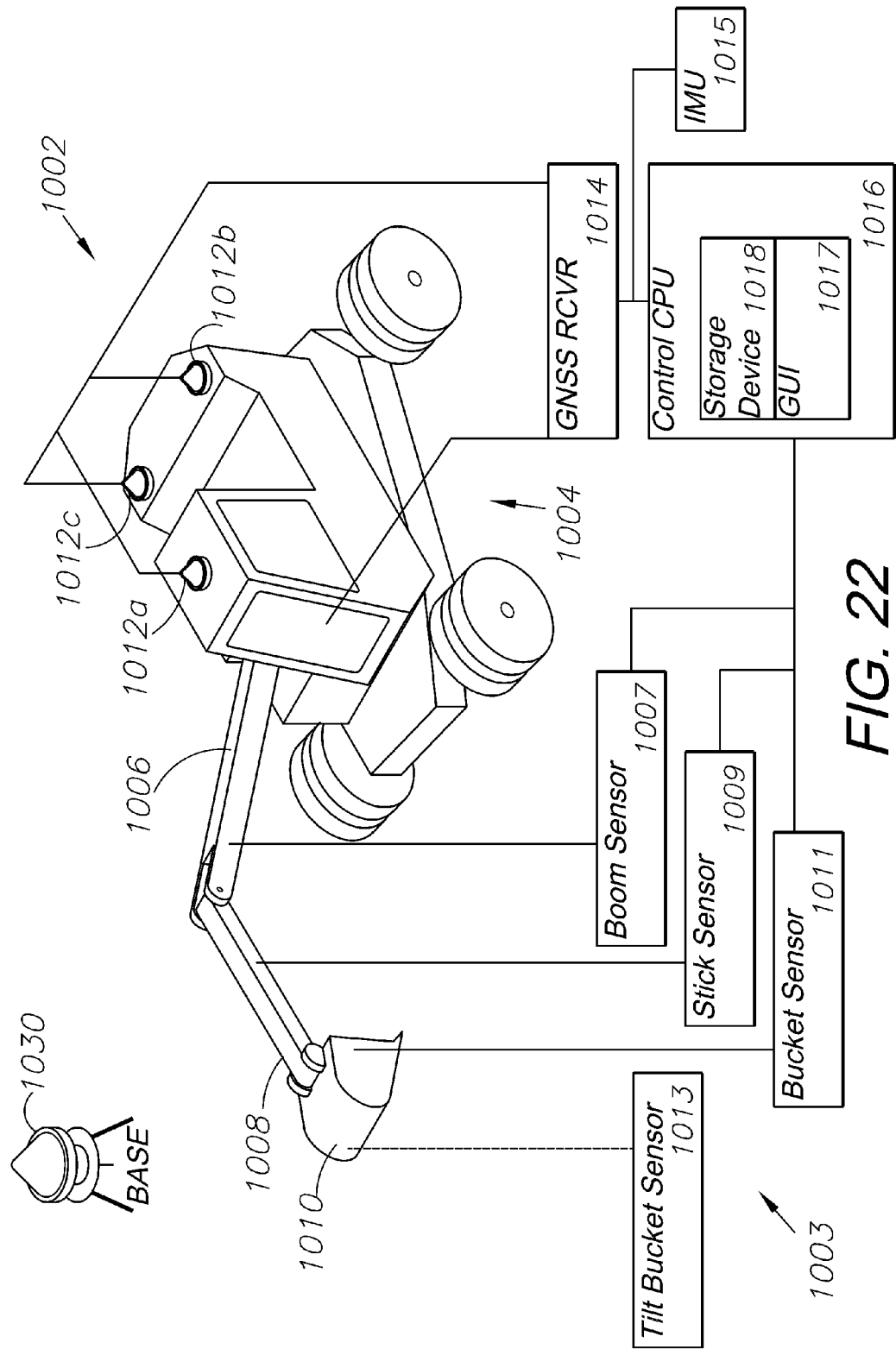
FIG. 22 is an isometric diagram of the excavator with a block diagram of the major components.

FIG. 22 shows the excavator 1004 with various sensors and a GNSS-based machine control system 1003. The system 1003 is comprised of typical GNSS elements, such as three antennas 1012, a GNSS receiver 1014, a guidance CPU 1016 which is capable of calculating positional data received by the receiver along with other necessary computations, and a storage device 1018 contained within the guidance CPU 1016 for storing position data, pre-created terrain maps, and other necessary data. The control CPU is connected to a graphical user interface (GUI) 1017 located within the cab. A base GNSS receiver and transmitter (transceiver) 1030 can be located at a predetermined, known location for operating in a differential GNSS (DGNSS) mode, which can significantly improve positioning accuracy. The control system 1003 can also be configured for and operate in a real-time kinematic (RTK) mode. A multiple-antenna (base and rover) system and method for vehicle guidance and machine control are shown in co-pending U.S. Patent Application Ser. No. 12/857,298, which is assigned to a common assignee herewith and is incorporated herein by reference. Without limitation on the generality of useful antenna and receiver configurations, the A220 and A320 (rover) and A221 (base) "smart" antennas and the Crescent® (single frequency) and Eclipse™ (dual frequency) receivers available from AgJunction LLC of Hiawatha, Kans. are suitable for use in the control system 1003.

The excavator 1004 further includes an implement arm 1005 comprised of a boom 1006, a stick 1008 and a bucket 1010, each of which includes a respective articulation sensor 1007, 1009, 1011. Each of the articulation sensors measures the absolute angle of itself (i.e., boom 1006, a stick 1008 and a bucket 1010) relative to the plane of its orientation/installation (assuming single axis sensor) and the gravitational vector. The output signals from the articulation sensors 1007, 1009, 1011 are processed and combined in the control CPU 1016 with other orientation information, such as the output from other machine angle sensors, the GNSS receiver 1014 and the IMU 1015 for computing a complex position/orientation/attitude solution for the excavator 1004, including solutions for its individual articulated components of interest, in relation to a specific grading plan, GIS database or other project information source. For example, the bucket 1010 can be pivotable on multiple axes for greater control and flexibility, with such pivoting movements actuating additional sensors for monitoring and controlling the 3-D position and attitude of the bucket 1010. Still further, additional GNSS antennas can be located on components of the implement arm 1005 for locational data, either absolute or in reference to the equipment 1004.

The guidance CPU 1016 determines the Z coordinate of the excavator 1004 using the onboard GNSS positioning system. Because there are at least three antennas 1012a,b,c located on the excavator 1004, the guidance CPU 1016 also detects the instantaneous pitch, roll and slew of the excavator 1004. The sensors 1007, 1009, 1011 located on the articulated arm 1005 are electrically connected to the guidance CPU 1016 and provide the additional data necessary for the guidance CPU 1016 to determine the position (including elevation) and attitude of the bucket 1010. Additional sensors can be employed for determining other equipment relationships, such as bucket 1010 orientation with respect to 3 axes for buckets and other articulated tools movable with respect to multiple axes. This is necessary because the bucket 1010 performs the digging and measuring functions necessary to determine whether the task of cutting or filling is complete. By placing the bucket 1010 on grade or beneath the ground level, the guidance CPU 1016 can determine whether the desired ground-level elevation has been reached.

Figure 23:
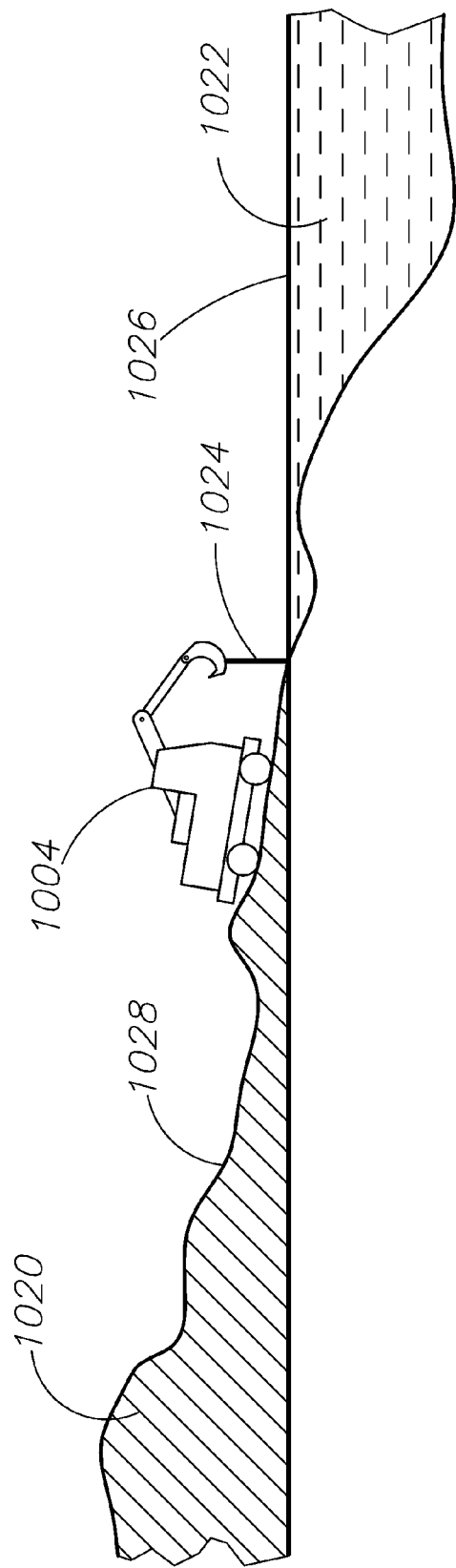
FIG. 23 is a vertical cross-section of a job site with the excavator, and showing volumes of earth to be cut or filled to reach a desired elevation.

FIG. 23 shows a cross-sectional view of an excavator 1004 located on a sloped piece of land. The current existing or original ground line 1028 denotes where the soil surface exists prior to performing earth-moving tasks. FIG. 23 also shows a cut zone 1020 and a fill zone 1022. These zones are determined based on the desired design elevation line 1026. This design elevation line 1026 can be predetermined prior to performing excavation on the site. A design elevation 1026 can be chosen for a number of reasons, such as drainage or soil type. Soil above this design elevation 1026 is designated as a cut zone 1020, and the volume located below the design elevation 1026 is designated as a fill zone 1022.

The design elevation 1026 can be established in a number of different ways. First, the design elevation 1026 may be set by creating a terrain map prior to performing any work on the site. This terrain map can be a three dimensional guidance map that is stored in the GNSS storage device 1018 connected to the guidance CPU 1016. The terrain map contains the desired elevations (Z coordinates) for a particular site, where the site is defined by the X and Y coordinates in a horizontal plane. The GNSS guidance system will then guide the excavator 1004 around the site, designating what areas need to be cut or filled, depending on the design elevation 1026.

Alternatively, the relative design elevation 1026 can be defined in relative terms based on a benchmark such as a stake 1024 placed somewhere on the site at the desired design elevation 1026. If the entire site must be cut, the guidance CPU 1016 can take this into account and define the design elevation 1026 at an elevation below the stake 1024. A similar correction can be applied if the entire site is to be filled.

Figure 24A:
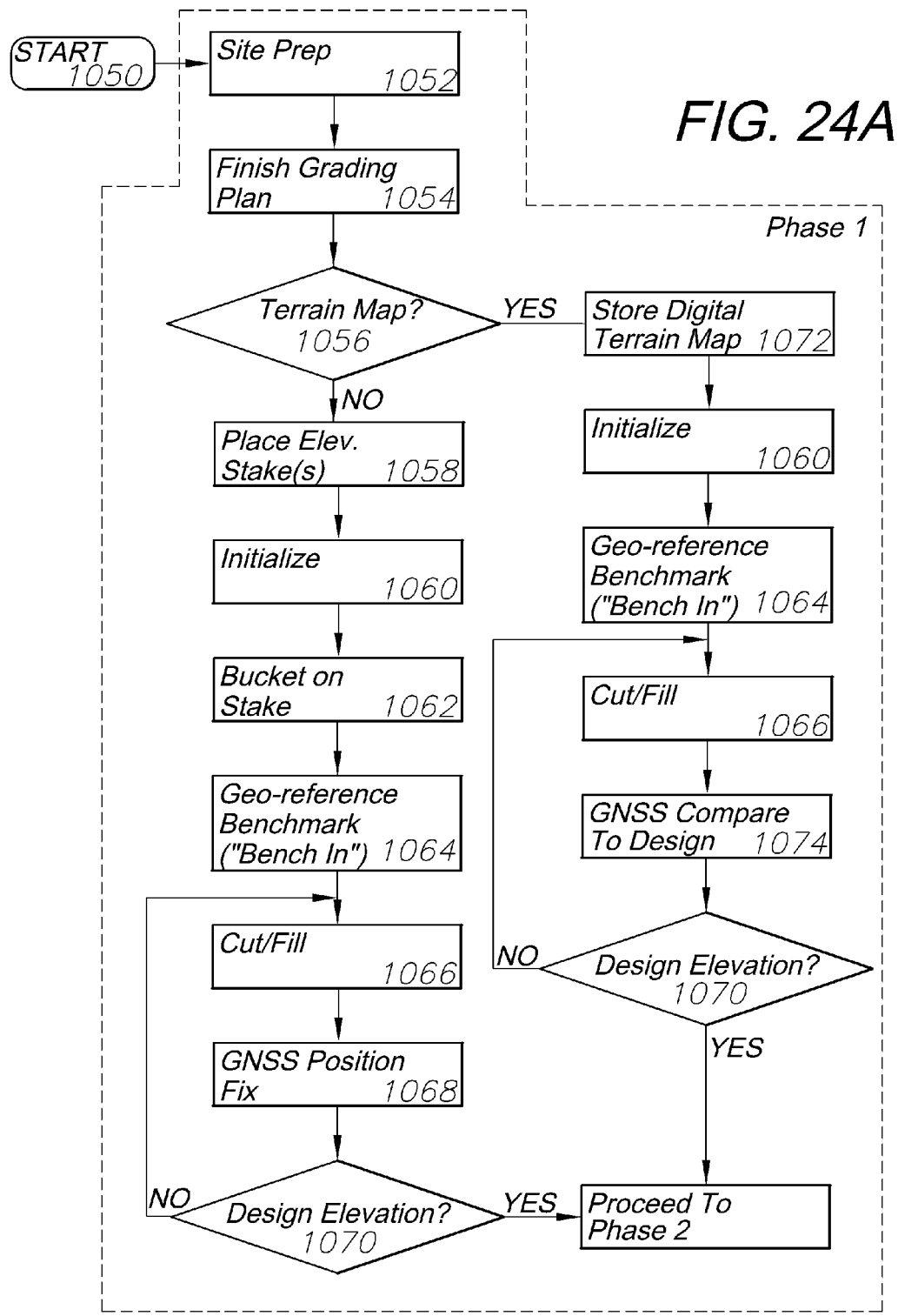
FIGS. 24A and 24B are phases I and II of a flowchart showing a method of an embodiment of this invention.
Figure 24B:
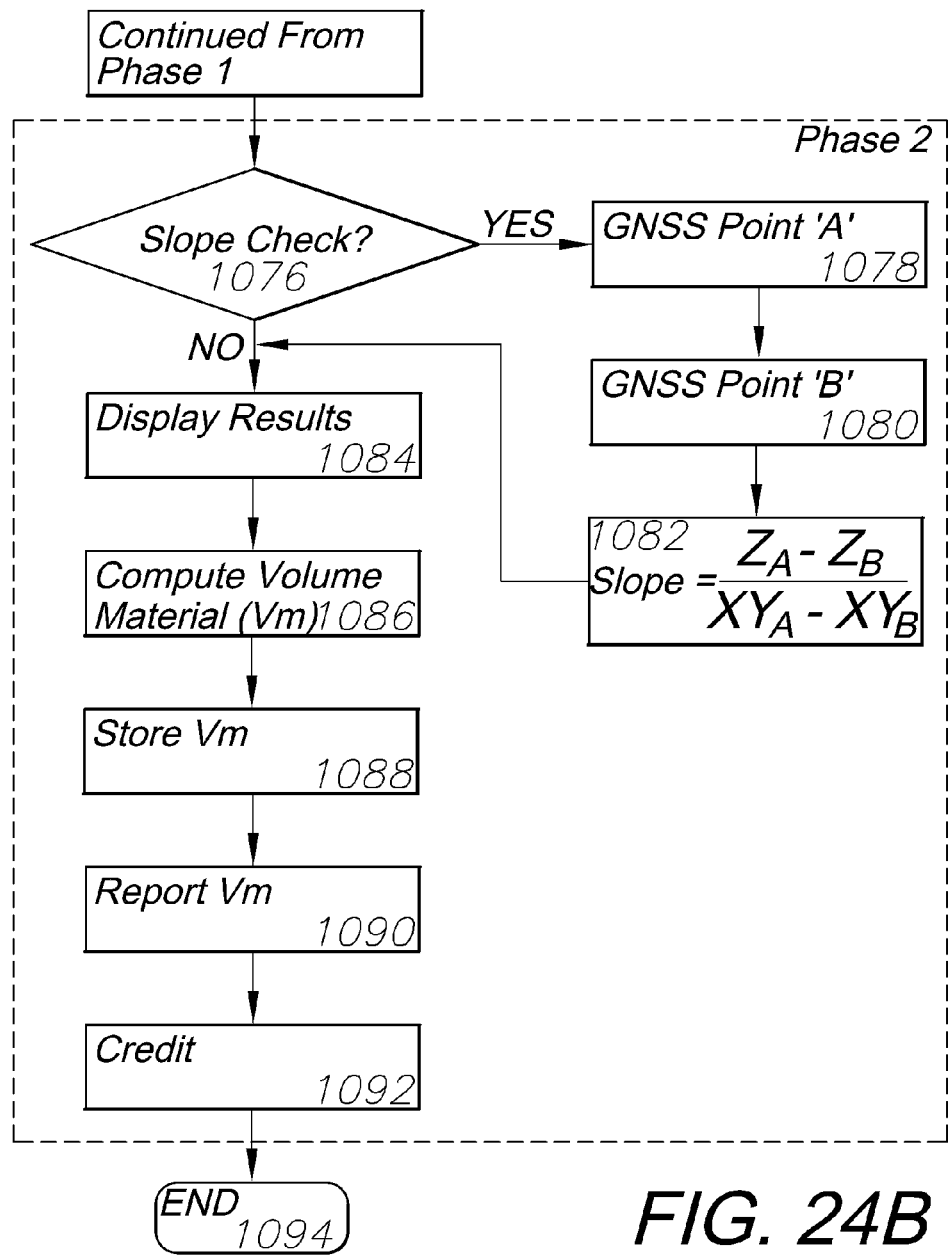

FIGS. 24A & 24B show a flowchart demonstrating steps for performing a method of the present invention. The process starts at 1050. The chosen site is prepared at 1052 by removing brush, trees and other obstructions. A grading plan is established at 1054 to determine the desired design elevation, finished grade slope, and other options necessary for proper drainage and structural support from the soil.

A choice is made at decision box 1056 whether to proceed using a digital terrain map. As described briefly above, the digital terrain map is a map of the chosen site in three dimensions (3D). The design elevation is applied to the map so that a pre-planned cut and fill plan is created. The terrain map establishes a benchmark based on a pre-planned and pre-programmed map. The terrain map is stored in the guidance CPU's storage device 1018 at 1072.

The guidance system is then initialized at 1060, and the system guides the excavator 1004 throughout the site's various cut and fill zones 1020, 1022. The system 1002 georeferences the benchmark design elevation 1026 at 1064 ("Bench In") by referencing actual GNSS positions with the pre-planned terrain map. Cut and fill operations are initiated at 1066. Once a cut or fill has been made, the system compares the GNSS positional data of the bucket within the cut or filled zone with the desired design elevation denoted by the terrain map at 1074. A check is then performed at 1070 to determine whether a design elevation has been reached, which can be designated by a software-defined "dead zone" corresponding to the working tool (e.g., bucket 1010) being located within final design tolerances. If a design elevation 1026 has been reached (positive branch from decision box 1070), Phase One is complete, and Phase Two begins. If not (negative branch from decision box 1070), additional cuts and fills are performed until a design elevation 1026 is met. The GUI 1017 can indicate current positions in relation to final design elevations, thus providing the operator with a visual indication of task progress.

If a terrain map is not used (negative branch from decision box 1056), the next step is placing an elevation stake or stakes in the desired site at 1058. These stakes are used to set a benchmark or monument design elevation 1026. Stakes are placed at locations of known elevation throughout the field, or at one known location, and are referred to as benchmarks or monuments. The process is then initialized at 1060. The bucket is placed on top of the initial stake at 1062 ("Bench In"), the GNSS system 1003 detects and computes the 3-D position of the bucket and geo-references that as the benchmark or monument at 1064. The excavator then begins to cut and/or fill the site at 1066. After a cut or fill action is performed, the GNSS position of the bucket 1010 is checked at 1068, and a check against the design elevation is made at 1070, e.g., if the bucket is within the predefined design tolerance dead zone. The position of the bucket 1010 relative to the design elevation 1026 can be displayed to the operator via the GUI 1017, e.g., as a graphical grading depiction showing existing and final grade elevation lines and cut and fill zones similar to those shown in FIG. 23. If the design elevation 1026 has been reached, the process proceeds to Phase Two. If the design elevation 1026 has not yet been reached, the method returns to cut and/or fill the rest of the site at 1066 until the design elevation is reached.

FIG. 24B contains Phase Two, which is a continuation of Phase One contained on FIG. 24B. The first step in Phase Two is to determine whether or not a slope check is desired at 1076. If yes, the bucket is placed at GNSS point 'A' at 1078, and then at GNSS point 'B' at 1080. The bucket marks these two points and they are stored into the storage device. The guidance CPU 1016 then calculates the slope at 1082 using the "rise divided by run" formula:

$$\text{Slope} = \frac{Z_A - Z_B}{XY_A - XY_B}$$

Once the slope check is performed at 1082, or alternatively if no slope check is desired at 1076, the results are displayed on the GUI 1017 at 1084. The GUI 1017 may be a computer display connected to the GNSS system wirelessly, or a wired display within the cab of the excavator, or any other feasible means of connecting a display to the GNSS guidance system.

The guidance CPU then computes the volume of material ($V_m$) that has been cut or filled at 1086. This is calculated by the guidance system 1003 depending on the starting elevation as detected by the GNSS guidance system or as shown on the terrain map initially, and the known design elevation obtained when work is complete. The $V_m$ is then stored at 1088, reported at 1090, and credited at 1092. The method ends at 1094. The system 1002 is adapted for interfacing with various project cost accounting and related functions. For example, work reports corresponding to material volumes ($V_m$) can be regularly (e.g., daily) generated for billing purposes. Productivity computations, machine scheduling and other support data processing operations can be performed remotely using data downloaded from the system 1002. For example, a centralized control operation can receive and process data from multiple systems 1002, e.g., a fleet of excavators 1004 and other equipment engaged on one or more projects. Specific assignments can be delegated to the individual equipment units based on equipment capabilities, scheduling and other variables associated with project tasks. Alternatively, "smart" excavators equipped with the system 1002 can be programmed for accomplishing such tasks on board or in a networked group of computers distributed throughout a fleet of machines. Examples of such automation, collaboration and task decomposition relating to automated machine behavior are disclosed in co-pending and commonly-assigned U.S. Patent Applications No. 61/243,417; No. 61/243,475; No. 61/265,281; and No. 12/760,363, which are incorporated herein by reference. Still further, machine usage, productivity and profitability can be determined, analyzed and reported. Equipment maintenance and machine assignments corresponding to specific projects can also be facilitated using the data obtained via the system 1002.

Figure 24C:
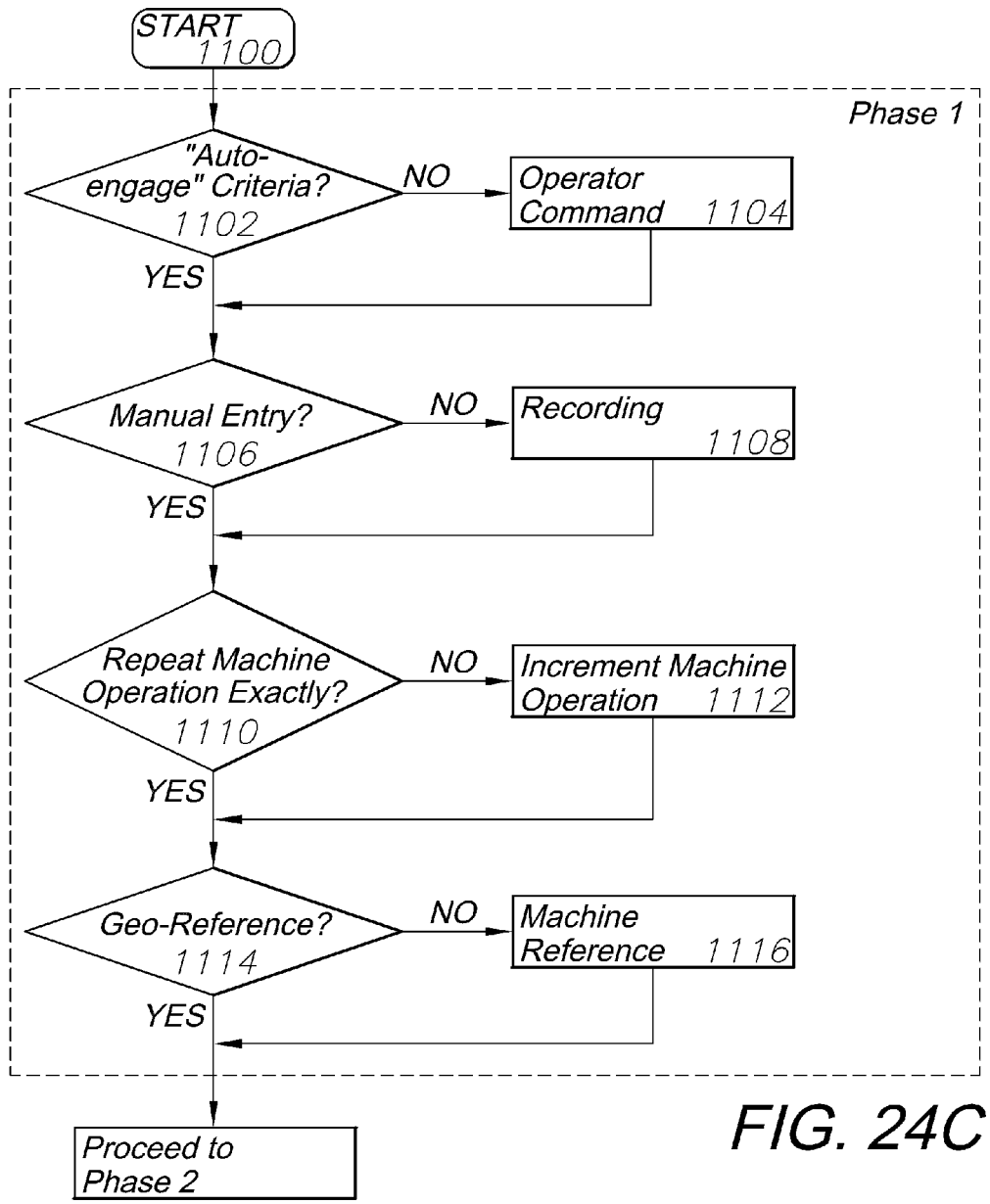
FIGS. 24C and 24D are phases I and II of a flowchart demonstrating the steps necessary to perform a task using macros according to the invention.
Figure 24D:
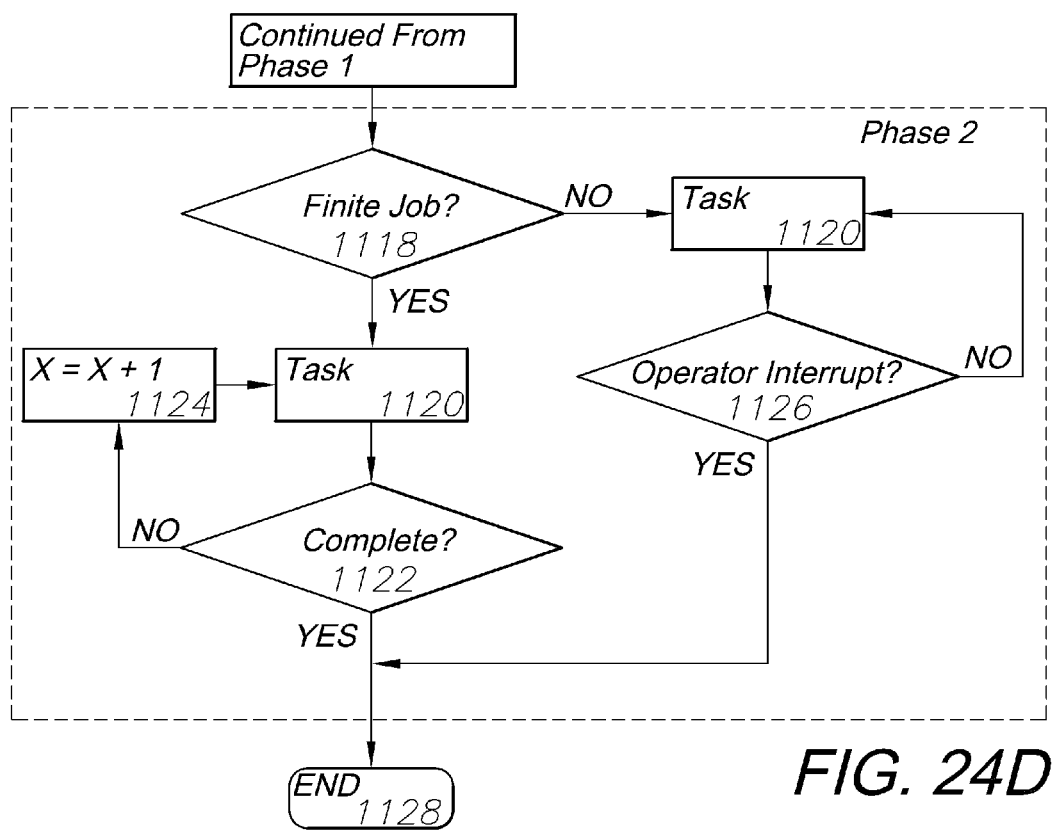

A repetitive, progressive pattern of motion or "macro" can be programmed to control the machine 1004 through multiple repetitive steps until a desired result, e.g., a grading plan, is achieved. For example, digging a trench typically involves removing earth from the same area and depositing it in a predetermined area with each scoop. FIGS. 24C and 24D show a flowchart demonstrating steps necessary to perform a task using macros. The process starts at 1100. Operation of the macro can be activated by operator command 1104 or by an "auto-engage" criteria 1102, such as commencing an earth-moving job involving repetitive machine motions in the same general area. The system 1003 can be preprogrammed with manual entry 1106 of either general or job-specific macros. Alternatively, the operator can create a custom macro by recording at 1108 the actions he or she takes with the machine 1004 for automated repetition.

The macro can repeat the machine operation exactly at 1110 and control the machine 1004 through identical, repetitive motions, or increment machine operation at 1112 and incrementally change each motion to, for example, remove earth from slightly lower depths on each scoop until a "dead band" signal corresponding to a final design elevation is achieved. For example, in controlling a backhoe digging a trench, each scoop would be slightly deeper and/or horizontally repositioned.

Still further, the macro could be "geo-referenced" at 1114 for repeating the same action in the same location, independent of the equipment positioning. Geo-referencing could occur at a particular location defined in 3 dimensions, or along a 3-dimensional courseway, such as a roadway, trench, waterway, utility line right-of-way, etc. Controlling the delta (i.e., differential Δ) corresponding to incremental machine operation changes could control the rate of progress of the job. Progress along a work path can be defined and adjusted by the operator or the macro programmer whereby predetermined increments of earth-moving occur with each repetitive machine cycle of movement (e.g., "cut-and-dump").

An operator can alter only a subsection of the macro, allowing subsequent machine cycles to resume an original preprogrammed movement. For example, a road grader might operate along a predetermined geo-referenced path in a particular manner subject to a "delta" variable controlled by the operator, whereafter predetermined macro control could resume. Alternatively, operations could be machine-referenced at 1116 rather than geo-referenced. Still further, such macro operation can be adapted for various work areas, including "courses" as discussed above, or entire field areas in agricultural operations.

Still further, macro control can be "open-ended" with distinct start and end states corresponding to a finite job 1118, or an endless repetitive "loop" continuing indefinitely until the operation is terminated by an operator interrupt at 1126. After the macro has been assigned, the task 1120 is performed. If the macro is a finite job, the task is either complete at 1122 or incremented at 1124. If the macro is a loop, the task 1120 is performed continuously until there is an operator interrupt at 1126.

The operator could alter the machine movement during that portion of the macro ("delta control"), and then release manual control of the operation for continuation with the original macro control. Such "delta" control could be one-time or recorded by the controller 1016 for repetition. The operator on a trenching job, for example, could merely reposition the equipment, while allowing automatic material extraction and dumping functions under computer control using such a macro. The process ends at 1128.

Figure 25:
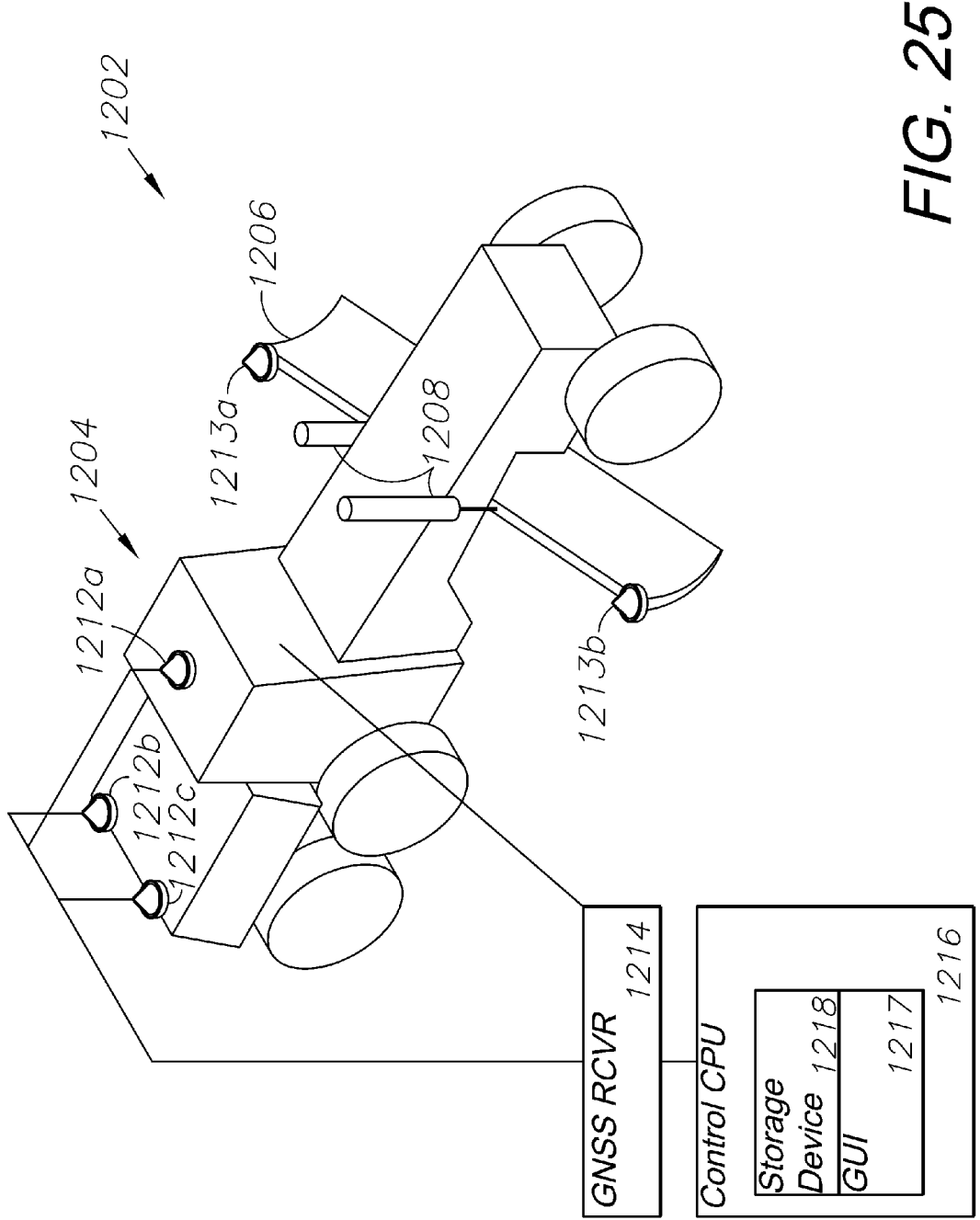
FIG. 25 shows another alternative embodiment application of the control system in a surface motor grader application.

FIG. 25 shows a road (motor) grader 1204 equipped with a GNSS guidance system 1202 comprising another alternative embodiment of the present invention. Like the excavator 1004 discussed above, three antennas 1212a,b,c are placed on the body of the grader 1204 and connected to a GNSS receiver 1214, which connects to a CPU 1216 containing a storage device 1218. The grader 1204 includes a grader blade 1206 mounting blade antennas 1213a,b. The grader blade 1206 can be raised, lowered and tilted by a pair of actuators 1208 connected to the body of the grader 1204 and controlled by the system 1202.

The grader blade 1206 is adapted for vertical Z-axis movement and yaw rotation about the Z-axis. The blade 1206 can also be tilted by rotating it about a generally transverse Y axis, and can be adapted for positioning through six degrees of freedom. Thus, in performing guidance tasks similar to the excavator mentioned above, the guidance system CPU 1216 is adapted for controlling optimal positioning of the guidance blade 1206, guiding the grader 1204 and performing all necessary machine control and guidance functions for a predetermined task, such as grading a road, a paved area or other structure. Alternatively, relative positioning sensors, such as those described above, could be provided for the blade 1206.

Figure 26:
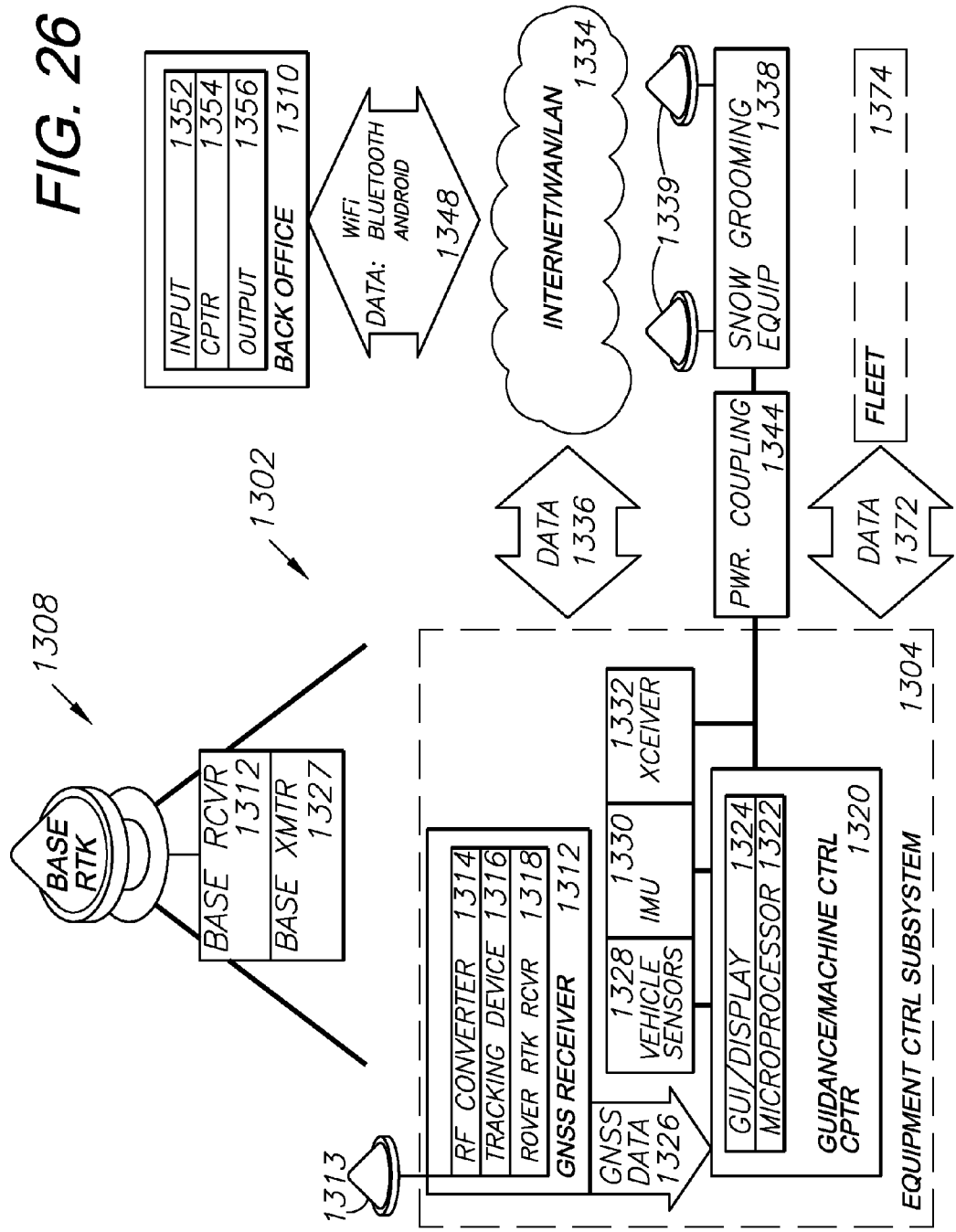
FIG. 26 shows another alternative embodiment of the control system in a snow grooming equipment application.
Figure 27:
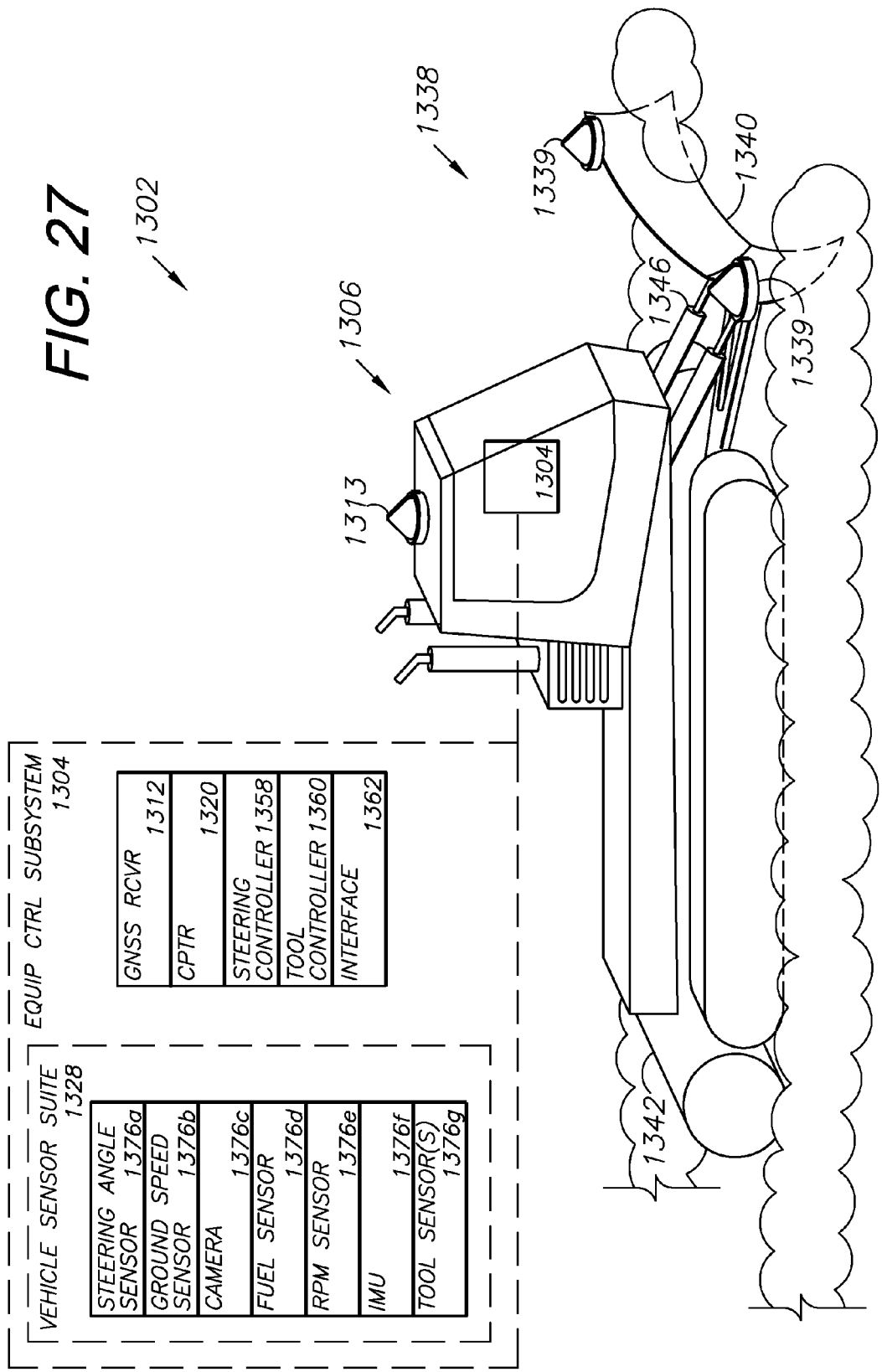
FIG. 27 shows a snowcat equipped with the GNSS-based control system embodying an aspect of the present invention and adapted for snow grooming operations.

VIII. Additional Alternative Embodiments for Snow Grooming Machine Control and Guidance Applications FIGS. 26-35 show a system 1302 and method adapted for guidance and machine control in connection with, for example, snowcats, snowmobiles and other vehicles and mobile equipment used for grooming ski runs and trails, and for similar operations. The system 1302 generally includes an equipment control subsystem 1304 adapted for mounting in a mobile piece of equipment 1306, such as the snow grooming equipment, e.g. and without limitation, a snowcat as shown in FIG. 27, an RTK base unit 1308 and an interconnected facility, such as a "back office" 1310. Although snow grooming equipment 1306 is shown and described, other types of mobile equipment can be utilized with variations of the system 1302, such as the construction and maintenance equipment described above. The equipment control subsystem 1304 generally includes a GNSS receiver 1312, a vehicle-mounted antenna 1313, an RF converter 1314, a tracking device 1316 and a rover RTK receiver 1318, which is adapted to receive differential GNSS signals from the base unit 1308. Various suitable GNSS receivers can be used in the system 1302.

A guidance/machine control computer 1320 includes a microprocessor 1322 and a graphic user interface (GUI)/display 1324. Data from the receiver 1312 is communicated to the computer 1320 via a data connection or link 1326. Other inputs to the computer 1320 include vehicle sensors 1328, inertial measurement units (IMUs) 1330 and an optional transceiver 1332, which can interconnect with the back-office 1310 or a network, such as the Internet/WAN/LAN, generally depicted as a cloud 1334 and interactively connected to the equipment control subsystem 1304 via a data link 1336. The mobile equipment 1306 can include snow grooming equipment 1338, such as the snowplow 1340 and the packing roller 1342 shown in FIG. 27. The snowplow 1340 can mount a pair of antennas 1339 for GNSS (e.g., RTK) based positioning and machine control in conjunction with positioning sensors mounted on the snowcat 1306. The snow grooming equipment 1338 can operate similarly to the earth working and grading equipment described above, including the use of GNSS for machine control and guidance. Positioning and operation of the snowplow 1340, the packing roller 1342 and other equipment can be independently controlled via the guidance/machine control computer 1320, which can be programmed for coordinating such control and guidance with the mobile equipment 1306.

A power coupling 1344 provides power to the grooming equipment 1338 from the vehicle/equipment 1306. The power coupling 1344 can be mechanical, hydraulic, pneumatic, electrical, etc. For example, piston and cylinder units 1346 are shown in FIG. 27 for operating and variably positioning the snowplow 1340.

The remote facility or back-office 1310 connects to the cloud 1334 by a data connection 1348, which can comprise a Wi-Fi connection or some other suitable wireless interconnection, such as a Bluetooth, Android or other device. Other data transfer devices and protocols can be used for transferring data from the mobile equipment 1306 to the remote facility 1310. The remote facility 1310 can include suitable components, such as an input device 1352, a computer 1354 and an output device 1356. Data received in the remote facility 1310 can be processed and utilized for business operations, record keeping and other functions. Moreover, automated record-keeping can facilitate repetitive operations whereby GNSS-based guidance can be utilized for repeating guide paths, or adjusting as necessary. Moreover, records of operations can be utilized for quantitative record-keeping, such as volumes (cubic meters) of material handled, placement, updating topographical maps, 2-D/3-D modeling, etc. A data link 1372 can be provided from the equipment control subsystem 1304 to other mobile equipment 1306 in a fleet 1374 for coordinating operations (FIG. 26).

As shown in FIG. 27, the snowcat or mobile equipment 1306 is adapted for snow grooming operations, such as grading and shaping slopes with the adjustable snowplow 1340, the packing roller 1342 and other snow grooming equipment. The equipment control subsystem 1304 for the mobile equipment 1306 can include the GNSS receiver 1312, the control computer 1320, a steering controller 1358, a tool controller 1360 (e.g., for the snowplow 1340 and the packing roller 1342) and an interface device 1362 connecting the equipment control subsystem to the equipment. The vehicle sensor suite 1328 can include, without limitation, sensors for such operating parameters as steering angle, ground speed, video capture/camera, fuel, engine RPM (tachometer), inertial measurement unit (IMU, e.g., accelerometers and gyroscopes) and tool parameters, designated 1376a-g.

Figure 28:
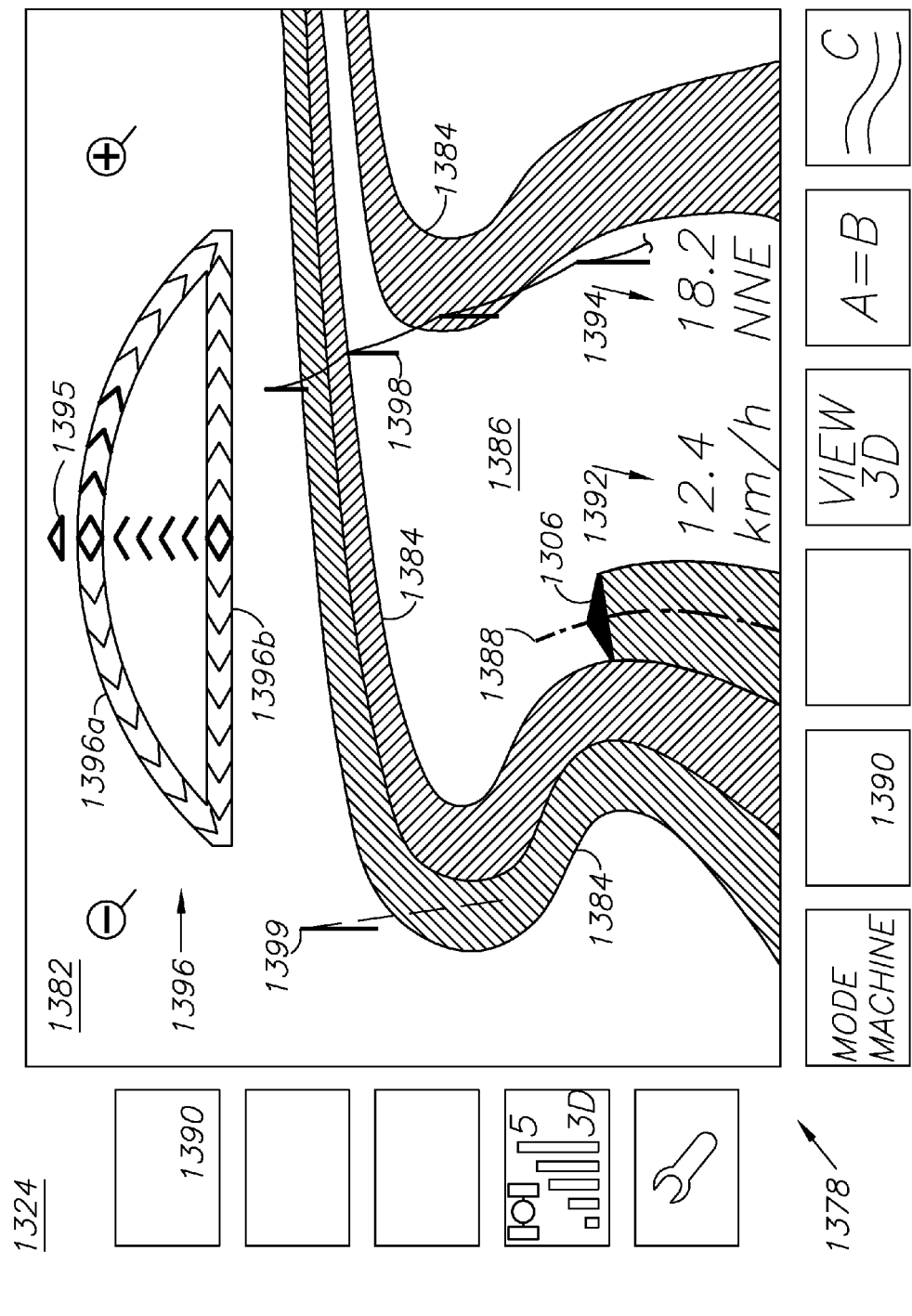
FIG. 28 is a screen view of a monitor located in a cab of the snow grooming equipment, showing a graphical user interface (GUI) of the control system.

FIG. 28 shows an example of a screen display 1378 of the GUI/display (monitor) 1324, showing the snowcat or mobile equipment 1306 in a grooming operation covering an area generally designated 1380, which can comprise an area of a ski resort or other facility utilizing mobile equipment for maintenance, grounds keeping, grooming, construction, earthmoving and other operations. Agricultural operations can also be accommodated by the system 1302. The screen display 1378 generally includes a view area 1382, which shows a birds-eye view of the operation, generally following the movement of the mobile equipment 1306. Treatment guide paths or "swaths" 1384 are graphically distinguished from untreated areas 1386, e.g. by changing color or other graphical treatments. The equipment guide path 1384 can include a centerline 1388, which is followed by the equipment 1306. The guide paths 1384 and the centerlines 1388 can be preprogrammed, or generated in real-time based on previous guide paths and such parameters as equipment width, equipment speed, terrain slope, snow depth, etc.

The screen display 1378 can include graphical display windows 1390 around the view area 1382, which depict various aspects of the operation, including equipment operating parameters, conditions, system status and warning indicators. Vehicle speed can be displayed at 1392 and vehicle heading (course) can be displayed at 1394. The display 1378 can also include a superimposed steering/offset guide 1396, with an upper arc 1396a indicating a steering direction and a lower, horizontal baseline 1396b showing an offset from a predetermined course. U.S. Pat. No. 6,539,303, incorporated herein by reference and assigned to a common assignee herewith, shows a similar steering/offset guidance display. The display 1378 can include a directional arrow 1395 corresponding to a direction-of-travel for the vehicle/equipment 1306. The steering/offset guidance display 1378 can be used for manually steering the vehicle/equipment 1306, or for monitoring the operation of an autosteering system. As shown in FIG. 28, terrain obstacles such as ski lifts 1398 and a draw line 1399 can also be shown for assisting the operator with avoiding such obstacles.

Figure 29:
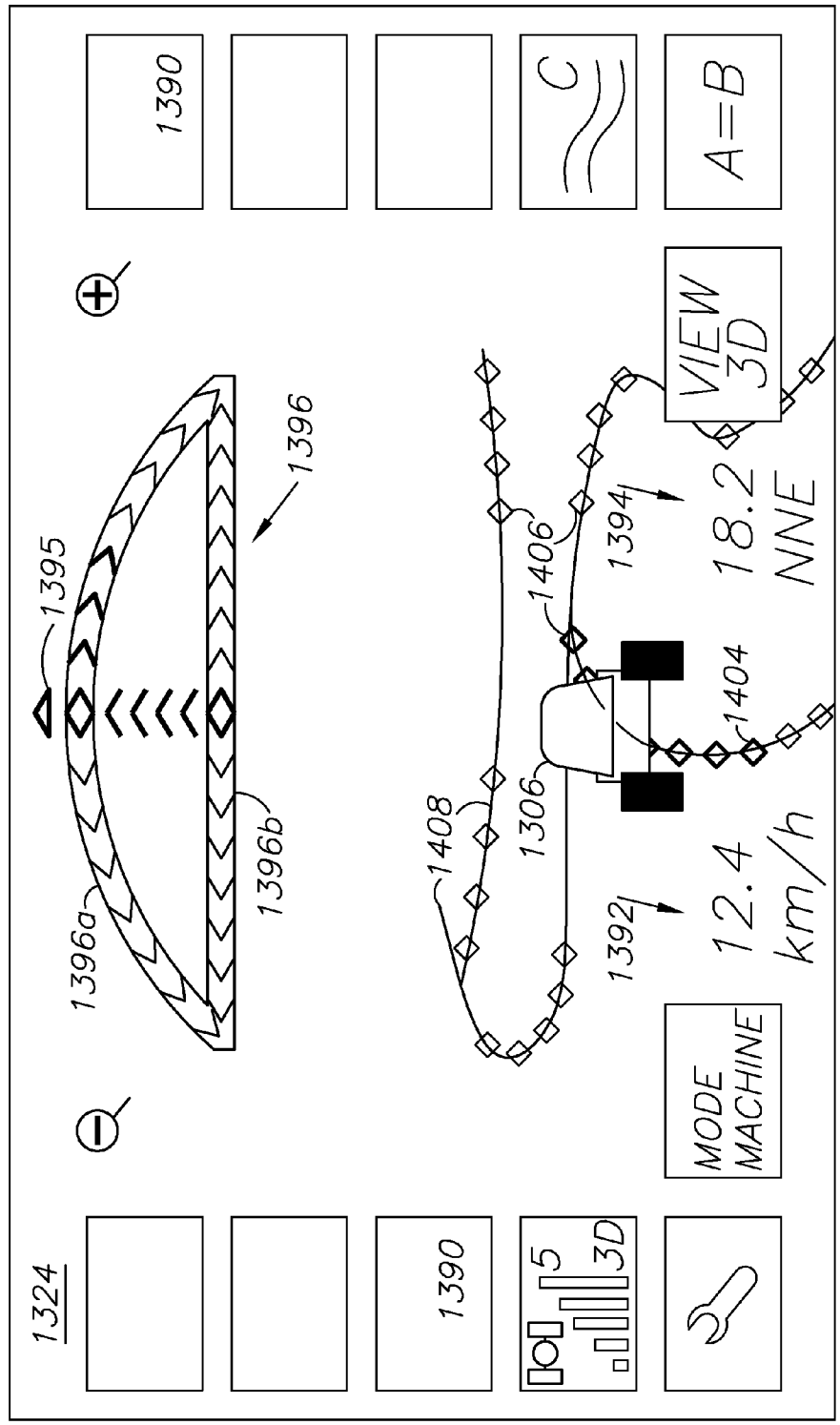
FIG. 29 is another screen view of the monitor showing other aspects of the system's operation.

Another display 1402 is shown in FIG. 29 and includes "breadcrumb" trails 1404 with GNSS-defined marked points 1406 at predetermined intervals along guide paths 1408. Such guidance and path-marking are described above in connection with the antenna system 740 and are shown in FIG. 17. It will be appreciated that the displays 1378 and 1402 can be selectively opened by the operator. Other displays can be utilized with appropriate emphasis on particular displays, graphics, dynamic equipment depictions, topographical mapping, operating parameters and other useful output information.

Figure 30:
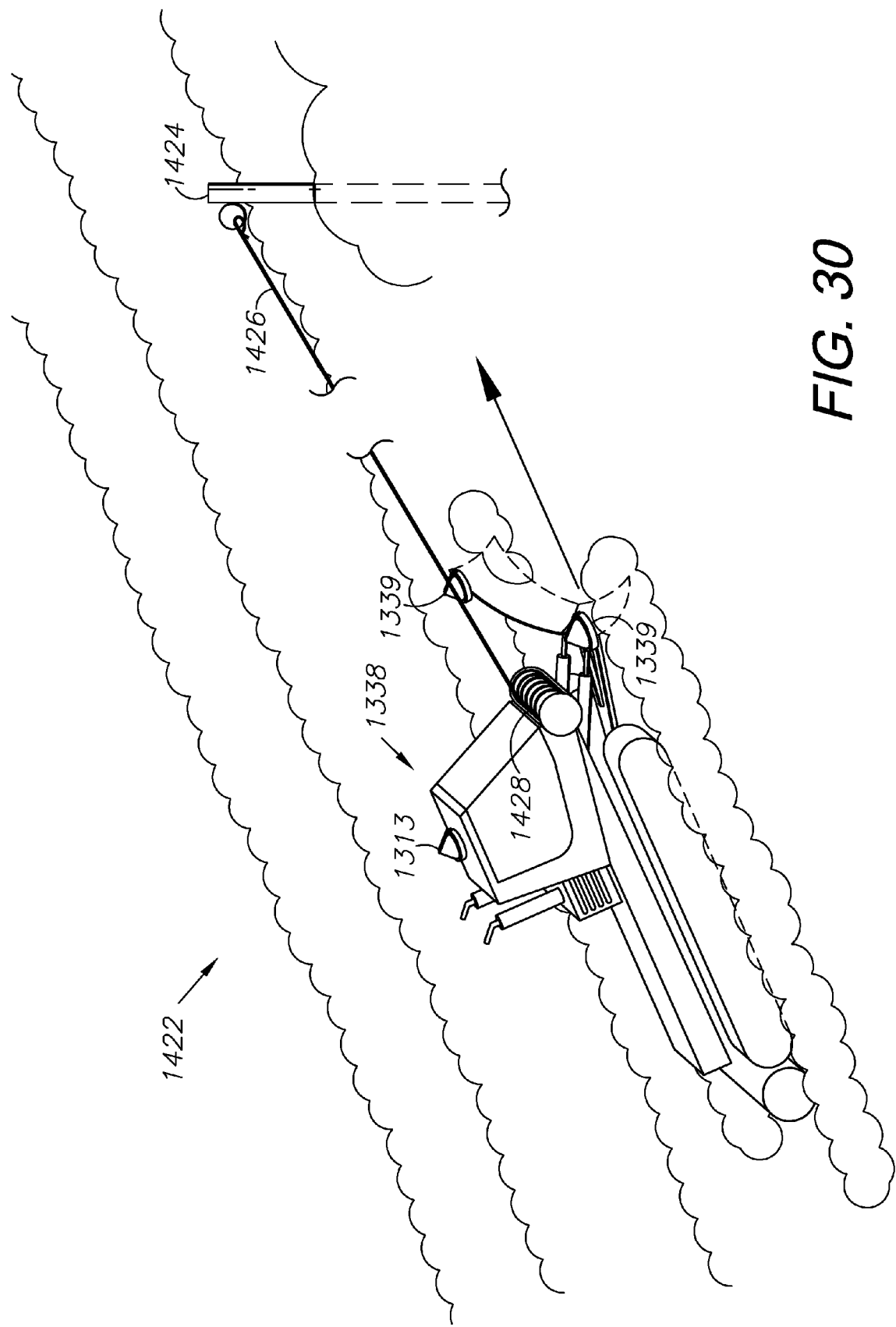
FIG. 30 shows another alternative embodiment application of the control system in a draw line configuration.

FIG. 30 shows another alternative embodiment of the present invention in a draw line system 1422. Such systems are particularly useful where topographies are relatively steep, such as advanced ski runs, and present difficulties for equipment designed to operate in grooming operations. The draw line system 1422 includes an anchor post 1424 anchoring a cable 1426 which is taken up on a reel 1428 mounted on the front of the vehicle (i.e., snowcat) mounting grooming equipment 1338.

FIGS. 31-34 show a terrain modeling system 1462, which uses algorithms for interpolating snow depths. The terrain modeling system 1462 can utilize a mobile radar equipped system 1432, which can be mounted on a vehicle such as a snow cat 1306. The radar equipped system 1432 can include an equipment control subsystem 1434 connected to a guidance/machine control computer 1320, a radar signal processing component 1436, a transceiver 1438 and a transducer or antenna 1440. The radar equipped system 1432 functions as a depth monitoring system 1452 in the terrain modeling system 1462.

Figure 32:
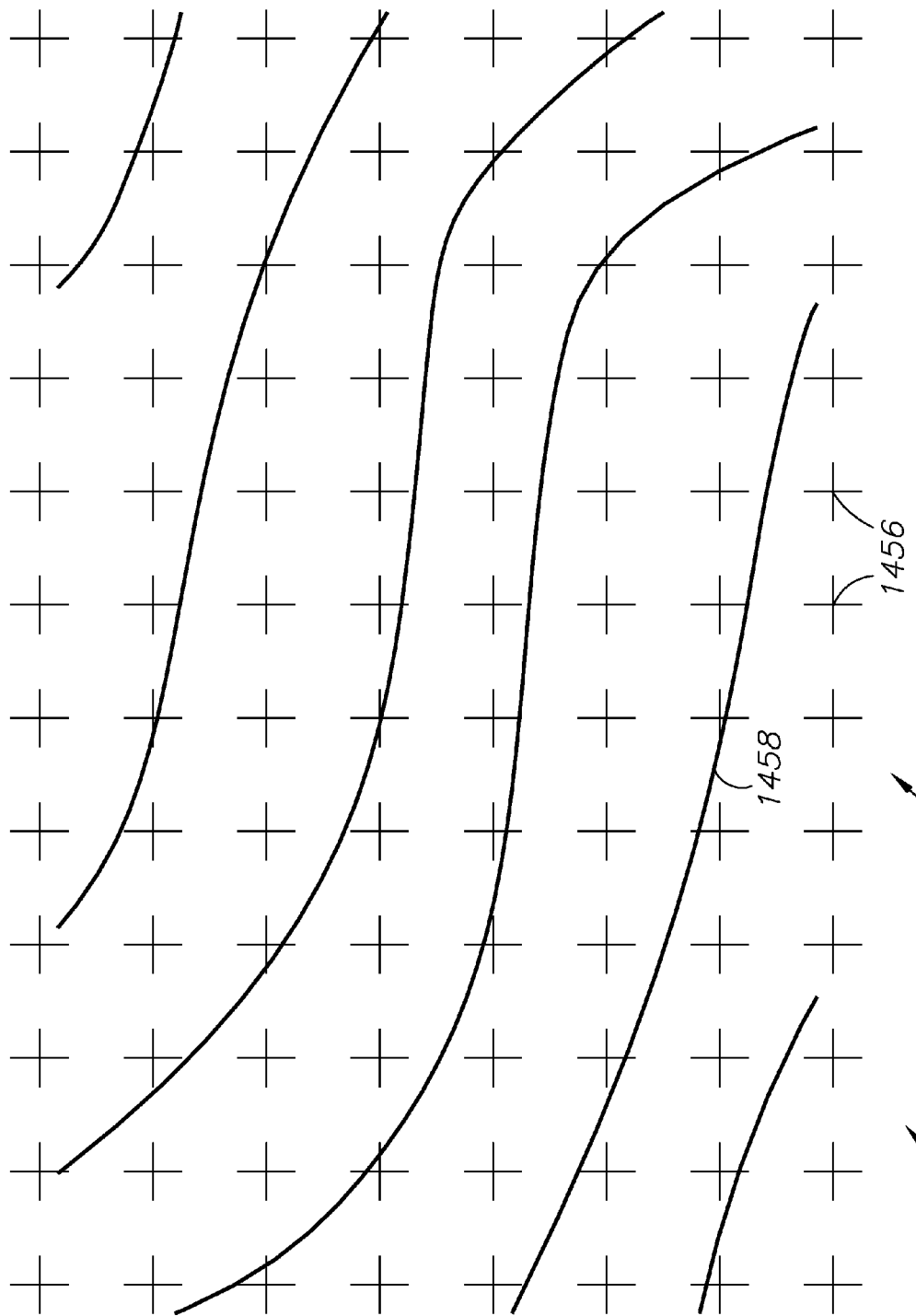
FIG. 32 shows contour guidelines overlaid on a point grid for use in terrain modeling, including snow depths.
Figure 34:
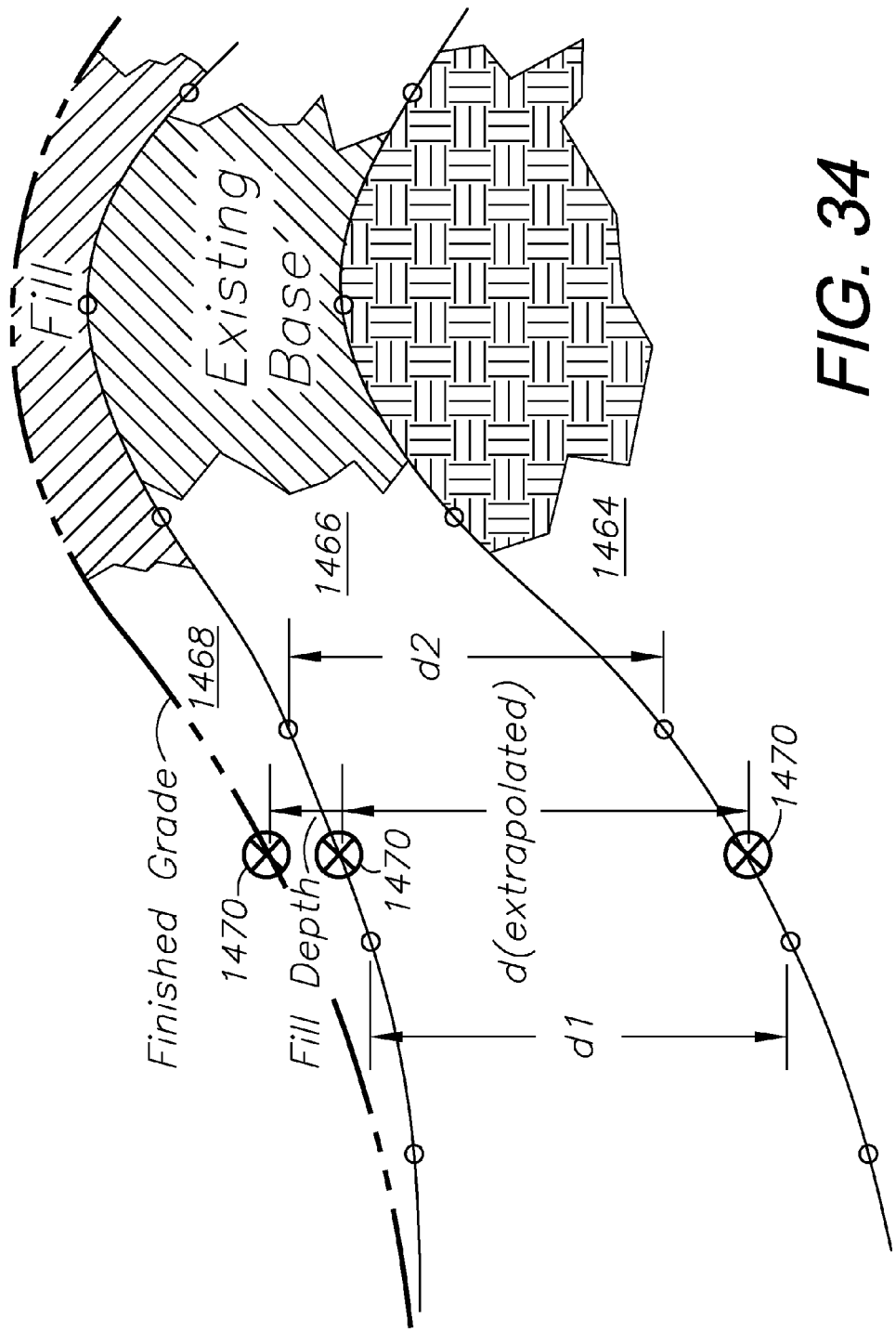
FIG. 34 is a vertical cross-section of a snow-covered area, particularly showing elevations of interest in connection with a snow grooming operation.

FIG. 32 shows a display 1454 with XY nodes 1456 corresponding to point locations on a topographical model. The nodes 1456 can also include elevation, i.e. the Z component along a vertical axis in an XYZ Cartesian coordinate system. Contours 1458 corresponding to elevations can be generated from the point elevations. As shown in FIG. 34, the depths d (extrapolated) at points of interest or benchmarks 1470 can be extrapolated or interpolated from adjacent depths, such as d1 and d2 based on distances dist1, dist2, dist3 and dist4 from the adjacent nodes 1456 to a point of interest (benchmark) 1470.

Figure 31:
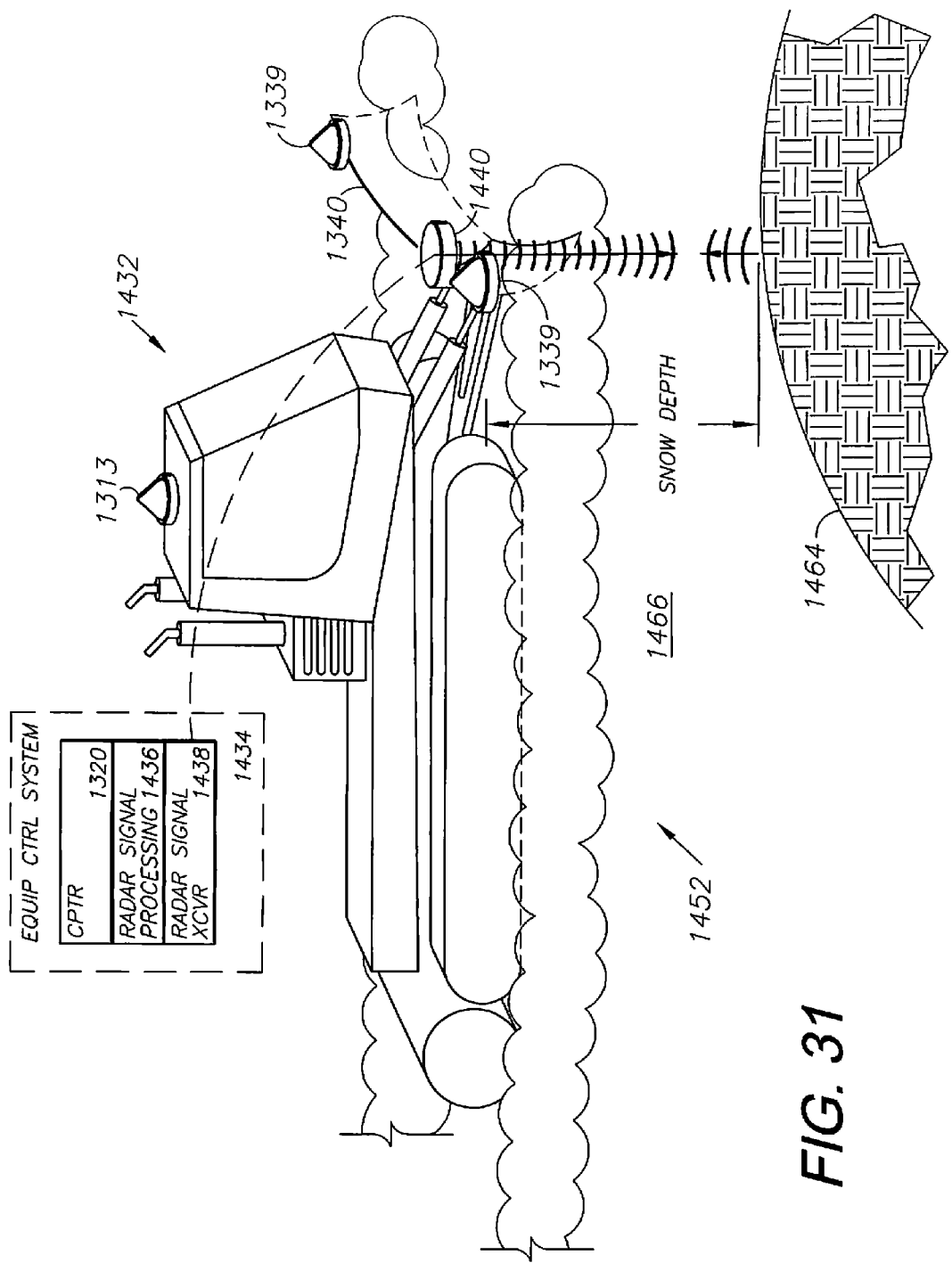
FIG. 31 shows the system in a snow grooming application using radar for measuring snow depth.

FIGS. 31 and 34 are cross-sections of snow grooming operations showing an underlying earthen grade 1464, an existing snow base 1466 and snow fill 1468. Benchmarks 1464.1, 1466.1 and 1468.1 correspond to point elevations at the earthen grade 1464, the existing snow base 1466 and the fill 1468 respectively. For many operations these are the three elevations of interest, for which the terrain modeling system 1462 utilizes point elevations, i.e. XYZ coordinates in any suitable geodesic reference for purposes of creating topographical models.

Algorithms and software for computing such depths and generating topographical maps are well known in the field. For example, Surfer contouring, grading and 3-D surface mapping software is available from Golden Software, Inc. (www.goldensoftware.com). Interpolation algorithms are described in: Yang, C., "12 Different Interpolation Methods: a Case Study of Surfer 8.0;" Dressler, M., "Art of Surface Interpolation;" and Beutel, A. et al., "Natural Neighbor Interpolation-Based Grid DEM Construction Using a GPU." Other software and algorithms could also be used in connection with the terrain modeling system 1462. The terrain models generated can be output in suitable formats, including printouts, digital files, etc. Other functions include calculating material moved, workers' time records, equipment operating hours, etc. Previously-recorded terrain models can be archived for future reference, including prescriptions for future maintenance activity and saved guide paths for vehicles.

Figure 33:
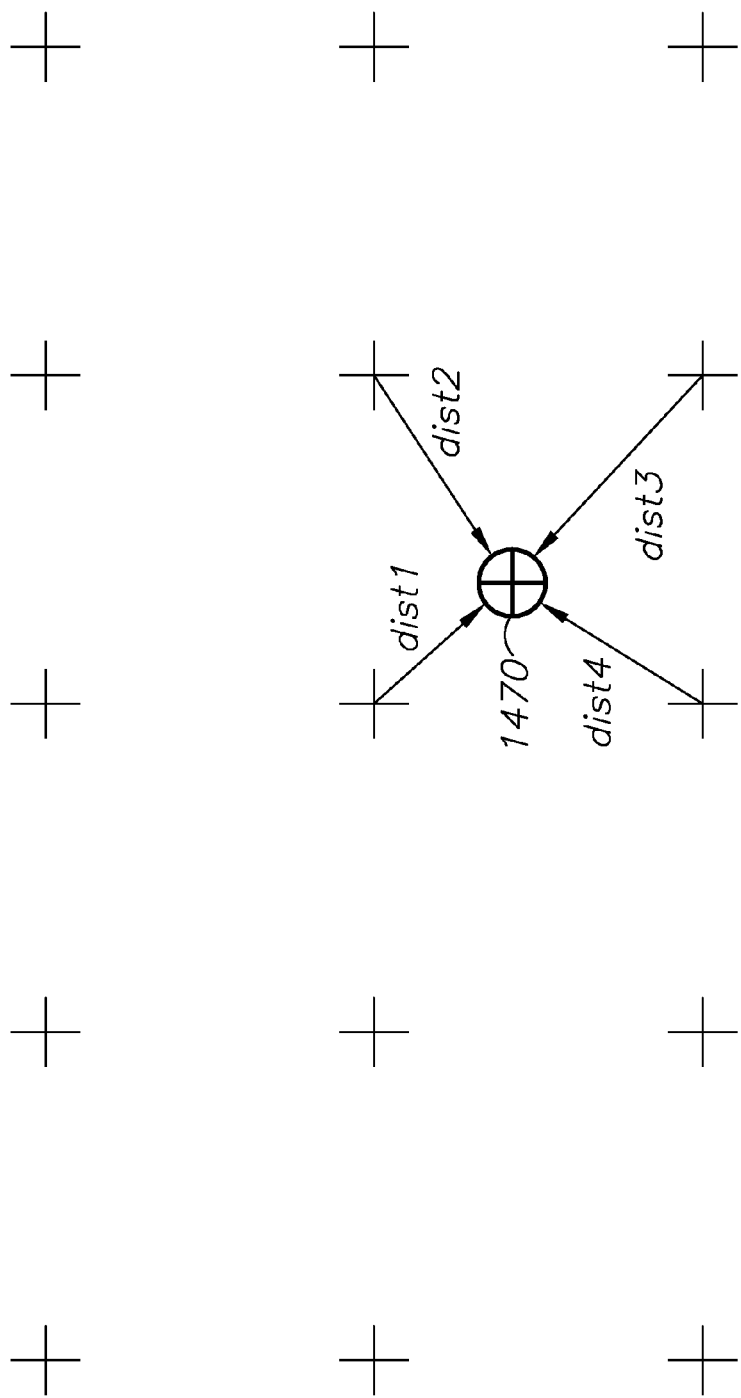
FIG. 33 shows a point depth interpolation on the point grid for use in terrain modeling, including snow depths.
Figure 35:
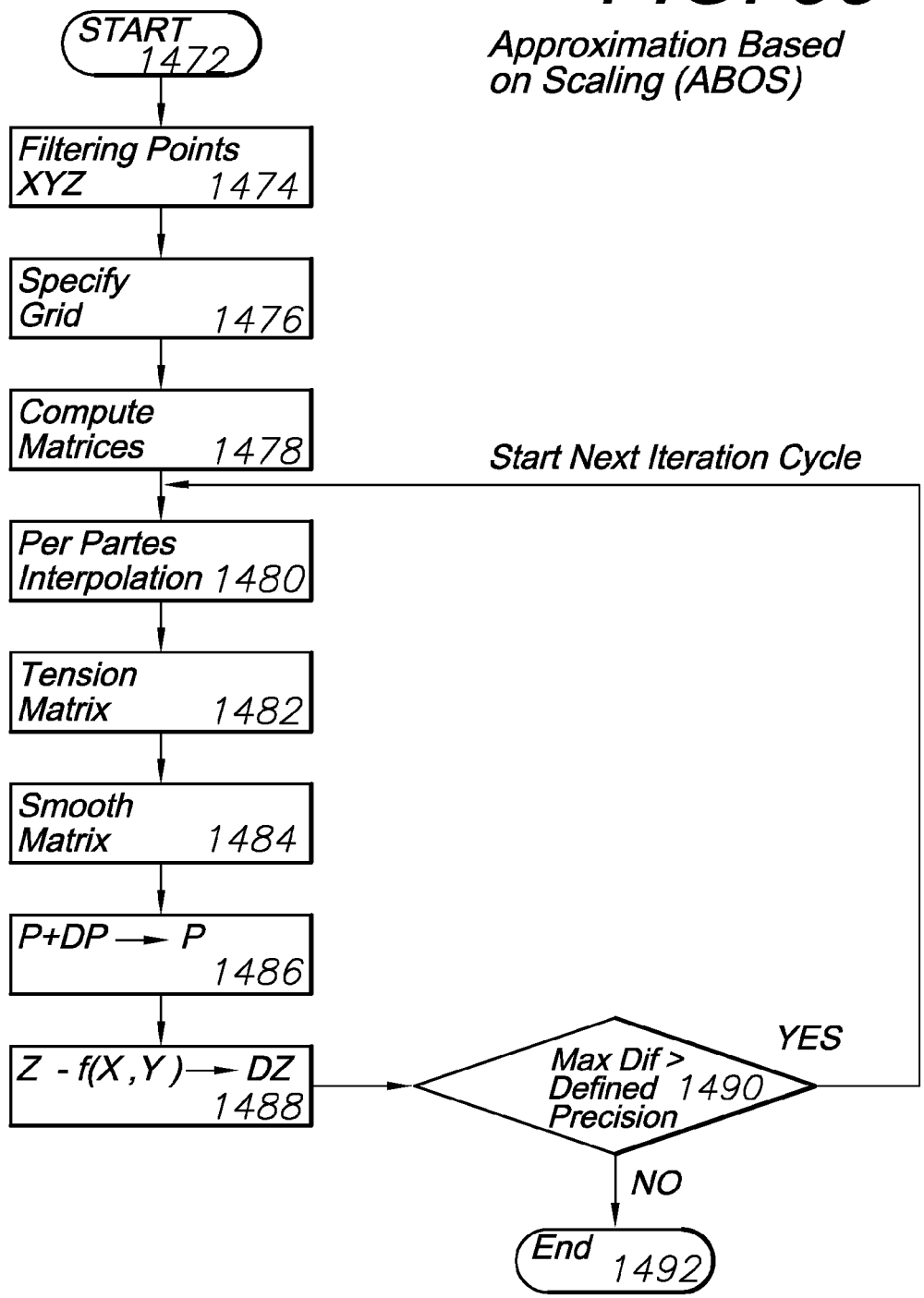
FIG. 35 is a flowchart of a topography modeling method embodying an aspect of the present invention using approximation based on scaling (ABOS).

FIG. 35 is a flowchart of a surface modeling method using approximation based on scaling (ABOS), which interpolates point elevations and generates topographical models, including underlying terrain and snow depths. From a start 1472, the method proceeds to filtering points at 1474 based on their XYZ coordinates, for example, corresponding to the terrain model nodes 1456. A grid is specified at 1476, and may correspond to the grid 1455 (FIG. 33). Matrices are computed at 1478 and define the nodes 1456. Per partes interpolation occurs at 1480 and leads to the method step of tensioning and smoothing the resulting matrix at 1482, 1484. The matrix P is added to the new material, such as fill snow with a resultant new matrix P at 1486. The f(X,Y) value is subtracted from the Z (altitude) value to provide the change in elevation DZ at 1488, which is compared to the defined precision at 1490. If the maximum difference DZ is greater than the defined precision ("YES" branch from 1490) the process loops back to the interpolation step at 1482 to begin the next iteration cycle. The cycles continue until DZ is less than the defined precision, i.e. the resulting topographical model is accurate to within the specified tolerances, whereat the method ends at 1492 ("NO" branch from 1490).

IX. Alternative Embodiment for Guiding Mine Trucks and Other Vehicles

Figure 36:
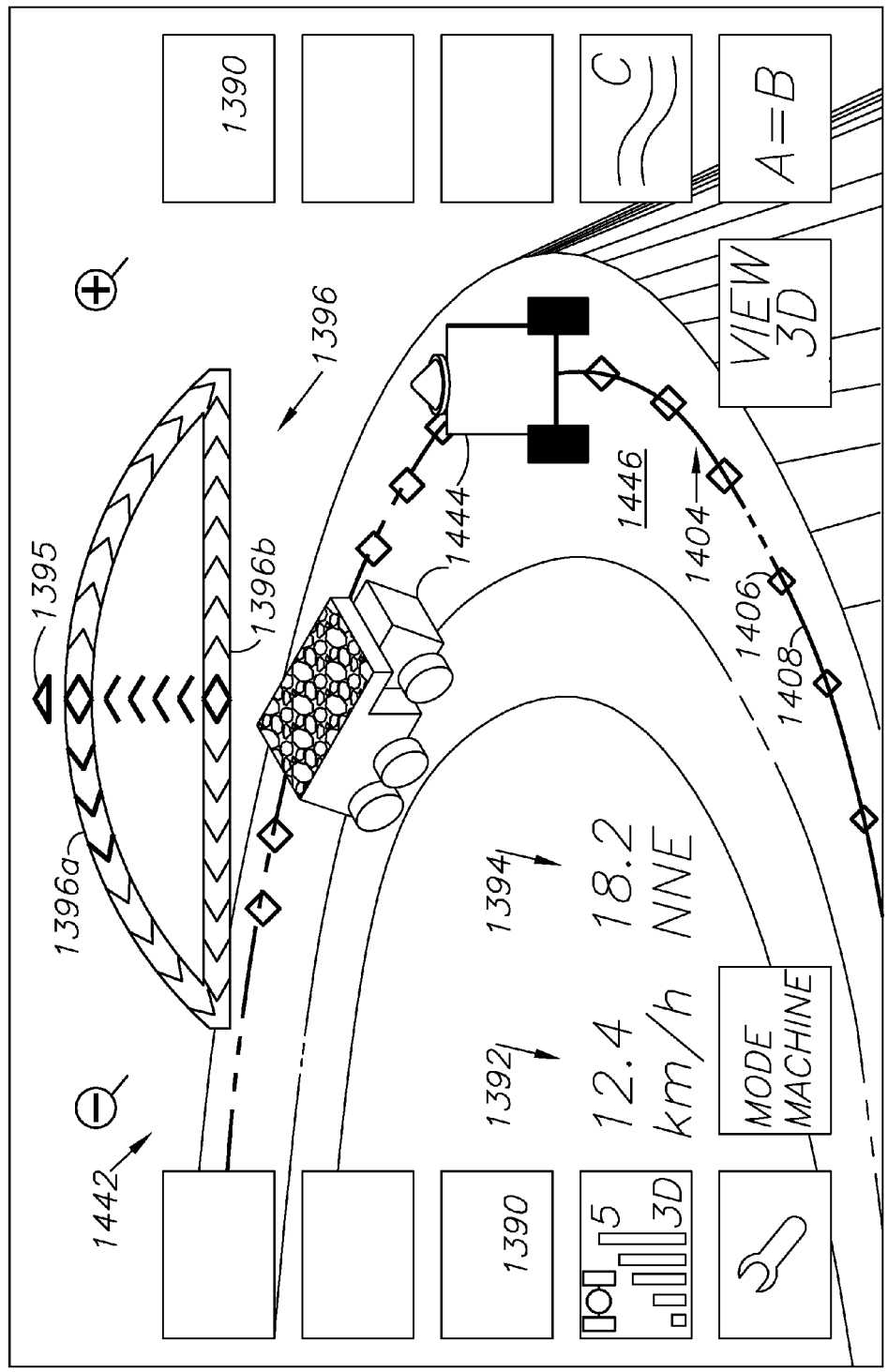
FIG. 36 shows another alternative embodiment application of the control system for guiding ore trucks in a mining operation.

FIG. 36 shows a vehicle control system 1442 comprising another alternative embodiment or aspect of the present invention. Without limitation, an application of the control system 1442 is shown and described on mine trucks 1444 traversing mine roads 1446. Such operations are often repetitive whereby routes are repeated and lend themselves to automated guidance. As shown, the mine trucks 1444 can be automatically guided to avoid each other and stay on course, even under limited visibility conditions. Other aspects of the alternative embodiments discussed above can be adapted to the system 1442.

IX. Conclusion

While the invention has been described with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof. Therefore, it is intended that the claims not be limited to the particular embodiments disclosed as the currently preferred best modes contemplated for carrying out the teachings herein, but that the claims shall cover all embodiments falling within the true scope and spirit of the disclosure.

Having thus described the invention, what is claimed as new and desired to be secured by Letters Patent is:

1. A GNSS-based machine guidance and control method for use with a vehicle equipped with snow grooming equipment, which method comprises the steps of:
    equipping the vehicle with a GNSS system including multiple GNSS antennas, a GNSS receiver connected to the antennas and a programmable controller connected to the GNSS receiver;
    programming the controller to compute GNSS-defined positions of said antennas using GNSS ranging information;
    determining with the GNSS-defined antenna positions vehicle position and attitude in three dimensions (3-D);
    providing a sensor connected to the snow grooming equipment;
    outputting from said sensor a signal corresponding to a condition of said snow grooming equipment;
    inputting a snow grooming plan including design elevations defining a finished snow surface into said programmable controller;
    programming the controller with GNSS-defined snow grooming information including underlying grade elevations, existing snow base elevations and groomed snow surface elevations;
    interpolating or extrapolating said snow grooming elevation information with said controller utilizing the elevations of adjacent surface points for estimating the elevations of additional snow surface points;
    positioning a base including a base GNSS receiver and a base GNSS transmitter in a remote location relative to said vehicle;
    using said base for providing differential corrections to said vehicle-mounted GNSS subsystem;
    comparing with said controller said snow grooming information and said snow grooming equipment condition; and
    guiding said vehicle and operating said snow grooming equipment with said controller based on said comparison using a real-time kinematic (RTK) procedure, said vehicle position and attitude, said snow grooming equipment condition and said grading plan.

2. A GNSS guidance method for a vehicle, which method comprises the steps of:
    equipping the vehicle with a GNSS system including multiple GNSS antennas, a GNSS receiver connected to the antennas and a programmable controller connected to the GNSS receiver;
    programming the controller to compute GNSS-defined positions of said antennas using GNSS ranging information;
    determining with the GNSS-defined antenna positions vehicle position and attitude in three dimensions (3-D);
    determining a route for the vehicle with said programmable controller based upon said computed GNSS-defined positions of said antennas and said vehicle position and attitude;
    guiding said vehicle with the controller based on said vehicle position and attitude; and
    saving in said computer a series of GNSS-defined positions trailing said vehicle along said route.

3. The GNSS guidance method according to claim 2, which includes the additional steps of:
    providing multiple vehicles;
    equipping each said vehicle with a respective said GNSS system;
    determining routes for multiple vehicles simultaneously traveling a respective road with adequate clearances between said vehicles along said road;
    guiding multiple vehicles each traveling a respective said route; and
    saving in said computer a series of GNSS-defined positions trailing each said vehicle along a respective route.

* * * * *